(12) United States Patent
Suhami

(10) Patent No.: US 8,063,379 B2
(45) Date of Patent: Nov. 22, 2011

(54) RADIATION CAMERAS

(76) Inventor: Avraham Suhami, San Jose, CA (US)

( * ) Notice: Subject to any disclaimer, the term of this patent is extended or adjusted under 35 U.S.C. 154(b) by 980 days.

(21) Appl. No.: 11/820,700

(22) Filed: Jun. 20, 2007

(65) Prior Publication Data

US 2008/0128631 A1 Jun. 5, 2008

Related U.S. Application Data

(60) Provisional application No. 60/874,788, filed on Dec. 14, 2006, provisional application No. 60/815,300, filed on Jun. 21, 2006.

(51) Int. Cl.
*G01T 1/24* (2006.01)
(52) U.S. Cl. .................................. 250/370.09
(58) Field of Classification Search .............. 250/361 R, 250/362, 363.01–363.05, 363.07–363.09, 250/366, 368, 369, 370.01, 370.08–370.12, 250/371
See application file for complete search history.

(56) References Cited

U.S. PATENT DOCUMENTS

| | | | | |
|---|---|---|---|---|
| 5,103,098 A * | 4/1992 | Fenyves | ........................ | 250/368 |
| 5,281,821 A * | 1/1994 | Antich et al. | ................. | 250/368 |
| 5,334,839 A * | 8/1994 | Anderson et al. | ............. | 250/368 |
| 5,374,824 A * | 12/1994 | Chaney et al. | ............ | 250/363.02 |
| 5,506,408 A * | 4/1996 | Vickers et al. | ................ | 250/366 |
| 5,600,144 A * | 2/1997 | Worstell | ................... | 250/363.03 |
| 5,714,761 A * | 2/1998 | Fay | .............................. | 250/367 |
| 6,281,509 B1 * | 8/2001 | Ryan et al. | ..................... | 250/397 |
| 7,274,020 B1 * | 9/2007 | Hindi et al. | .............. | 250/363.01 |
| 7,465,938 B1 * | 12/2008 | Hindi et al. | ............. | 250/390.11 |
| 7,667,203 B2 * | 2/2010 | Hindi et al. | ............. | 250/363.01 |
| 7,667,206 B1 * | 2/2010 | Hindi et al. | ............. | 250/390.07 |
| 2009/0134334 A1 * | 5/2009 | Nelson | ........................ | 250/361 R |
| 2010/0090116 A1 * | 4/2010 | Nelson | ......................... | 250/367 |
| 2010/0090117 A1 * | 4/2010 | Nelson | ......................... | 250/367 |
| 2010/0096555 A1 * | 4/2010 | Nelson | .................... | 250/363.04 |

* cited by examiner

*Primary Examiner* — Mark R Gaworecki

(57) ABSTRACT

The invention describes radiation cameras consisting of interlaced scintillation fiber arrays and a fiber readout method using pixellated photo-detector cameras. Several fabrication methods of the fiber arrays are described. The use of such Radiation Cameras in Medical Imaging systems is also described.

15 Claims, 27 Drawing Sheets

Fig. 7
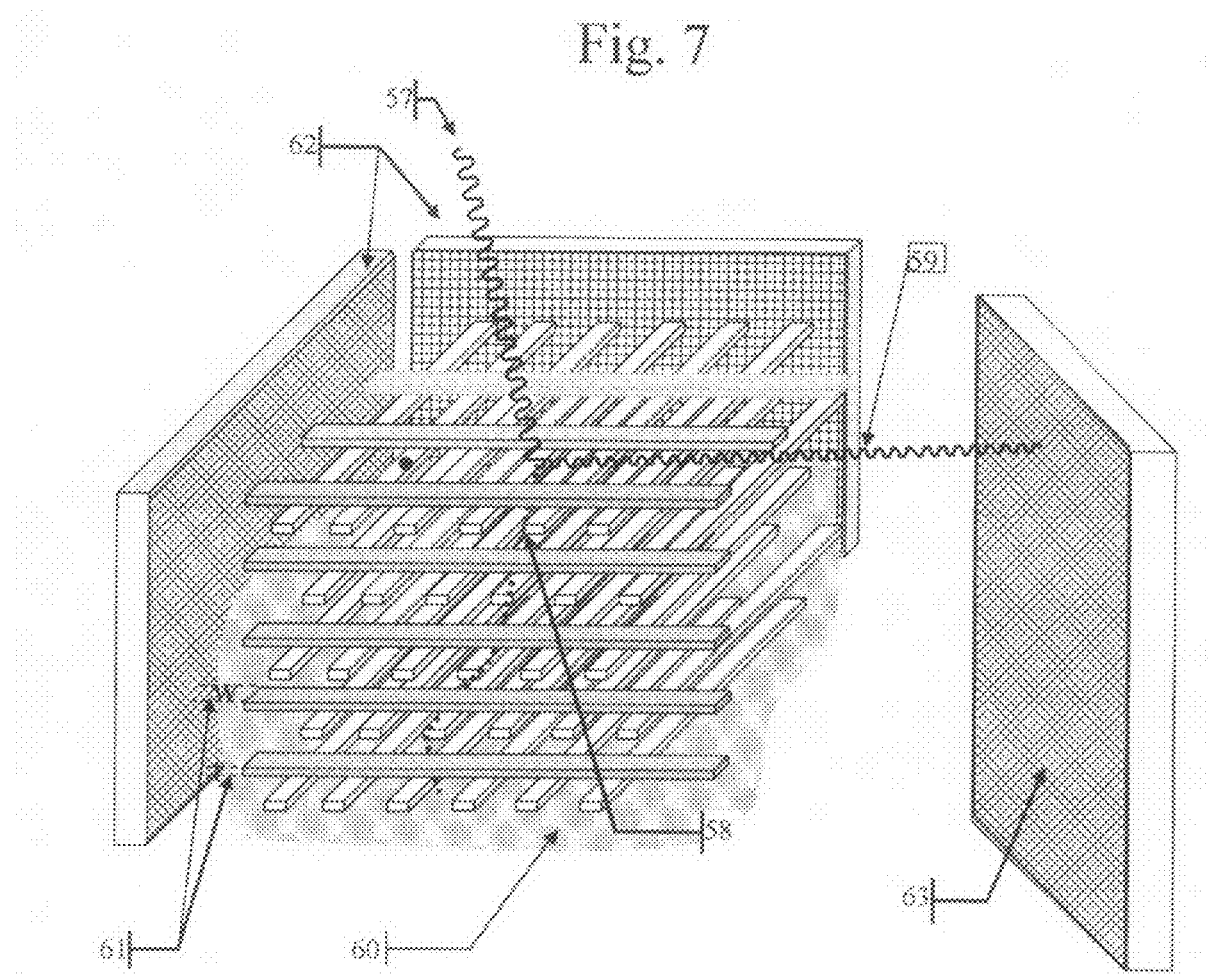
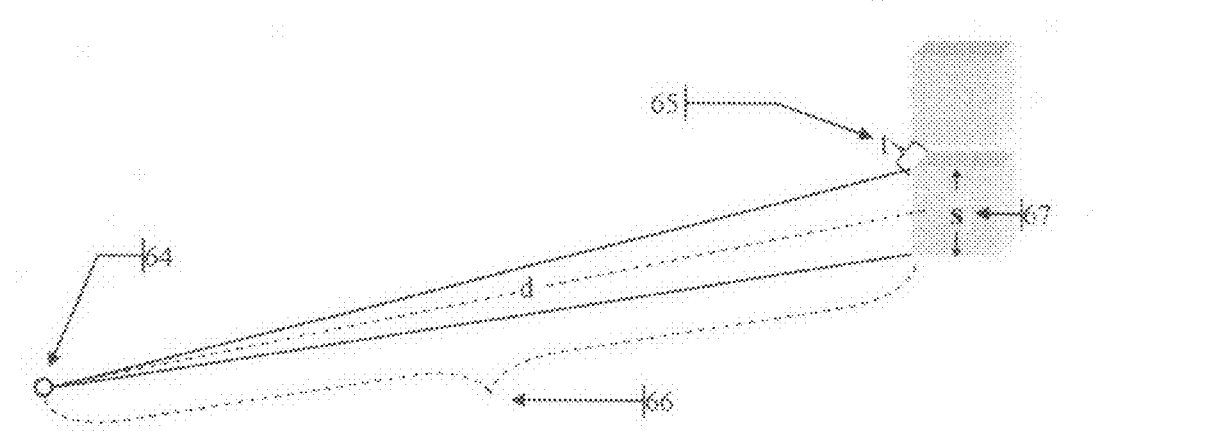

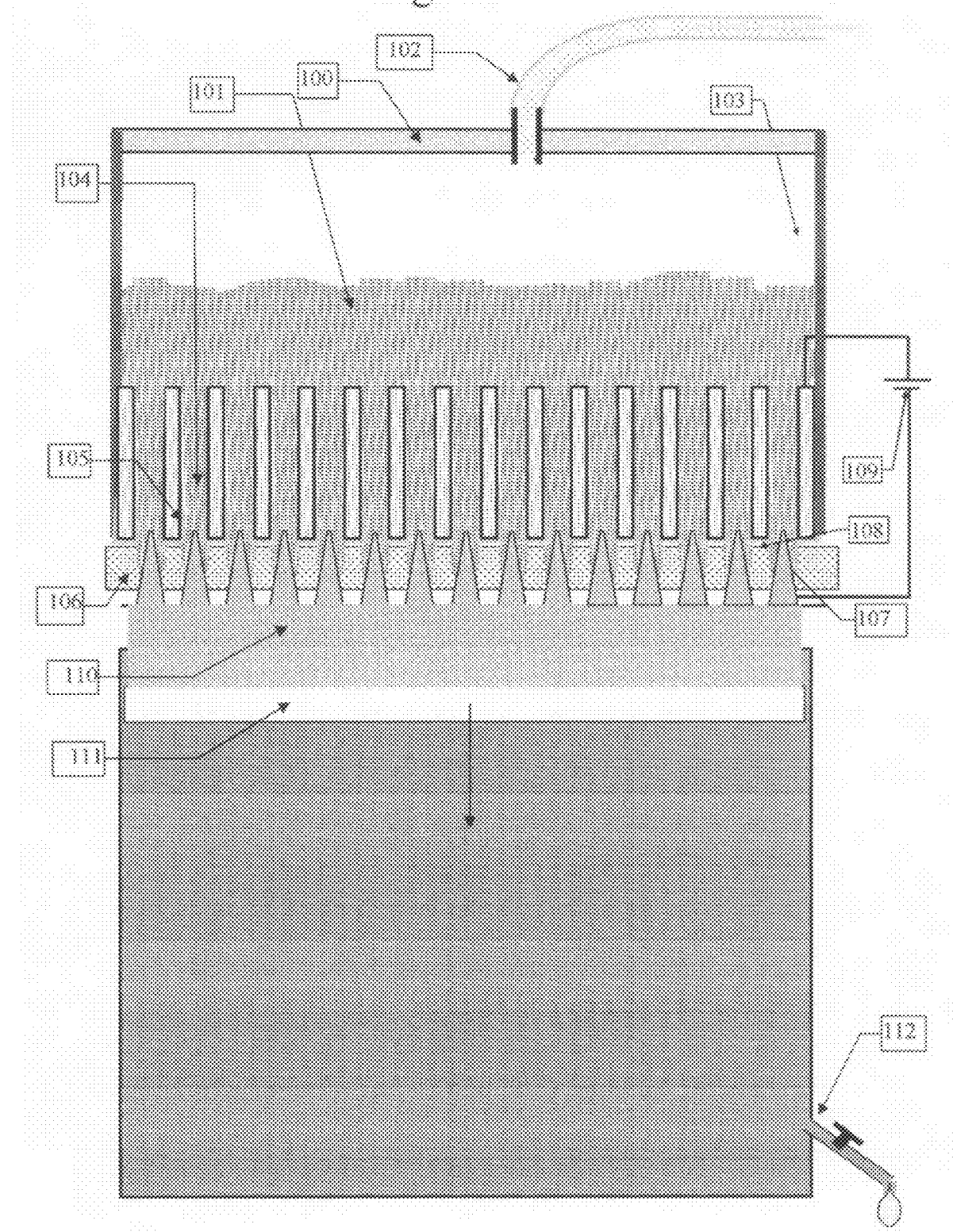

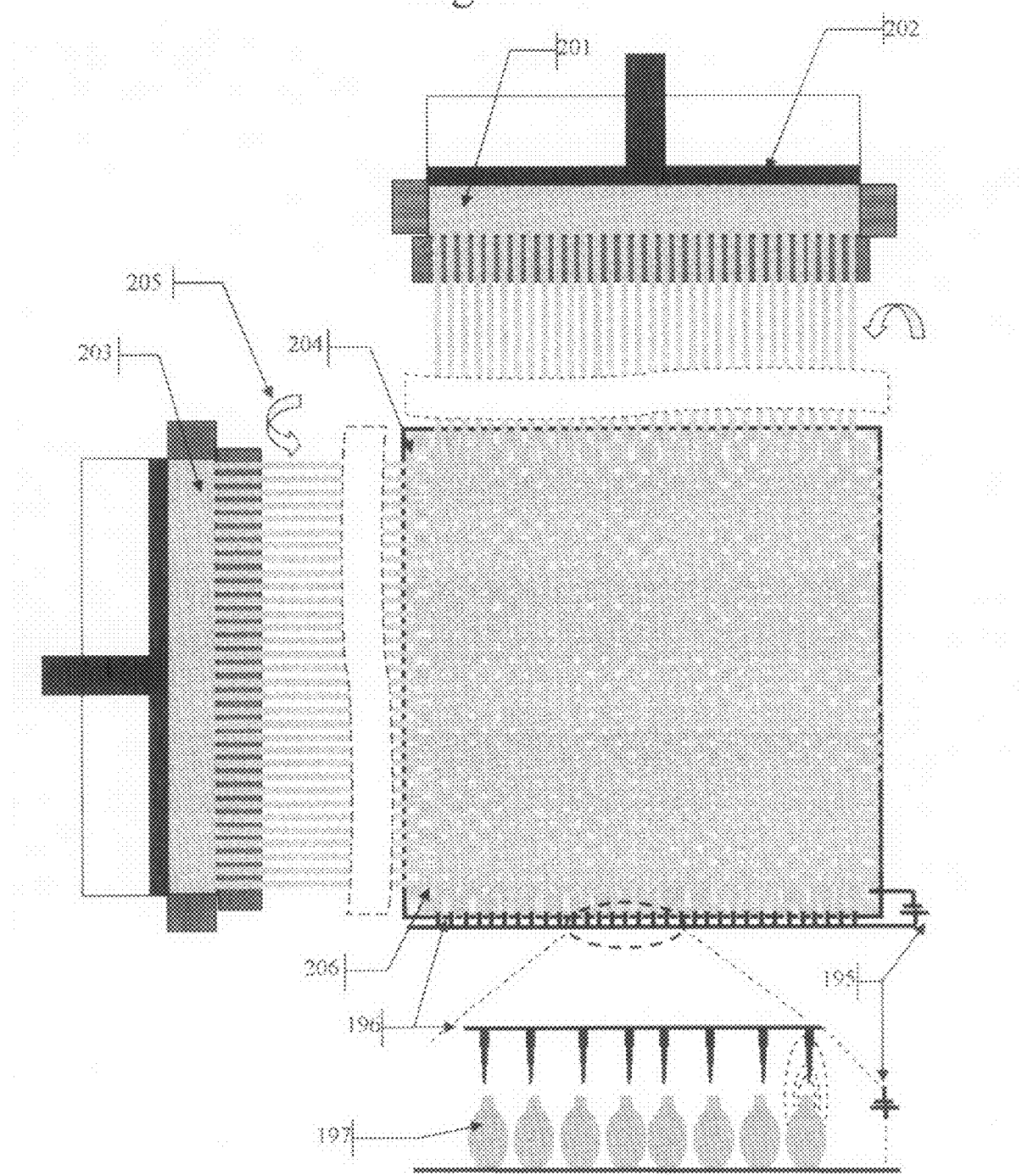

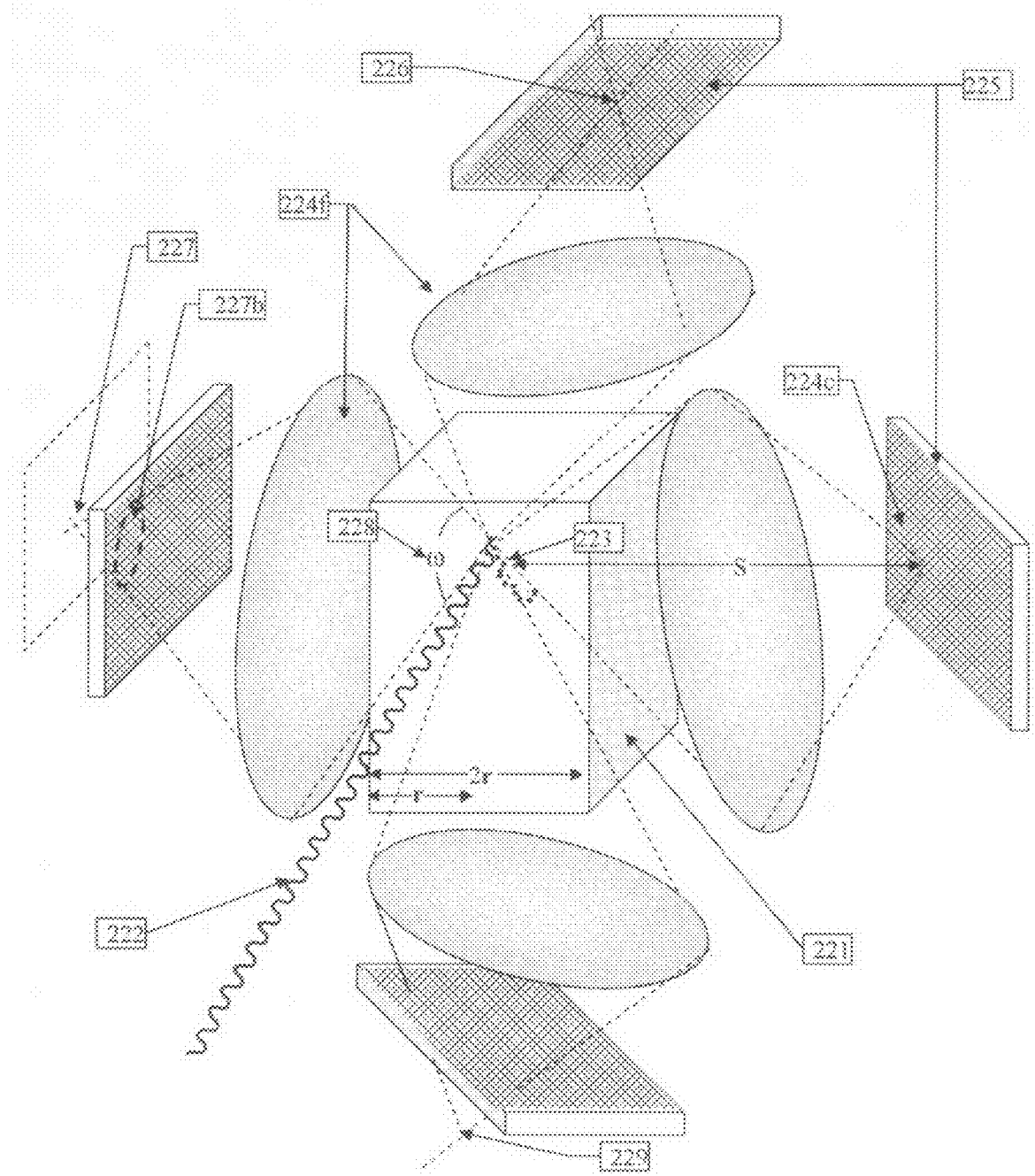

RADIATION CAMERAS

This patent application claims the benefit of the filing of U.S. Provisional Patent application Ser. No. 60/815,300 filed on Jun. 21, 2006 titled "Radiation Detector" and U.S. Provisional Patent application Ser. No. 60/874,788 filed on Dec. 14, 2006 titled "Radiation Camera" incorporated herein by reference.

FIELD OF THE INVENTION

This invention relates to Ionizing Radiation Detecting Cameras

RELEVANT PATENTS AND PUBLICATIONS

The patents below are incorporated in this application by reference.

U.S. Pat. No. 7,145,189 Photon amplification for image sensors Mouli et al.
U.S. Pat. No. 7,145,149 Flexible composite radiation detector Cooke et al.
U.S. Pat. No. 7,122,408 Photodoes with ultra-shallow junction for high quantum efficiency CMOS image sensor and method of formation Mouli et al.
U.S. Pat. No. 7,115,963 Circuitry for image sensors with avalanche photo-diodes Augusto et al.
U.S. Pat. No. 7,064,406 suppression of dark current in a photo-sensor for imaging
U.S. Pat. No. 7,057,187 Scintillator optical system and method of manufacture Yun, et al.
U.S. Pat. No. 7,045,833 Avalanche photodiodes with an impact ionization engineered multiplication region by Campbell et al.
U.S. Pat. No. 7,046,284 CMOS imaging system with low fixed pattern noise by Kozlowski, et al.
U.S. Pat. No. 6,943,390 High-gain photodetector with separated PN junction and rare earth doped region and a method of forming the same by Coffa, et al.
U.S. Pat. No. 6,921,909 Pixellated micro-columnar films scintillator by Nagarkar, et al.
U.S. Pat. No. 6,903,873 High omnidirectional reflector Joannopoulos, et al.
U.S. Pat. No. 6,906,559 Method and apparatus for gamma ray detection by Tümer; Tümay O.
U.S. Pat. No. 6,898,265 Scintillator arrays for radiation detectors and methods of manufacture by Mliner et al.
U.S. Pat. No. 6,892,011 Method and apparatus for fabrication of plastic fiber optic block materials and large flat panel displays by Walker, et al.
U.S. Pat. No. 6,881,959 Method and system for generating an image of the radiation density of a source of photons located in an object by Meng et al.
U.S. Pat. No. 6,879,657 Computed tomography system with integrated scatter detector by Hoffman David
U.S. Pat. No. 6,859,607 Optical fiber, optical fiber cable and radiation detecting system using such by Sugihara et al.
U.S. Pat. No. 6,858,159 Titanium-doped hafnium oxide scintillator and method of making the same, by Lyons et al.
U.S. Pat. No. 6,797,581 Avalanche photodiode for photon counting applications and method thereof by Vickers, James
U.S. Pat. No. 6,791,090 Compton deconvolution camera by Lin, et al.
U.S. Pat. No. 6,775,348 Fiber optic scintillator with optical gain for a computed tomography system, and method of manufacturing same by Hoffman et al.
U.S. Pat. No. 6,744,052 X-ray pixel detector device and fabrication method by Petersson, et al.
U.S. Pat. No. 6,738,551 Two-dimensional photonic crystal and multiplexer/demultiplexer using the same by Noda, et al.
U.S. Pat. No. 6,720,588 Avalanche photodiode for photon counting applications and method thereof by Vickers James
U.S. Pat. No. 6,704,391 B2 System and method of aligning scintillator crystalline structures for computed tomography imaging by Hoffman, et al.
U.S. Pat. No. 6,689,293 Crystalline rare-earth activated oxyorthosilicate phosphor by McClellan, et al.
U.S. Pat. No. 6,685,870 Method and apparatus for manufacturing photonic crystal element by Ukechi, et al.
U.S. Pat. No. 6,630,077 Terbium or Lutetium containing garnet phosphors and scintillators for detection of high energy radiation by Shiang, et al.
U.S. Pat. No. 6,624,945 Thin film filters using omnidirectional reflectors Fan, et al.
U.S. Pat. No. 6,603,911 Omnidirectional multilayer device for enhanced optical waveguiding Fink, et al.
U.S. Pat. No. 6,585,913 Scintillator compositions of alkali and rare-earth tungstates Lyons et al.
U.S. Pat. No. 6,573,813 All-dielectric coaxial waveguide with annular sections by Joannopoulos, et al.
U.S. Pat. No. 6,541,836 Semiconductor radiation detector with internal gain by Iwanczyk, et al.
U.S. Pat. No. 6,528,795 Compton scatter imaging instrument by Kurfess, et al.
U.S. Pat. No. 6,512,232 Method and apparatus for improving the sensitivity of a gamma camera by Pehl et al.
U.S. Pat. No. 6,498,828 B2 System and method of computer tomography imaging using a cerium doped lutetium orthosilicate scintillator by Jiang
U.S. Pat. No. 6,496,632 Method of fabricating photonic structures by Borrelli, et al.
U.S. Pat. No. 6,484,051 Coincident multiple Compton scatter nuclear medical imager by Daniel; James
U.S. Pat. No. 6,483,116 High performance ultraviolet imager for operation at room temperature by Kozlowski, et al.
U.S. Pat. No. 6,470,127 Photonic band-gap light-emitting fibers by Voevodkin, George
U.S. Pat. No. 6,469,682 Periodic dielectric structure of the three-dimensional photonic band gap type and method for its manufacture by de Maagt, et al.
U.S. Pat. No. 6,468,823 Fabrication of optical devices based on two dimensional photonic crystal structures and apparatus made thereby by Scherer et al.
U.S. Pat. No. 6,466,360 B2 Photonic crystal and its fabrication by Tokushima
U.S. Pat. No. 6,448,560 Method and apparatus for gamma ray detection by Tumer; Tumay O.
U.S. Pat. No. 6,417,504 Compact ultra-low noise high-bandwidth pixel amplifier for single-photon readout of photodetectors by Lester Kozlowski
U.S. Pat. No. 6,409,907 Electrochemical process for fabricating article by Braun, et al.
U.S. Pat. No. 6,420,711 Method and apparatus for radiation detection by Tumer; Tumay O.
U.S. Pat. No. 6,391,434 Composite scintillator material and method of manufacture by Duclos, Steven Jude U.S. Pat. No. 6,384,663 Circuit for high precision detection of the time of arrival of photons falling on single photon avalanche diodes by Cova, et al.

U.S. Pat. No. 6,384,400 High resolution and high luminance scintillator and radiation imager employing the same by Albagli, et al.

U.S. Pat. No. 6,358,854 Method to fabricate layered material compositions by Fleming, et al.

U.S. Pat. No. 6,358,441 Cubic garnet host with PR activator as a scintillator material by Duclos, et al.

U.S. Pat. No. 6,310,352 Radiation detection device by Gross et. al.

U.S. Pat. No. 6,262,830 Transparent metallo-dielectric photonic bandgap structure by Scalora; Michael U.S. Pat. No. 6,236,050 Method and apparatus for radiation detection by Tumer; Tumay O.

U.S. Pat. No. 6,323,492 Method for improving the spatial resolution of a compton camera by Clinthorne Neal U.S. Pat. No. 6,224,666 B1 Forging cylindrical alkali halide ingots into rectangular plates by Zwolinski et al.

U.S. Pat. No. 6,153,882 method and system for reading a data signal emitted by an active pixel in a sensor by Nygard U.S. Pat. No. 6,153,011 'Continuous Crystal Plate Growth Process and Apparatus', K. A. Pandelisev U.S. Pat. No. 6,093,347 Rare earth scintillator compositions by Lynch et al.

U.S. Pat. No. 6,090,674 Method of forming a hole in the sub quarter micron range by Hsieh, et al.

U.S. Pat. No. 6,080,989 Apparatus and methods for detecting and or imaging gamma radiation by Royle, et al.

U.S. Pat. No. 6,072,224 Monolithic x-ray image detector and method of manufacturing by Tyson, et al.

U.S. Pat. No. 6,071,339 'Continuous Crystal Plate Growth Process and Apparatus', K. A. Pandelisev U.S. Pat. No. 5,955,749 Light emitting device utilizing a periodic dielectric structure by Joannopoulos et al.

U.S. Pat. No. 5,880,475 Scintillation fiber type radiation detector by Oka et al.

U.S. Pat. No. 5,874,738 Scintillation crystal modules and methods of making the same by Scott R. Huth U.S. Pat. No. 5,864,141 Compact high resolution gamma ray imaging for scintimammography and other medical diagostic applications by Majewski et al.

U.S. Pat. No. 5,841,141 Image reconstruction from V projections acquired by Compton camera Gullberg et al.

U.S. Pat. No. 5,784,400 Resonant cavities employing two dimensionally periodic dielectric materials Joannopoulos et al.

U.S. Pat. No. 5,772,905 Nanoimprint Technology by S. Y. Chou

U.S. Pat. No. 5,567,944 Compton camera for in vivo medical imaging of radiopharmaceuticals by Rohe, et al.

U.S. Pat. No. 5,445,846 X-ray imaging tube by Atsuya Yoshida

U.S. Pat. No. 5,391,878 Multiplexed fiber readout of scintillator arrays by Michael D. Petroff U.S. Pat. No. 5,334,839 Position sensitive radiation detector Anderson, et al.

U.S. Pat. No. 5,319,189 X-ray image intensifier tube having a photocathode and a scintillator screen positioned on a microchannel array by Beauvais et al.

U.S. Pat. No. 5,213,712 Lanthanum lutetium oxide phosphor with cerium luminescence by Dole; Stephen L.

U.S. Pat. No. 5,121,462 Process for production of scintillating optical fibers and optical fibers obtained Fabre, et al.

U.S. Pat. No. 5,057,692 High speed, radiation tolerant, CT scintillator system employing garnet structure scintillators by Greskovich et al.

U.S. Pat. No. 4,985,633 Scintillator with alveolate structured substrate Vieux et al.

U.S. Pat. No. 4,940,901 X-ray imaging device by Henry et al.

U.S. Pat. No. 4,803,366 Input screen scintillator for a radiological image intensifier tube and a method of manufacturing such a scintillator by Rougeot et al.

U.S. Pat. No. 4,421,671 Rare earth doped yttria-gadolinia ceramic scintillators by Cusano, et al.

U.S. Pat. No. 4,466,929 Preparation of Yttria Gadolinia ceramic scintillators by vacuum hot-pressing by Greskovich, et al.

US 20060231742 Method and apparatus for providing non-linear, passive quenching of avalanche currents in Geiger-mode avalanche photodiodes by Forsyth; Keith W.

US 2006/0202129 Integrated circuit comprising an array of single photon avalanche diodes by Niclass; Cristiano; et al.

US 20060192086 Integrated imager circuit comprising a monolithic array of single photon avalanche diodes by Niclass; Christiano; et al.

US 20060165984 Method of producing 3-d photonic crystal fibers by Miguez; Hernan; et al.

US 20060131480 by Charbon; Edoardo; et al. Method for controlling the spectral response of light sensitive elements, and image sensor with a controllable spectral response US20050012033 Digital photon-counting geiger-mode avalanche photodiode solid-state monolithic intensity imaging focal-plane with scalable readout circuitry by Stern, Alvin et al.

US 2005/0265675 Method for producing parallel arrays of fibers by Welker, David J et al.

US2005/0207713 Subwavelength-diameter silica wires for low-loss optical waveguiding Mazur, Eric US 2005/0161611 Two-dimensional ionising particle detector by Disdier, Laurent et al.

US 2005/0152417 Light emitting device with an omnidirectional photonic crystal Lin, Chung-Hsiang US 2005/0151145 Light emitting device with a photonic crystal by Lin, Chung-Hsiang; et al.

US 2005/0133725 CT detector array having non-pixelated scintillator array by Jiang, Haochuan et al.

US 2005/0126470 Template and methods for forming photonic crystals by Herman, Gregory S. et al.

US 2005/0121470 Method of utilizing MEMS based devices to produce electrospun fibers for commercial, industrial and medical use by Bango, Joseph J.; et al.

US 2005/0087724 Transparent polycrystalline ceramic scintillators and methods of preparing the same by Young Kwan Kim et al.

US 2005/0082484 Scintillator compositions and related processes and articles of manufacture by Srivastava et al.

US 2004/0267205 microneedles and method of manufacture thereof Stemme Goran et al.

US 2004/0238747 Scintillator crystal method for making use thereof by Dorenbos et al.

US 2004/0218712 CT detector array having non-pixilated scintillator array by Jiang, Haochuan et al.

US 2004/0079890 Devices for imaging radionuclide emissions by Fraser, George William; et al.

US 2004/0031435 Method for fabricating optical fiber preform using extrusion die by Park, Yong US 2003/0183772 Thick scintillation plate with internal light collimation by Schreiner, et al US 2003/0168756 Electrospinning of polymer and mesoporous composite fiber by Balkus, Kenneth J. JR. et al.

OTHER PUBLICATIONS

A Proposed gamma Camera by R. W. Todd, et al Nature, 251 (1974) 132.

A Si/CdTe Semiconductor Compton Camera—Shin Watanabe et al. April 2005 SLAC-PUB-11144 Compton Camera for Low Energy Gamma Ray Imaging in Nuclear Medicine Applications—James Walter LeBlanc, Development of an advanced Compton camera with gaseous TPC and scintillator—A. Takada et al "arXiv":astro-ph/0412047 v 1 2 Dec. 2004

First Coincidences in Pre-Clinical Compton Camera Prototype for Medical Imaging—A. Studen et al. Preprint submitted to Elsevier Science, 17 Sep. 2004

Event reconstruction for Advanced Compton telescopes, A. Zoglauer et al. public.lanl.gov/mkippen/actsim/papers/ZOGLAUER_HEAD2004.pdf Intrinsic eigenstate spectrum of planar multilayer stacks of two-dimensional photonic crystals by K. H. Dridi, 19 May 2003/Vol. 11, No. 10/OPTICS EXPRESS 1158

Photonic Crystal Scintillating Fibers, by George Voevodkin, Intelligent Optical Systems, Inc., Spontaneous emission of organic molecules embedded in a photonic crystal, E. P. Petrov et al. Phys. Rev. Lett., Vol. 81, pp. 77-80, 1998.

"Photonic band structures", E. Yablonovich, J. Mod. Opt., Vol. 41, pp. 171-404, 1994

"Block-iterative frequency-domain methods for Maxwell's equations in a planewave basis," Johnson et al., Optics Express 8, no. 3, 173-190 (2001), Photonic crystal design tools—Photon Design, 34 Leopold Street, Oxford OX4 1TW, UK $LaBr_3:Cr^{3+}$ scintillator for gamma ray spectroscopy—K. S. Shah et al. LBNL 51793, "Inhibited spontaneous emission in solid-state physics and electronics," E. Yablonovitch Phys. Rev. Lett. 58, 2059-2062 (1987).

S. John, "Strong localization of photons in certain disordered dielectric superlattices," Phys. Rev. Lett. 58, 2486-2489 (1987).

J. D. Joannopoulos, et al "*Photonic Crystals*" (Princeton U. Press, Princeton, N.J., 1995).

"Potential for SPECT cameras utilizing photodiode readout of scintillator crystals W. W. Moses et al S.E. Life Science Division, Lawrence Berkeley Laboratory, Berkeley, Calif.

"Existence of a photonic gap in periodic dielectric structures," K. M. Ho, et al. Phys. Rev. Lett. 65, 3152-3155 (1990).

"Photonic band structure: the face-centered-cubic case employing nonspherical atoms," E. Yablonovitch, et al. Phys. Rev. Lett. 67, 2295-2298 (1991).

"Three-dimensionally periodic dielectric layered structure with omnidirectional photonic band gap," S. G. Johnson et al., Appl. Phys. Lett. 77, 3490-3492 (2000).

"Full three-dimensional photonic bandgap crystals at near-infrared wavelengths," S. Noda, et al. Science 289, 604-606 (2000).

"Drilled alternating-layer structure for three-dimensional photonic crystals with a full band gap," E. Kuramochi, et al J. Vac. Sci. Technol. B 18, 3510-3513 (2000). (C) 2003 OSA 19 May 2003/Vol. 11, No. 10/Optics Express 1156

"A new fabrication technique for photonic crystals: nanolithography combined with alternating-layer deposition," S. Kawakami, et al. Opt. Quantum Electron. 34, 53-61 (2002).

"Formation of nanofiber crossbars in electrospinning" by Zussman et al. Appl. Physics letters. Vol. 82 No. 6

"Linear waveguides in photonic-crystal slabs," S. G. Johnson, et al., Phys. Rev. B. 62, 8212-8222 (2000).

"A dielectric omnidirectional reflector," Y. Fink et al, Science 282, 1679-1682 (1998).

"Omnidirectional reflection from a one-dimensional photonic crystal," J. N.Winn et al Opt. Lett. 23, 1573-1575 (1998).

"Dielectric omnidirectional visible reflector," M. Deopura et al. Opt. Lett. 26, 1197-1199 (2001).

"An all-dielectric coaxial waveguide," M. Ibanescu, et al. Science 289, 415-419 (2000).

Low-loss asymptotically single-mode propagation in large-core OmniGuide fibers,"—S. G. Johnson et al. Opt. Express 9, 748 (2001), "Mode density inside an omnidirectional mirror is heavily directional but not small," C. Hooijer et al. Opt. Lett. 25, 1666-1668 (2000).

"Block-iterative frequency-domain methods for Maxwell's equations in a planewave basis," S. G. Johnson et al. Opt. Express 8, 173 (2001), http://www.opticsexpress.org/abstract.cfm?URI=OPEX-8-3-173

"Omnidirectional absolute band gaps in two-dimensional photonic crystals," Z. Y. Li et al. Phys. Rev. B. 64, 153108-153112 (2001).

"Wavelength-scalable hollow optical fibres with large photonic bandgaps for $CO_2$ laser transmission," Temelkuran et al. Nature 420, 650-653 (2002).

Experimental efforts and results in Finding new heavy scintillators; by Stephen E. Derenzo and William W. Moses, Lawrence Berkeley Laboratory Report No. LBL-33295, 1992 http://breast.lbl.gov/~wwwinstr/publications/Papers/HvyScint.pdf Large Area Avalanche Photodiodes Challenge PMTs—B. Koren and M. Szawlowski, Advanced Photonix, Inc., Camarillo, Calif.

Recent Advances in Avalanche Photodiodes by J. Campbell et al IEEE Journal of selected topics in quantum electronics VOL. 10, NO. 4, July/August 2004 p. 777

Turning Crystal Growth on Its Side: A Revolutionary New Crystal Technique for Next-Generation Photolithography Lens Materials—A. Pandelisev, Single Crystal Technologies, www.sct-llc.com Development of a Novel Ultra-fast Scintillator with MQW Structure by K. Shibuya et al. in Ionizing Radiation Sensors, 2004

Gadolinium-Loaded Plastic and Rubber Scintillators by Zane W. Bell, Lockheed Martin Energy Systems, Inc.

High Refractive Index Polymer Coatings for Optoelectronics Applications—Brewer Science, Inc., 2401 Brewer Dr., Rolla, Mo., 65401 USA Imprint Lithography with 25-Nanometer Resolution—Stephen Y. Chou et al. Science, 272, 85, 1996 Laser-Assisted Direct Imprint—Chou et al Nature 2002, 417, 835-837

Scintillating Photonic Crystal for Medical imaging—Intelligent Optical Systems Inc.—www.intopsys.com Self-Collimating Phenomena in Photonic Crystals, Hideo Kosaka, et al., Applied Physics Letters, vol. 74, No. 9, Mar. 1, 1999, pp. 1212-1214

"Enhancement and Suppression of Thermal Emission by a Three-Dimensional Photonic Crystal," Lin, et al., Rapid Communications, Physical Review B 62 4, Jul. 15, 2000, R2243

Development of a Novel Ultra-fast Scintillator with MQW Structure by K. Shibuya et al. in Ionizing Radiation Sensors, 2004

Crystal Fiber technology; by Broeng et al. Technical University of Denmark www.crystal-fibre.com/publications/broeng_dopsnyt0200.pdf Silica Aerogels—M. Ayers, http://eetd.lbl.gov/ECS/aerogels/satoc.htm All the patents, patent applications and documents cited above are incorporated in this application by reference.

BACKGROUND

Gamma rays such as, the 140 keV γ-rays emitted from technetium-99$^m$ or the 511 keV γ-rays emitted following the annihilation of positrons emitted from fluorine-18, are usually detected by scintillation crystal detectors such as NaI(Tl), CsI(Tl), $Bi_4GeO_4$ or $CdWO_4$ scintillators or semiconductor detectors such as Ge or CdZnTe. The γ rays interact with the atoms of the crystal through the Photo-electric or Compton effects and Pair generation processes. Table 1 gives the energy and atomic number dependency of the 3 processes.

TABLE 1

| Type of Interaction | Energy dependence | Z dependence ($cm^2$/atom) | Z dependence ($cm^2$/g) |
|---|---|---|---|
| Photoelectric | $E^{-3.5}$ | $Z^{4\ to\ 5}$ | $Z^{3\ to\ 4}$ |
| Compton | $E^{-0.5\ to\ -1}$ | Z | ~Z independent |
| Pair production | E to ln E | $Z^2$ | Z |

The energy transfer from a hard photon (hv) to an atomic electron (e) in the photoelectric effect is given by $E_e = hv - E_b$ where $E_b$ is the binding energy of the electrons of the stopping material. The atom excited by the stripping of one of its electrons, returns to its stable state by emitting one or more X-rays whose energies are determined by its discrete energy levels and denoted accordingly as the M,L or K X-rays.

In the Compton effect which is effective at medium energies and low Z elements, the incoming photons are scattered by the free electrons of the stopping material, imparting them part of their energy. The energy of the scattered gamma ray (1) when the free electron is considered to be at rest, is given by $$E_1 = hv' = m_ec^2/[1 + \cos\theta + (m_ec^2/E_0)]$$

$$\text{or } \cos\theta = 1 - (m_ec^2/E_e) + (m_ec^2/E_1 + E_e)$$

the recoil electron's energy is given by $$E_e = hv' = [(hv)^2/m_ec^2(1-\cos\theta)]/[1 + (hv/m_ec^2)(1-\cos\theta)]$$

The maximal energy of the recoil electron is therefore at $E_e\max = E/(1+m_ec^2/2E)$ The recoil angle φ of the electron, relative to the direction of the impinging gamma ray, is given by $$\cot\phi = 1 + (hv/m_ec^2)\tan(\theta/2)$$

It is important to note that following the momentum equalities, the incoming gamma ray, the scattered gamma ray and the recoil electron are all on the same plane.

The differential cross section of the Compton Scattering for unpolarized photons is given by the Klein-Nishina equation:

$$[d\sigma/d\Omega] = (r_e^2/2)(v'/v)^2[(v/v') + (v'/v) - \sin^2\theta]$$

where $r_e = (e^2/m_ec^2)$ is the "classical" radius of the electron equal to $2.82\ 10^{-13}$ cm This equation which assumes scattering by free electrons, has to be modified by a form factor S(k,k') at energies where the binding energies of the electrons become important, as compared with the energy of the gamma ray, causing the angular distribution in the forward direction to be suppressed. In the pair production effect the two 511 Kev hard photons generated by the annihilation of the positron, again interact with the stopping material through the Compton or Photoelectric effects and cause ejection of electrons and their eventual absorption, as explained above.

The electrons so produced by the three processes are stopped in the crystal producing low energy photons in the visible range, along their Track. If the crystal is transparent to these photons, they can emerge from the crystal and be detected by a photon detector such as a photomultiplier tube or a photo-diode.

As described above a gamma ray will interact with a scintillator through one or several of the Photoelectric, Compton or Pair production processes. At the end of each of the processes the energy is transmitted to an electron that spends this energy exciting successive atoms of the material or radiating it (Cerenkov or Bremstrahlung), until having spent all its energy, it stops.

Thus there is a one-to-one correspondence between the cumulative lengths of the Tracks of the knocked-off electrons in the cascade of interactions between a gamma ray and the specific material. Thus for example a gamma ray with an energy above 1 Mev will generate through pair production two gamma rays, which may each knock-off an electron, scatter and transmit their residual energy to a photo-electron and an X-ray which in turn may transfer its energy to an electron. In this cascade the energy of the primary gamma ray is obtained by adding the energies corresponding to the respective lengths of the 6 electron Tracks. Thus measuring accurately the ranges of the knocked-off electrons produced in a cascade of interactions determines unequivocally the energy of the primary gamma ray.

The underlying principles of Compton Cameras, namely that knowing the energy of the scattered gamma ray $E_1$, the position of the subsequent (usually photo-electric) event and the energy of the recoil electron and the position of its Track, enable to derive the direction of the incoming gamma ray, are self evident and follow from the Compton effect equations. The practical obstacles are the measurement of the electron's position before the scattering and the direction of its recoil after interaction with the incoming gamma ray. Numerous variations of two-detector geometries and schemes have been proposed, that consist in detecting the position of the gamma-electron interaction position with one detector and that of the subsequent photoelectric event with the second detector, in addition to their energies, in order to determine the direction of the incoming gamma ray on the "scattering plane". As the absolute direction of the "scattering plane" in space remains unknown, the absolute direction of the incoming gamma ray remains ambiguous and within a "cone" whose aperture is the scattered gamma ray's scattering angle relative to the incoming gamma ray in space.

An additional uncertainty as to the direction of the recoil electron arises from the fact that the "free" electron is not at rest. If the electron's "motion" is taken into account, its recoil direction will not be exactly in the "scattering plane" but slightly out of it. This effect is sometimes referred to as the "doppler brodening" of the recoil electron's direction.

Patent application of the author US 20060202125 describes in great detail the construction of a Compton Camera able to measure both the recoil electron and the scattered gamma ray using a 3D array of plastic scintillator fibers as a "scatterer" and a higher density scintillator array as an "absorber". The same application also describes several methods of fabricating the high spatial resolution fiber arrays.

Photonic Bandgap Crystals (hereinafter PBC) are periodically structured materials characterized by ranges of frequency in which light cannot propagate through the structure. A PBC is generally composed of at least two materials differing in their refraction indexes, whose periodicity is approximately half the wavelength of light unable to propagate through the lattice. A complete photonic band gap is a range of frequencies in which there are no real solutions of Maxwell's equations. The theoretical treatment of the interaction of such periodic materials with electromagnetic radiation is analogous to the treatment in solid-state physics of the interaction of atomic lattices with electrons, showing the existence of distinct energy bands separated by gaps.

Radiation detectors are used in several healthcare instruments to map the radiation emitted by the body of a patient which has previously been injected with a radionuclide. Gamma Cameras endeavor to detect the location of the radiating source, by collimating the incoming radiation and then detecting the points of interaction of the collimated gamma rays with the radiation detector. Straight tubular collimators give a map of the radionuclides in the body of the patient, while pinhole collimators give the emission intensity coming from the focal point of the collimator, at the expense of blocking anything else.

High resolution collimators immensely reduce the radiation intensity detected by the gamma camera and greatly increase the time needed for mapping the radionuclide distribution with acceptable spatial resolutions. Thus eliminating the collimator immediately increase the counting rate by several orders of magnitude for the same amount of radioactivity injected.

Gamma cameras with straight tubular collimators give a 2D projection of the radionuclide distribution, on the surface of the camera and cannot give depth information. SPECT (Single Photon Emission Computer Tomography) consists in rotating the Gamma Camera, to obtain several 2D maps from multiple directions and reconstruct the distribution along the third dimension, thus enabling to obtain a Tomographical image of the radionuclide distribution. Obviously dispensing with the collimator in SPECT is also of great benefit, reducing the scanning time or the amount of radionuclide injected or both.

PET (Photon Emission Tomography) consists in injecting the patient with a positron emitting radionuclide and detecting the annihilation pair of 511 keV gamma rays emitted in opposite directions, using two radiation detectors in time coincidence, thus determining a line that crosses the position of the radionuclide source. Detecting a multiplicity of such pairs of 511 keV gamma rays gives lines that criss-cross the radiation source and enables to determine its position. The accuracy of the line crossing the radionuclide is determined both by the spatial extensions of the detectors and the exact location within the detector of the interacting gamma ray. Thus there is a need for a high efficiency and high spatial resolution gamma detector.

Cross section images of a body (slices) can be imaged by Computerized Tomography (CT) consisting in irradiating the body with intense X-rays from all 180° or more angles, detecting the unattenuated X rays that traversed the body using radiation detectors, and reconstructing a density map of the slice of the body traversed by the X rays, that is consistent with the integral absorption data obtained from all angles. The spatial resolution of such density images and the thickness of the slices, are dependent, inter alia, also on the spatial resolution of the radiation detectors. Multiple adjacent slices require thin adjacent detectors with minimal separating walls. A high spatial resolution continuous radiation detector therefore enables imaging a continuous multiplicity of thin slices and thus obtaining a continuous volumetric image.

Radioisotope imaging enables to follow the take-up and clearance of molecules tagged with the specific radio-isotope, by the various organs and thus assess their function. X-Ray or Computerized Tomography (CT) on the other hand image the density of the organs with high spatial resolution and give an image of the anatomy. Thus there is a great diagnostic advantage of combining the two modes; the Functional Imaging that SPECT or PET offer with the anatomical image obtained by CT in an hybrid instrument SPECT/CT or PET/CT.

Small animal imaging systems combine the CT, SPECT, PET, X-Ray and Optical fluorescence technologies on a reduced sizes, to follow suitably tagged molecular probes, to investigate drugs and pharmaceuticals on small animals.

SUMMARY OF THE INVENTION

Throughout this patent application the term "fiber" will be used to describe long and thin solid scintillation materials optically transparent to their scintillation wavelengths where their substantially straight length is much larger than their cross-section and where said cross-section may be circular, rectangular or of any closed shape. Throughout this patent application the term Gamma rays ought to be interpreted to include X-Rays.

As is well known the Compton equations enable to find the absolute direction $\theta$ in 3D space of an incoming gamma ray interacting with a radiation detector by measuring the directions of the scattered gamma ray and the knocked-off electron, in addition to their energies. Measuring only the energies of the scattered gamma ray and the knocked-off electron and the direction of the scattered gamma ray does not determine the plane of interaction; the incoming gamma ray may be in a multiplicity of planes all inclined by $\theta$ in respect to the scattered gamma ray, leaving what is called a "Cone of ambiguity".

The kinematics of the Photoelectric effect too, show the conditions under which, the direction of the incoming gamma ray may be found. This happens when the material stopping the Gamma ray is of very low Z, so that knocking-off an electron from the inner shells of the nuclei constituting the material, doesn't "cost" much energy as compared with that of the Gamma ray.

Methods for determining the direction of the knocked-off electron with very high precision are described in U.S. application Ser. No. 11/371,573 by the author and is incorporated in this application by reference.

This invention concentrates on the specific ways and methods of imaging the Tracks of electrons whether created in a Compton or a Photoelectric effect interaction, with the highest precision. Imaging the Track of the knocked-off electron, enables to find specifically the point of interaction with the impinging gamma ray, its energy and its direction. The invention also describes the Cameras incorporating the results of such Track Imagers, including their application in Medical imaging systems.

In principle we show two ways to image the electron Tracks. One way is to structure the detector as an array of scintillation fibers and detect the scintillations streaming along the fibers with photo-detector cameras. A second, radically different way to image an electron Track formed within a scintillator is to take a picture of it. Both methods are elaborated below.

An electron Track crossing an array of fibers will cause scintillations in the fibers, while the number of fibers crossed, which is a function of the fiber diameter, will determine the accuracy of the direction of the beginning of the electron Track. Thus, the thinner the fibers, the better the accuracy of the measured direction will be.

A fiber crossed by an electron Track, is identified by the scintillation photons that propagate along the fiber to its end and detected by a photo-detector, preferably by a CMOS camera which is faster than a CCD camera. The positions of the crossing points of the electron Track may be determined by structuring the fiber array as a woodpile of orthogonal planes of fibers.

The best accuracy is achieved when the fiber array is structured as a Photonic Bandgap Crystal, with the distances between the fibers of the order of ½ wavelength of the scintillator emission spectrum, which for a plastic scintillator means that the fibers thicknesses and inter-fiber distances ought to be of the order of $0.2\mu$. In this case the Bandgap in the lateral plane will force the scintillation photons within the Bandgap to propagate only along the fiber.

It is important to note that unlike Photonic Bandgap Crystals structured to stop or guide light coming from outside the structure or "cavities" within the structure, Photonic Bandgap Crystal Scintillators (hereinafter PBCS) are structured to guide the scintillations generated internally from within the elements of the PBCS. This is an important distinction, as for example a wood-pile structure of bars or fibers known to have a complete bandgap in 3D, in respect to light coming from outside the structure, will let the scintillations generated inside the fibers to propagate within the fibers and get out of the structure.

Nonetheless, even outside the "Photonic Bandgap Crystal" regime, when the fiber and inter-fiber dimensions are larger than those conducive to Bandgaps, critical angle reflections still cause a substantial portion of the scintillation photons to propagate within and along the fiber to its end, thus enabling to determine its 2D position. In a plastic scintiflator fiber surrounded by air, ~41% of the photons will propagate along the fiber to its end, by critical angle reflection. Critical angle reflections in fibers constituted by $LaBr_3$ nanocrystals having a refractive index of 1.9, would cause 47% of the scintillation photons to propagate to the ends. The rest of the photons will exit the fiber, scatter mainly from the nearby fibers, and disperse in the lattice.

Thus the coordinates of the Track in 3 D may be obtained by identifying the fibers emitting photons in a 3D fiber array consisting of a woodpile like of mutually orthogonal 2D fiber arrays. The energy of the electron may be obtained by adding the number of photons exiting all the fiber traversed by the electron.

The major elements contributing to a spread in the number of photoelectrons generated by an electron of a given energy are the selective absorption of the scintillation photons generated in the fiber until they reach the photodetector and the process of translating the photons of different wavelength into photo-electrons by the photo-detector which also has a spectral dependence and a geometrical nonuniformity. These factors change from one fiber to another and from one pixel of the photodetector to another. Calibrating the response of each fiber as a function of its position and its corresponding photodetector pixel could partially alleviate this problem.

However the wide spectrum of the scintillation photons impinging the photocathodes and the photodetector that also have wavelength dependent quantum efficiencies, cause an additional spread in the number of photoelectrons emitted.

Another problem that deteriorates the energy resolution at low gamma energies when the number of scintillation photons is low, stems from the noise contributed by the photodetector. When the number of photons is very low, the thermal Johnson noise becomes very important and in some cases dominant; it is therefore necessary to amplify the photoelectron pulse by using Avalanche Photo-Detectors (APD).

These additional problems of scintillator detectors cause that the actual energy resolutions attained to be much worst than the resolutions that would result from only the statistical fluctuations in the number of photons emitted per a given deposit of energy.

We therefore propose a new way to determine the energy of a gamma ray, that doesn't follow the route of gamma-to-electron-to-excitons-to-photons-to-photoelectrons and therefore avoids the cumulative variances associated with this route. What we propose is to measure the Range of the electron which has a one-to-one relationship with the energy of the electron.

At energies below 2.5 MeV and low Z materials such as a plastic scintillator, the Range of an electron in $g/cm^2$ units is given by the empirical equation $R=0.412E^{1.27-0.0954 \ln E}$ where E is the kinetic energy of the electron in units of MeV. The CDSA (Continuous-Slowing-Down Approximation) range as a function of energy for the different elements and compounds are tabulated in the ESTAR tables of NIST (National Institute of Science and Technology).

In practice only gamma rays interacting with a detector through the photoelectric effect will generate a single electron Track followed by a additional short Tracks in its proximity caused by the absorption of the characteristic X-rays. The characteristic X-rays are a constant of the material. The energy of the electron given by its Track length added to the characteristic X-ray energies give the total energy of the impinging gamma ray.

Measuring the Track range presents some difficulties at the end of the track. Towards the end of the Track when the electron has lost most of its energy, subsequent coulomb interactions cause large deviations from the original direction and the electron starts to wiggle in all directions and at the end comes to rest in a rapid succession of interactions in all directions; visually the end of the track looks like a pear shaped agglomeration of dots. As this scenario happens at the end of every track independently of its initial energy and it is next to impossible to find the actual "length" of these successive interactions, it is more practical to assign to the integral number of interactions at the very end, a given energy-loss figure. Such integral number of interactions occurring at the end of each and every Track may be defined by a pattern recognition algorithm that follows the successive deviations towards the end of a Track and defines a cut-off process as a function of increased deviations, and assigns a given "end-of-Track-energy-loss" figure to the rest of the Track.

In a Compton effect scattering the energy of the primary gamma ray equals the cumulative energies imparted to the electrons in a cascade of various processes. However as the above relation between the energy E and the range R of the electron is not linear, the Ranges are not additive, in the sense that the Ranges corresponding to given energies, cannot be added to obtain the energy corresponding the to the cumulative energies of electrons engendering said Tracks.

$$E(\Sigma r) \neq \Sigma E(r)$$

We therefore have to identify all the Tracks engendered by a gamma ray interacting with a detector, find the corresponding energies and then add them in order to find the aggregate energy.

What we need for determining the length of the electron's Track, which wiggles around, is an indication of the points where the electron slows down by spending the "excitation energy" needed to excite a molecule of the material. At such points the electron knocks-off an electron out one of the orbits of a molecule of the scintillator, the exciton so formed travels a short distance and either collapses or excites one of the "activator" molecules; the excited activator molecules then generate photons in the visible range by dropping back to their ground state. The process of producing scintillation photons is very inefficient; for example in a plastic scintillator although the electron loses 67 eV in an excitation process, this energy is at the end translated into one photon of 3 eV (380 nm); a 4.5% conversion ratio. 95.5% of the energy is spent in other processes.

Obviously, the Range of the electron which has a one-to-one relationship with the aggregate number of excitations that cause the electron to loose its entire energy, is a better measure of the energy than the aggregate number of scintillation photons produced and has a lesser variance.

However we can use the scintillation photon(s) emitted in an excitation as the indication of the slowing-down process. Unlike in a conventional scintillation detector, the absolute number of scintillation photons generated in the process is unimportant for the purpose of determining position only. What is needed is only the coordinates of the position where the electron lost energy.

The full range of the electron in the detector may be determined by dividing the detector in actual or virtual voxels and determining the specific voxels where a slowing down interaction occurred. At low gamma ray energies where slowing down by Cerenkov and Brehmstrahlung radiation effects can be neglected, such interactions (Photo-electric, Compton and Pair production) cause slowing down by spending an excitation energy that either dislocates an electron from a molecular orbit or by transporting it from the valence band to the conduction band in a semiconductor. In a scintillator the dislocated electron eventually causes the emission of a stream of photons that may be detected by a photo-detector such as a photomultiplier or a photo-diode. In a semiconductor the excited electron and the "hole" left behind may be swept by an electric field between two electrodes and detected electronically. In both materials, scintillators or semiconductor detectors, if the dimensions of a voxel of the detector are such that the stopping power of the material causes at least one detectable slowing down interaction, the length of the electron Track traversing a detector may be determined, by adding the distances between adjacent voxels where successive interactions occurred. Obviously the accuracy of the electron Track's length is a function of the voxel size; the minimal size being such that at least one photon may be detected in it, indicating that an slowing down interaction has occurred.

When the number of photons generated at an interaction point is above the noise level of the photo-detector, such a group of photons above a certain discrimination level, constitute the needed "signal" that indicate that an interaction has occurred. In case that only a very small number of photons are generated, they can be detected by silicon avalanche photo-detectors that have 80% photoelectric conversion efficiencies and work in a "Geiger" mode, producing a constant amplitude signal before the avalanche is quenched.

In a Compton effect interaction, the accuracy needed for measuring the direction of the knocked-off electron is a function of the energy of the gamma ray, as the higher this energy, the longer is the Track of the knocked-off electron and its less perturbed beginning; consequently its initial direction is easier to establish. The length of this Track and specifically its beginning, before the electron after losing much of its energy, starts to wiggle, is also an inverse function of the atomic number (Z) of the scattering detector (hereinafter the scatterer) and its density. Solid scintillators separated by very low refractive index and very low density materials such as air or aerogels enable to lengthen the electron Track's effective length by increasing the distances between the solid fibers.

This strategy while enabling to increase the accuracy of the measured initial direction of the electron Track, reduces the absorption efficiency of the fiber array. The absorption efficiency of a 3D fiber array composed of two interlaced orthogonal fiber arrays may be increased by 50% by inserting a third fiber array orthogonal to the other two arrays, between the interstices of these arrays. The measured direction in space too is improved by the introduction of the third array. However fabricating a fiber composed out of three 2D mutually orthogonal 2D arrays is an extremely challenging task.

As the Compton equations show, the direction of a gamma ray may be found with great accuracy and without any ambiguity, by finding the energies and directions of the recoil electron and the scattered gamma ray. While finding the energy and direction of the recoil electron with great accuracy requires a 3D fiber structure as described above, the direction and energy of the scattered gamma ray may be measured both with the same kind of 3D fiber structure or with a conventional pixellated detector, without a 3D structure, as the distance at which the "absorber" is placed away from the "scatterer" is a matter of choice and the variance in the depth of interaction within this detector does not change much this distance.

The second detector, the "absorber" who has to totally absorb the scattered gamma ray, must have high density, high Z and good energy resolution. $LaBr_3$, $LaClBr_2$, $Lu_2SiO_5$, $Y_2Gd_2O_3$ are suitable scintillators for this purpose. As the direction of the scattered gamma ray is also a function of the distance between the "scatterer" and the "absorber", the accuracy of the direction of the scattered gamma ray may be improved by increasing this distance, enabling to decrease the needed spatial resolution of the absorber. On the other hand for medium energies such as 511 keV a compromise may be struck by which one medium Z scintillator structure may serve both as the Compton "scatterer" and the "absorber" of a cascade of Compton scatterings ending in an ultimate Photo-electric absorption.

The invention describes several methods of fabrication of scintillation fiber arrays, by extrusion, by a build-up of stacked polymerizable layers defined and solidified by illumination through a collimator or phase mask; other methods of fabrication of fiber planes consists in depositing or pouring the fiber material into the pre-etched or machined long rectangular grooves of a plate and after the deposited material solidifies, releasing the plane of fibers out of such grooves; stacking single plane layers one on top of the other orthogonally, using a robotic arm for example enables to build a woodpile-like array. Another method consists of electrically drawing thin filaments of the fiber material, in one swoop from a reservoir of dissolved polymerizable material and depositing them on a moving substrate, to obtain an array of parallel fibers side-by-side. Still an additional method consists in drawing electrically, from the tips of an array of needles covered by a plastic scintillation solution, trains of drops and depositing them on a moving substrate. Fibers can be fabricated by depositing them drop after drop thru the orifices of an array of nozzles.

The position of an X or gamma ray interaction with a fiber may also be determined in a combination of an array of scintillation fibers and a Time Projection Chamber (TPC) filling the space between the fibers. Some of the photons created in a scintillation fiber and exiting the fiber will ionize the gas of the drift chamber and cause the creation of an ion/electron pair that will each drift towards the opposite electrode respectively. The position of an interaction along the fiber is a function of the time elapsed between the detection of a photon propagating along the fiber detected by a photodetector and the arrival of an electron to the anode of the drift chamber.

Measuring the energy of the knocked-off electron by measuring its range in an array of fibers, requires the identification of such fibers traversed by the electron Track. Such identification is done by detecting the scintillation photons that propagate to the end of the fiber, by using a Geiger mode CMOS camera. As all the pixels of the camera juxtaposed to the fibers traversed by the electron are excited almost simultaneously and as all the pixels of the camera have an equal probability of being hit, the conventional way of optical imaging of frame-by-frame leads to a requirement of extremely high frame rate readout. Therefore a different readout scheme has to be used to enable the readout of all the pixels of a Track quasi-simultaneously. The readout scheme of the invention consists in dividing the entire camera into nested subgroups, reading out all the pixels of the subgroup simultaneously and at the same time connecting pixels at a distance larger than the Track range that are in different subgroups, in single lines. Knowledge of the subgroup and the line that was excited enables to find the identity of the specific pixel that was hit, while reducing significantly the number of readout lines.

In a Photoelectric effect interaction between a Gamma ray with a low Z material such as a plastic scintillator, the direction of the knocked-off electron is substantially the same as that of the primary radiation as follows from the 2 body kinematics as there is no energetic X-ray that takes part of the momentum. This characteristic enables to assess the direction of the X or gamma ray by finding the direction of the electron. This method of finding the direction of the X-Ray is particularly effective at low energies where the Photoelectric effect is strong and where the detector has a low Z. In a plastic scintillator the Hydrogen and Carbon atoms have low binding energy electrons in their shells so that almost all the energy and momentum of the X-ray is transferred to the knocked off electron.

When the X-ray is emitted by an X-ray tube, its position is known a priori; thus knowing the direction of the X-ray enables to assess whether it came from the tube or is the result of a scattering event.

The ability to find the direction of the incoming gamma rays, directly as is the case with the photoelectric effect, or indirectly by resolving the "cone ambiguity" by measuring the knocked-off electron's direction, in the case of Compton scattering, has dramatic consequences in all medical imaging modalities. For example eliminating the collimator increases the efficiency of Gamma and SPECT cameras by up to 6 orders of magnitude. This gain in efficiency may be used to reduce the size of the cameras, reduce the time of an imaging session and reduce the injected radio-isotope doses.

The high resolution directional Track detectors described above may be used as the radiation detectors in all Medical imaging modalities, SPECT (single photon emission tomography), PET (positron emission tomography), CT (Computerized Tomography), DR (Digital Radiography) and Mammography and in Multi-modality systems, SPECT/CT, PET/CT, SPECT/MRI and PET/MRI. conferring to each of the systems distinct advantages. The different modalities can be divided into two groups, the imaging modality where the position of the source of radiation is unknown, but its energy is very well defined (SPECT and PET) and the modalities where the position of the source of radiation is known but its energy is not well defined (CT, Radiography).

Where the energy of the radio-pharmaceutical is well known, determining the direction of the incoming Gamma ray enables to eliminate the collimator in SPECT.

Measuring the energy of the incoming radiation independently by adding the energies of the scattered gamma ray and that of the recoil electron enables to differentiate and reject the body scattered gammas from those coming directly from the radio-pharmaceutical source.

Knowing the direction of the radio-pharmaceutical source, enables to find their points of interaction and thus their position. Thus a tomographical imaging of the body can be reconstructed without rotating the detector around the body.

PET imaging can be immensely improved by measuring independently the energy and direction of the incoming gamma ray and thus rejecting all scatterings. The direction of the 511 keV gamma can be found with one directional detector without the need to resort to a coincidence between the two 511 keV gammas. This not only reduces the number of detectors, but more importantly enables to put the directional Track detector as close as possible to the source thus immensely increasing the solid angle tended and increasing the efficiency of detection. It also enables to combine the positron emission detection modality with CTs and MRIs that have closed circular gantries, by just sliding the directional Track detector inside the circular opening and positioning it as close as possible to the imaged organ.

In all systems using an X-ray source, detecting the beginning of the electron Track and thus the point of interaction of the X-ray with the detector leads to micron order spatial resolutions. The direction finding capability enables to differentiate between the x-rays coming from the direction of the X-ray source and those that are Compton scattered by the body, without recourse to a grid. Moreover Imaging only the Compton scattered radiation, enables to obtain an "electron density" image of the scattering centers in addition to the "transmission" image. Measuring the energy of the such scattered x-rays in addition to the energy of the recoil electron, enables to calculate and find out also the energy of the primary X-ray.

If the calculated X-ray direction coincides with that of the position of the X-ray tube, the measured energy gives the specific energy out of the spectrum emitted by the X-ray source. This enables to sort the "transmission" images into groups of images, each obtained with a different X-ray energy. Thus an X-ray tube having a low Z anode such as aluminum, would emit a continuum of X-rays up to the maximum electron energy hitting the anode, without the K,L and M discrete energy peaks riding on the continuum as is the case with high Z Molybdenum or Tungsten anode tubes. Such an X-ray source would enable to sortout a large number of energy specific "Transmission" images and select the energy most appropriate for a specific breast composition with different proportions of glandular and adipose tissue.

BRIEF DESCRIPTION OF THE DRAWINGS

The drawings of the application are not intended to portray the specific parameters or the structural details of the invention and are not to scale, but merely schematic representations of the invention, which illustrate to persons skilled in the art the main details of the invention after reading the information contained herein.

FIG. 7 illustrates a 3D array of rectangular scintillator rods separated by air or aerogel and structured as a woodpile where the Compton scattered gamma rays are detected by a pixellated gamma detector.

FIG. 12 illustrates the process of extruding through the coated holes of the perforated plate an array of fibers.

FIG. 18 illustrates the forming of interlaced fiber arrays by depositing with two arrays of inkjet nozzles, fiber layers one on top of the other orthogonally.

FIG. 20 illustrates the optical imaging of a Track formed within a scintillating crystal by two cameras in each of the orthogonal directions simultaneously.

DETAILED DESCRIPTION OF THE PREFERRED EMBODIMENTS

Figure 1:
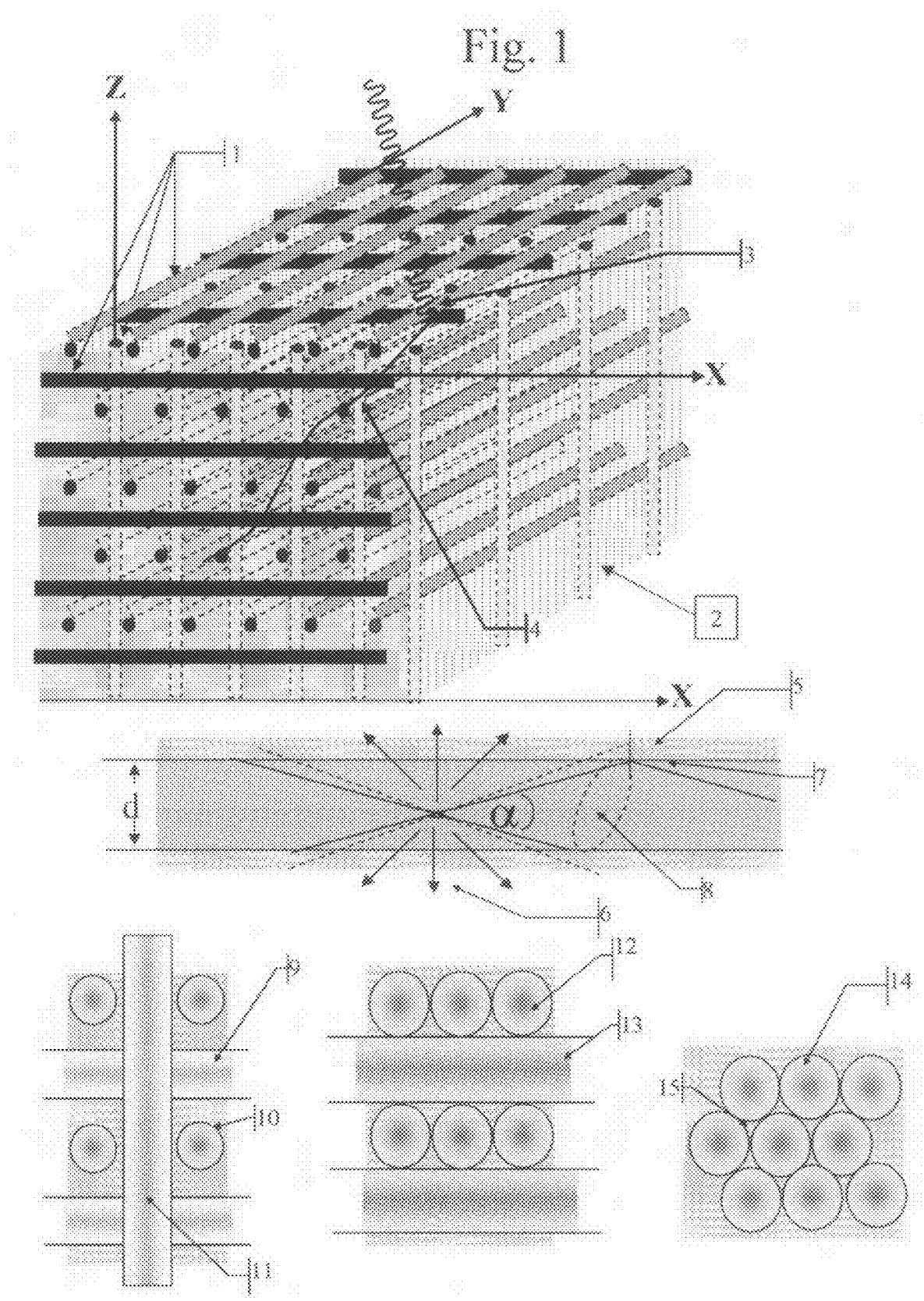
FIG. 1 illustrates structures of scintillation fiber arrays, composed of straight or orthogonally interlaced 3D arrays of scintillation fibers separated by low refractive index material.

FIG. 1 illustrates a composite 3D Matrix of scintillation fibers composed of three orthogonal interlaced 3D arrays 1 of fibers separated by air or aerogel 2. A photoelectron 3 knocked-off by an incoming gamma ray would in its way traverse all three mutually orthogonal arrays and any 3 consecutive points of interaction with the Matrix would in general have coordinates $(X_i, Y_j)$, $(Y_{j+1}, Z_k)$ and $(Z_{k+1}, X_{i+1})$. Thus the coordinates of the Track 4 of the photoelectron along this 3 proximate points would be well defined in 3D by $[(X_i+X_{i+1})/2], [(Y_j+Y_{j+1})/2]$ and $[(Z_k+Z_{k+1})/2]$. In the case that the Track crosses only two orthogonal arrays, at the proximate points $(X_i, Y_j)$ and $(Y_{j+1}, Z_k)$, the coordinates of the Track 4 of the photoelectron along the 2 proximate points would still be defined in 3D by $[(X_i), (Y_j+Y_{j+1})/2$ and $(Z_k)]$. In such a matrix of scintillation fibers used to detect the direction of the photo-electron Track, it is beneficial to reduce the fiber thickness and increase the separation between adjacent fibers, thus improving the accuracy of the direction of the Track and its length that determines its energy.

Part of the photons created within a plastic scintillator fiber will stay within the fiber and propagate to both ends by critical angle reflection, depending on the refractive index contrast between the fiber and the surrounding material 5. When the material surrounding the plastic scintillator fiber ($n_P$=1.58) is teflon ($n_T$=1.3) the solid angle $\alpha=2\pi(0.178)$; if the plastic scintillator fiber is surrounded by a very light foam such as aerogel ($n_a$=1.05) the solid angle is as high as $\alpha=2\pi(0.336)$. If one of the ends of the fiber is coated with a dielectric mirror tuned to the wavelength of the photons which is around 420 nm, most of the photons hitting the mirror will be reflected back to the other end; otherwise they will exit from this end. The rest of the photons 6, which in case of an aerogel surrounding is ⅓ of the original photons, will exit the fiber towards the 6 surrounding fibers. Some of these photons will be scattered by the walls of the surrounding fibers, and the others will enter them; of the photons entering the adjacent fibers some will propagate within the fibers and the others will exit towards the surrounding 12 fibers. In any case the number of photons propagating to the ends of each of the surrounding fibers is around 1-2% of the original number.

FIG. 1 also illustrates 3 fiber structures; one structure consists of 3 orthogonal sets of fibers running in the X 9, Y 10 and Z 11 directions respectively. The second structure consists of two orthogonal sets of interlaced fibers X 13 and Y 12. The third structure is an array of fibers running all in the same direction.

Figure 2:
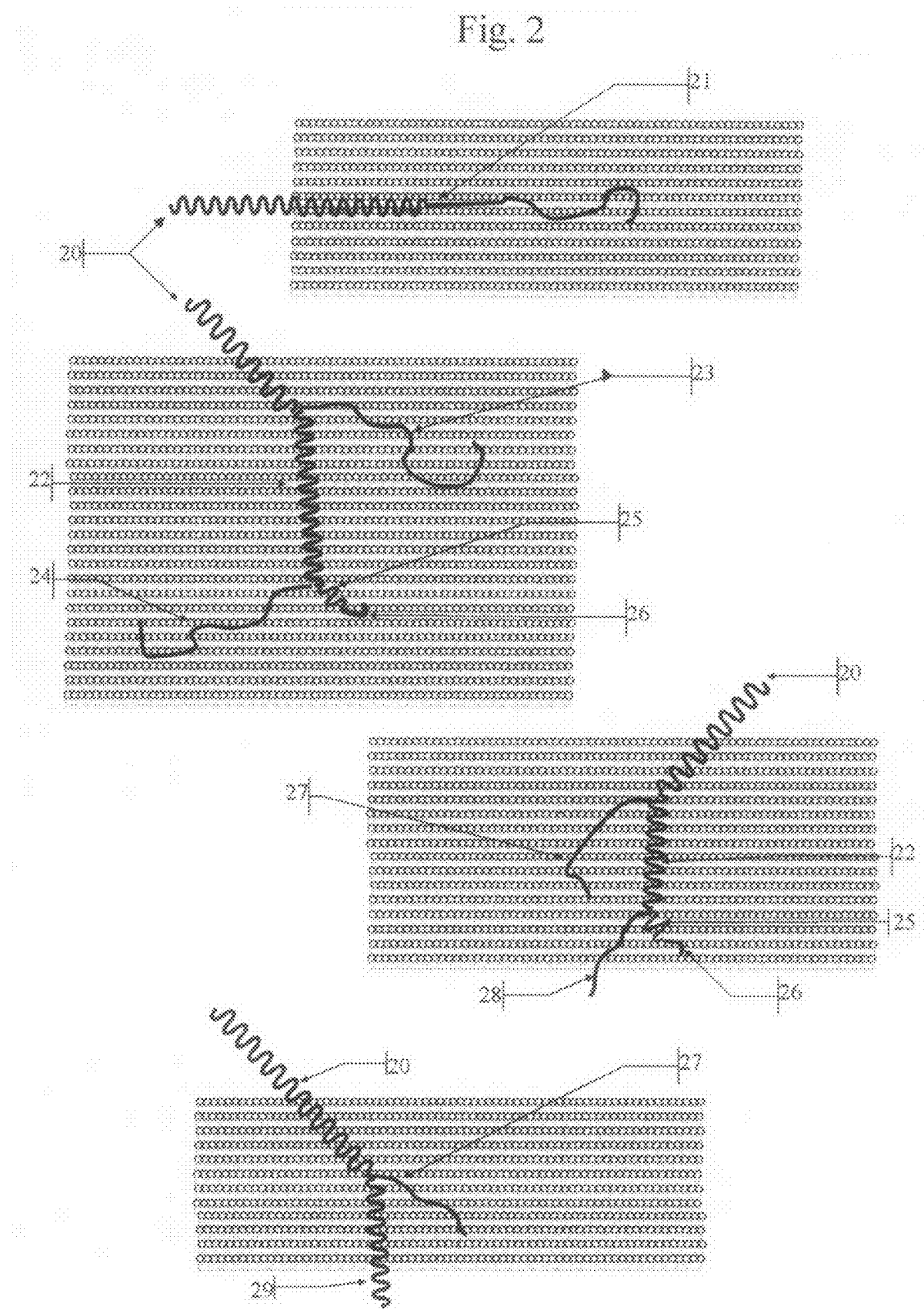
FIG. 2 illustrates different Photo-electric or Compton effect interactions with a 2D fiber array.

FIG. 2 illustrates different Photo-electric or Compton effect interactions with a 2D fiber array. An incoming Gamma ray 20 may knock-off an electron 21 from one of the inner shells of the atoms constituting the scintillator in what is called the Photoelectric effect and impart to this electron all its energy less the energy needed to extract it from the atom or the molecule. the energy of the ground state of Hydrogen for example is 13.6 eV, extracting this electron takes this much energy, and filling this level generates this much energy in the form of an X-ray. When the kinetic energy and momentum of the incoming photon is very large as compared to this "extraction energy" as is the case for example with the $Tc^{99m}$ 140 keV Gamma ray which is thousands times more energetic, the electron's initial energy and momentum in its shell may be omitted and the interaction may be viewed as a head-on knock-off, the electron recoiling in the direction of the incoming photon. This is a very important observation as it means that the direction of the incoming Gamma ray may be inferred from the direction of the electron. This approximation is of course not true with heavier materials where the emitted X-ray may be an important part of the energy equation.

The incoming Gamma ray 20 may also be scattered 22 through a Compton effect interaction. This scattered Gamma ray may be further scattered or, absorbed in a photoelectric event knocking off an electron 24 in the process. If the material is a high Z material an X-ray 25 is emitted in the process which is also absorbed emitting an electron 26. Thus in a high Z material a photoelectric effect interaction may be recognized by the presence of a small Track in the vicinity of the knocked-off electron's Track, while in a Compton effect interaction the recoil electron's Track doesn't have in its close proximity a small Track caused by the absorption of the characteristic X-Rays. When the energy of the incoming gamma ray is known, Photoelectric effect electrons may be differentiated for Compton electrons by their energy, as in a Photoelectric effect, the combined energies of the knocked-off electron and the X-ray absorption electron, equal that of the Gamma ray while the energy of a Compton electron cannot exceed $1+(\frac{1}{2}\alpha)$ of the energy E of the primary radiation where $$\alpha = E/511 \text{ keV}$$

This clean differentiation between Photoelectric and Compton events is perturbed near the edges of the scintillator fiber array where the photo-electrons 28 or the scattered gamma rays 29 may traverse the edges of the fiber array detector, thus "stealing" away part of the energy. When analyzing a cascade of events it important to account for such "lost" energy by either artificially adding to the equation the "missed" energy or rejecting the event or cascade of events altogether.

Figure 3:
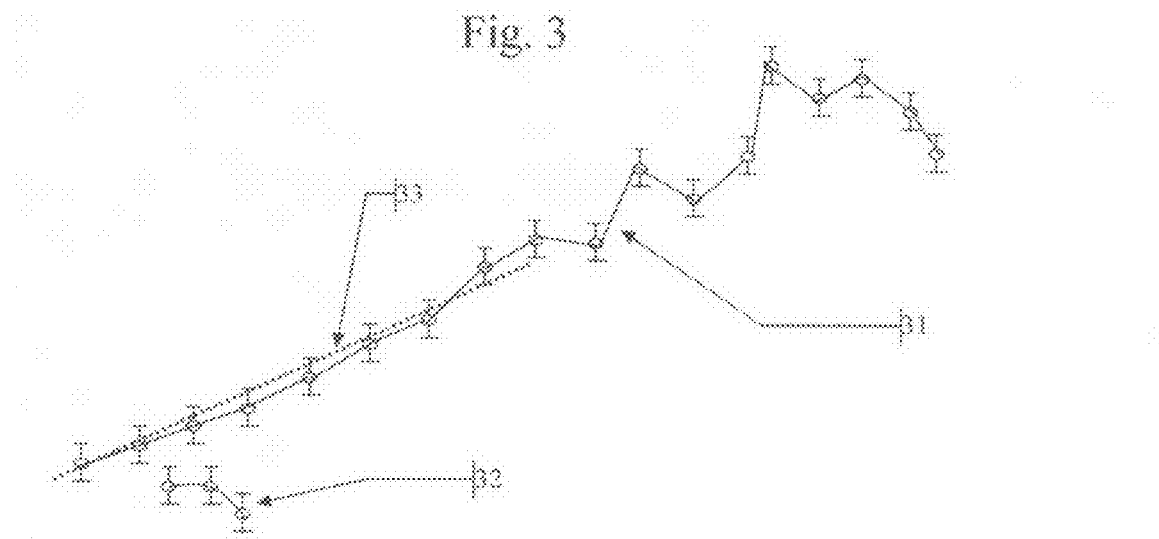
FIG. 3 illustrates an electron Track

FIG. 3 illustrates an electron Track with a substantially straight section in the beginning and a wiggling 31 end. The presence of a small Track 32 in the proximity of its beginning indicates that this is a photoelectric electron. Calculating the best fit straight line 33 through the "straight" section gives the average direction of the Track. In a plastic scintillator the small X-ray Track would not appear, however the length of the Track which is proportional to is energy would indicate whether this is a Compton electron Track or a Photoelectric electron Track, in which case the direction of the Track would also give the direction of the incoming gamma ray.

Figure 4:
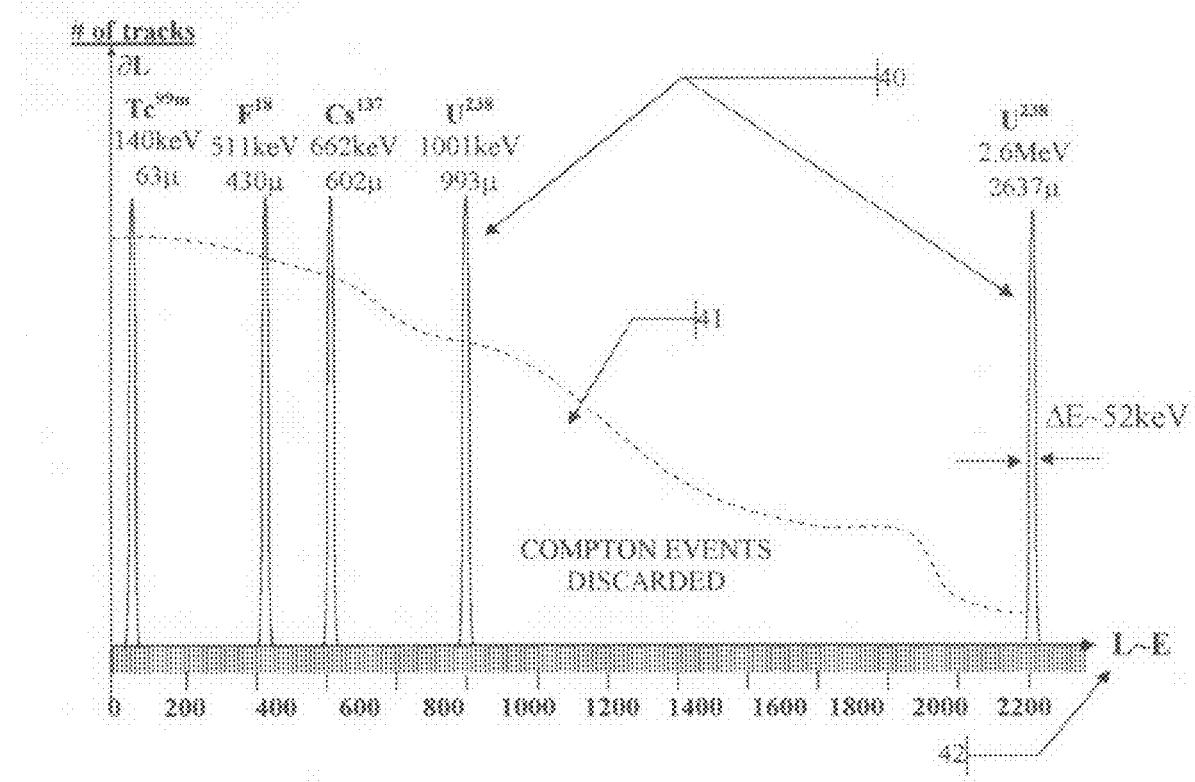
FIG. 4 illustrates an energy spectrum of radioisotopes, where the energy is determined by measuring the Track length of the photoelectric effect generated electrons and the compton Tracks eliminated by the presence of a short x-ray Track close to its beginning.

FIG. 4 illustrates the spectrum of several gamma rays, when determined by the length 42 of their photo-electron Tracks in a $Bi_4Ge_3O_{12}$ scintillator as shown in Table 2. The total energy of the gamma ray is derived by adding the energies corresponding to the two electron Tracks, that of the initial photoelectron and that corresponding to the absorption of the characteristic (K,L,M, or N) X-rays.

TABLE 2

| Radio-isotope | $Tc^{99m}$ | $I^{131}$ | $F^{18}$ | $Cs^{137}$ | $U^{238}$ | $U^{238}$ |
|---|---|---|---|---|---|---|
| Energy | 140 keV | 364 keV | 511 keV | 662 keV | 1001 keV | 2.6 MeV |
| Range in BGO scintillator | 63.6μ | 270.7μ | 430.6μ | 602.3μ | 993.1μ | 2637μ |
| # of excitations needed to loose all energy | 262 | 682 | 957 | 1,240 | 1,875 | 4,869 |
| # of excitations per 1μ length of Track | 4 exc. | 2.5 exc. | 2.2 exc. | 2 exc. | 1.9 exc | 1.8 exc. |
| (Photons/1μ of Track) in BGO | 17.6 pho | 10.7 pho | 9.5 pho. | 8.8 pho. | 8 pho. | 7.9 pho. |

As mentioned above, imaging the actual Tracks in a fiber array enables to differentiate between full photoelectric events that are accompanied with the emission of a characteristic X-ray that are further absorbed by ejecting a photoelectron and Compton events that are followed by a cascade of additional Compton and/or Photoelectric events. Thus Compton electrons that exhibit a continuum of energies, between 0 and $1+(\frac{1}{2}\alpha)$ of the gamma ray energy may be discarded leaving only the photoelectric events 40. Examining the Tracks also enables to discard events 41 in which the Track ends at the edge of the detector pointing to a partial Track. This thorough selection of the Photoelectron Tracks enable an ultrahigh energy resolution limited only by the variability of the Track length. The NIST ESTAR tables claim that the accuracy of the stopping power calculation is 1% to 2% above 100 keV. It is not clear whether this accuracy reflects the matching of theory and experiment for different materials and energies or reflects the variance of the stopping power at a given energy in a given material, which is also a statistical process. In any case the Track Detector based on a given scintillator fiber has to be calibrated for the range of energies to be used in.

Table 3 illustrates the Range of the electrons generated by gamma rays following a Photoelectric event, in a plastic scintillator. In this case there are no X-rays above 1 keV. the table shows the number of photons that would be trapped inside a fiber of 2μ diameter when the fiber is surrounded by aerogel which has a refractive constant of $n_a$=1.05.

advantages of using a plastic scintillator are twofold; in a plastic scintillator the range of an electron is longer and the deviation from a straight line is smaller. In addition as the X-rays are soft x-rays, the initial direction of the electron is substantially the same as the gamma ray.

TABLE 3

| Radio-isotope | $Tc^{99m}$ | $I^{131}$ | $F^{18}$ | $Cs^{137}$ |
|---|---|---|---|---|
| Energy | 140 keV | 364 keV | 511 keV | 662 keV |
| Range in vinyl toluene Plastic Scintillator | 245.5μ | 1096.3μ | 1778.1μ | 2529.7μ |
| # of excitations needed to loose all energy | 2,090 | 5,433 | 7,627 | 9,880 |
| # of excitations per 1μ length of Track | 8.5 exc | 5 exc. | 4.3 exc | 3.9 exc |
| (Photons/μ of Track) in Plastic scintillator | 5.7 pho | 3.3 pho. | 2.87 pho | 2.6 pho |
| Photons trapped in 2μ width fiber 66% eff. | 7.4 ph | 4.2 pho. | 3.8 ph. | 5.1 ph. |

Figure 5A:
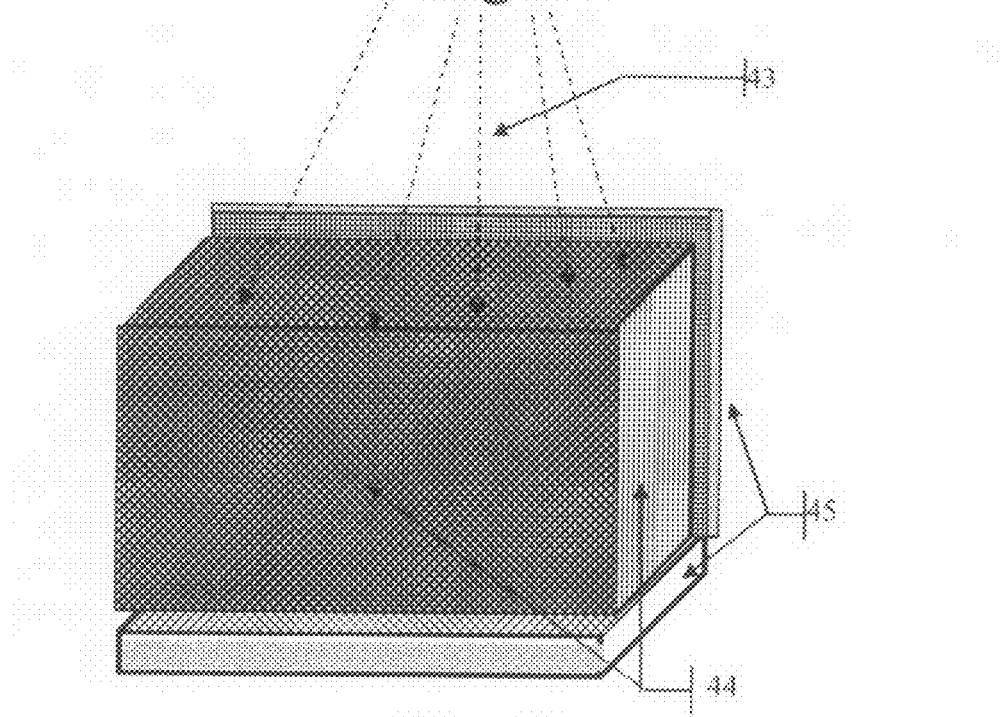
FIG. 5a illustrates a 2D Directional Track Camera for detecting the direction of gamma rays absorbed in a Photoelectric effect, in a fiber array composed of two interlaced orthogonal fiber arrays and two 2D amplified photo-detector (APD) cameras juxtaposed to the two orthogonal faces of the arrays.

FIG. 5a illustrates a Track Detector consisting of two interlaced 2D plastic scintillator arrays 44 optically connected to two CMOS sensor arrays 45. The two cameras are activated in coincidence in order to image any Track traversing the 3D fiber array, from two orthogonal directions and thus obtain its coordinates in 3D. In this type of Track detector the Compton Tracks which have a lower energy and consequently shorter Tracks are discarded and the remaining Photoelectric Tracks provide both the interaction points of the Radiation with an accuracy of half the diameter of the fiber and its direction with an accuracy depending on the energy of the radiation and the length of its straight section. For a $Tc^{90m}$ 140 keV radiation having a range of 245μ in a plastic scintillator, assuming that ⅓ of the Track may be used for finding its direction and using 2μ thick fibers, the accuracy of its direction may be established to an accuracy of Δθ=+1/80=±0.7°. This type of Track Detector based on plastic scintillators and Photoelectric events excels at low energies where the Photoelectric effect is appreciable. At higher energies the direction of the incoming gamma ray may be found by detecting in addition to the recoil electron also the scattered gamma ray using one or more additional detectors.

Figure 5B:
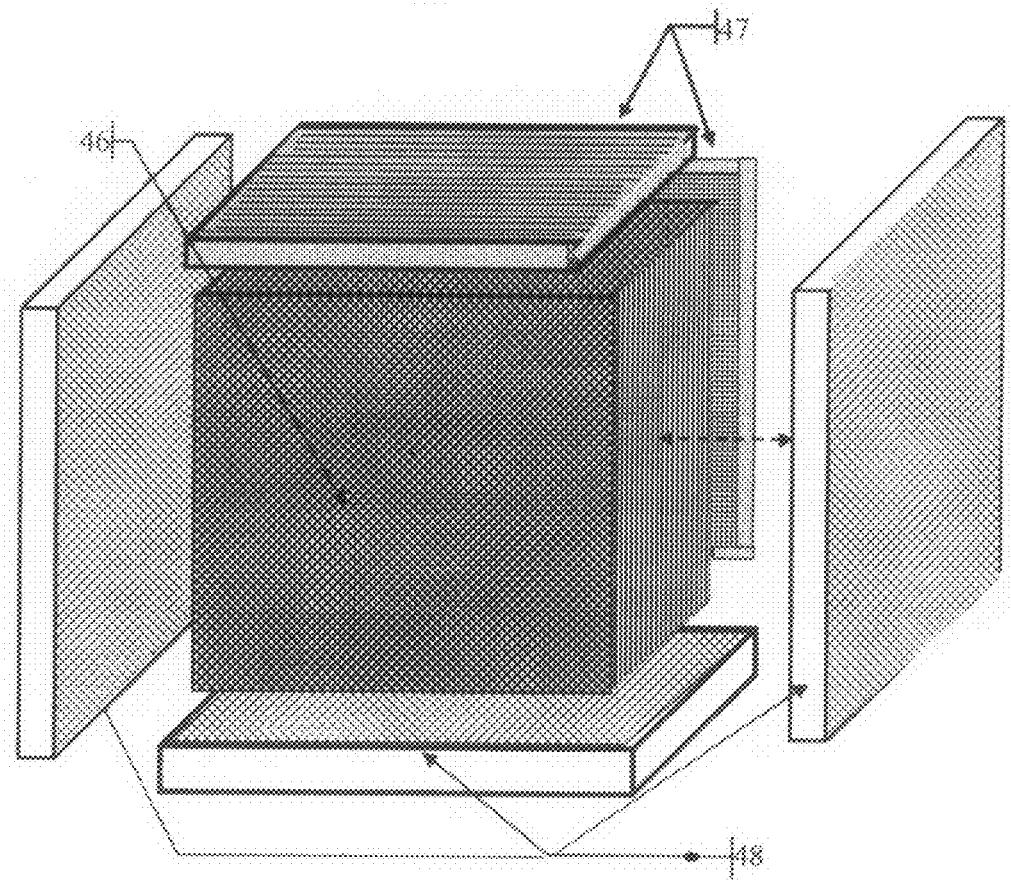
FIG. 5b illustrates a Directional Track Camera for detecting the direction of a gamma ray Compton scattered in a 3D array of scintillation fibers composed of 2 orthogonal interlaced 2D arrays with two 2D single-photon avalanche detector (SPAD) cameras juxtaposed to the two orthogonal faces of the arrays and 3 gamma detectors facing the 3 faces of the composite 3D fiber array.
Figure 6:
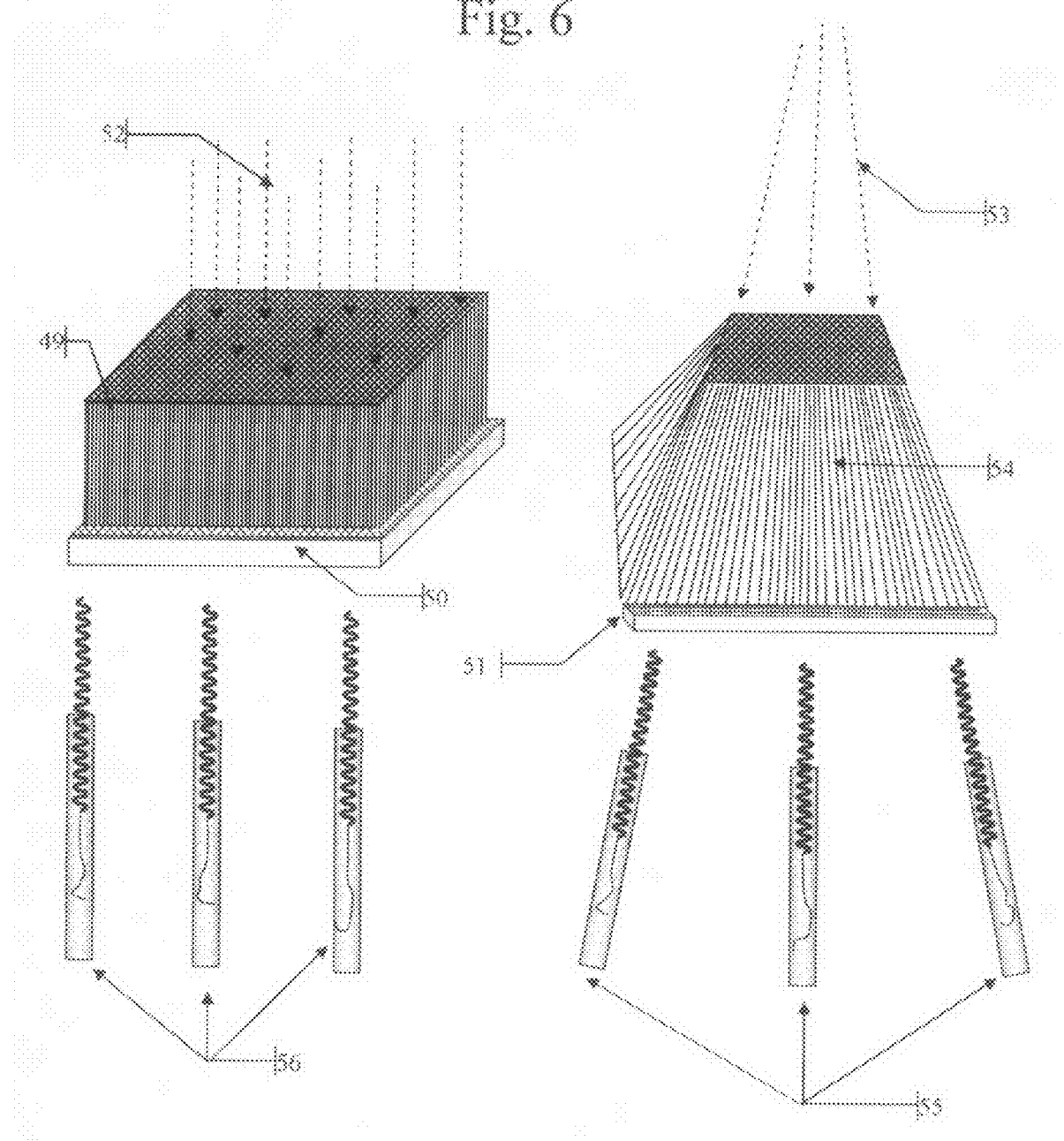
FIG. 6 illustrates two Directional Track Cameras for detecting gamma rays scattered by the Photoelectric effect consisting of a fiber array where the fibers are aligned in the direction of the incoming gamma rays, juxtaposed to a APD camera.

FIG. 5b illustrates such a Track Detector consisting of a 3D fiber array "scatterer" 46 optically connected to two orthogonal Photo-detectors 47 surrounded by 3 pixellated detectors 48 that act as the "absorbers" of the scattered gamma ray. The absorber detectors may also be composed of 2 Track detectors each such detector consisting of 2 orthogonal interlaced 2D fiber arrays with two 2D photo-detector cameras juxtaposed to the two orthogonal faces of each of the "absorbers". The "absorber" detectors may also be of the pixellated detectors type provided that they meet an angular variation constraint in respect to the scattering point 25 as illustrated in FIG. 7. This simply means that pixel surface width (S) 67 facing the probable scattering site 66 and its active layer thickness (t) 68 have to be of such dimensions that the geometrical angular variance {S/(d±t)}<<Δθ(E) where Δθ(E) is the angular variance of the scattering angle θ as a function of the energy. As from the Compton equations $(\partial\theta/\partial E)=(m_e c^2/E_1^2 \sin\theta)$ the energy resolution of the detector also determines a certain angular resolution. Therefore the geometrical angular variance tended by the pixel {S/(d±t)} has to be smaller than the variance stemming out of the energy resolution. The pixellated detectors may be of the scintillator type such as $HgI_2$ read by a TFT array or semiconductor type such as CZT, Si or Ge detectors, or a pixellated $Lu_3Al_5O_{12}$ crystals, FIG. 6 illustrates two Track Detectors, each consisting of one fiber array 49, 54 and one Amplified CMOS camera 50, 51, where the direction of the scintillation fibers in each array parallels the direction of the X-rays which in one case emits a parallel beam 52 and in other instance a conical beam 53. If the fibers are made of plastic scintillators the X-rays knock-off photoelectrons that propagate in the same exact direction of the radiation, in a Photoelectric effect interaction. The electron Track in this case stays within the fiber and generates a high amplitude pulse. On the other hand Compton effect recoil electrons have a lower energy and also traverse the fibers in all directions; therefore the energy they deposit in each fiber is much lower. A pulse height analyzer set at 1+(½α) of the maximal energy will be able to eliminate all Compton scatterings.

FIG. 7 illustrates a 3D array of rectangular scintillator strips separated by air or aerogel 59 and structured as a woodpile. Strips with an asymmetric cross section 64 of (w) width and (t) thickness enable to increase the spatial resolution by positioning the thin dimension of the strips in the general direction of the knocked-off electron 61. Such a direction may be calculated using the Compton equations when the general direction 60 of the gamma ray source is known and when only the scattered gamma rays 62 within a limited solid angle are detected by the "absorber" 65. The pixellated "absorber" detector may be placed at a suitable distance so that the angular resolution that any of its pixels tend in respect of the scattering gamma source is as small as desired.

Figure 8:
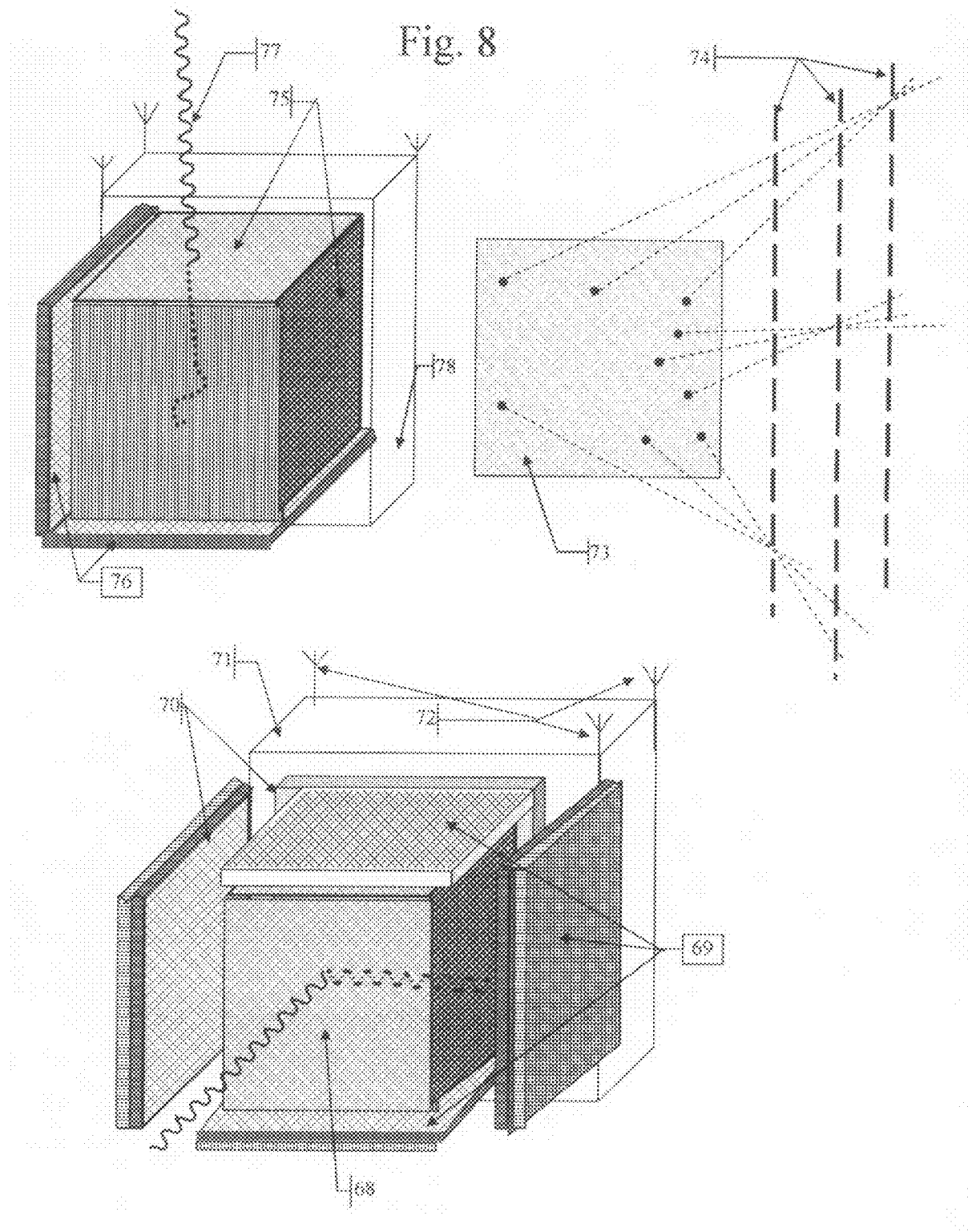
FIG. 8 illustrates a Tomographic Directional Track Camera for detecting compton scattered gamma rays combined with a position and direction finding module that determines the absolute direction in space of the incoming gamma ray.

FIG. 8 illustrates two Directional Radiation Cameras, one based on the Photoelectric effect and the second on the Compton effect. The Directional Radiation Camera based on the Photoelectric effect consists of two interlaced scintillation fiber arrays 75 optically connected to two Geiger-mode CMOS photodetector arrays. A full Directional Radiation Camera includes, also an electronics interface box 78 that contains the coincidence circuits, the readout electronics of the Photodetector cameras, temporary memory and communication means for relaying the outputs of the Photo-detector arrays to an external computer for further processing. The interface box 71 also contains the "position electronics" for registering in real time the absolute position and direction of the Radiation Camera in order to register and relate the obtained image, to images obtained by other devices.

The Directional Radiation Camera based on the Compton effect consist of a central "scatterer" 68 consisting of two interlaced scintillation fiber arrays optically connected to two Geiger-mode CMOS cameras 70. The scattered gamma ray is detected by 3 pixellated detectors 69 of thickness that can absorb the scattered gamma ray. As the desired angular precision of detecting the scattered gamma ray is around 0.5°, if the pixel dimensions are of the order of 0.1 mm, the distance between the "scatterer" and the absorber ought to be 1.2 cm or larger. As for a given energy resolution, the angular precision changes as $(\partial\theta/\partial E)=(m_e c^2/E_1^2 \sin\theta)$, it is desirable to place the "absorber" detectors at 90° from the direction of the incoming gamma ray, although the angular distribution of the scattered gamma ray is the lowest at 90°. If the "absorber" detectors dimensions are such as to cover the solid angle tended by a face of the "scatterer" cube, the 3 absorbers will cover 50% of the $4\pi$ solid angle and at low energies where the angular distribution at 90° is 80% of the average, around 40% of the scattered gamma rays, provided of course that its absorption efficiency at these energies is 100%. The absorbers may be of the "track detector" type, the scintillation fibers being of high density material such as powdered BGO loaded into a plastic carrier. Other pixellated detectors such as CZT with high energy resolution are also suitable.

A full Directional Radiation Camera includes, other than the "scatterer" and the "absorbers", also an electronics interface box 71 filling similar functions as that included in the camera based on the Photoelectric effect.

Figure 9:
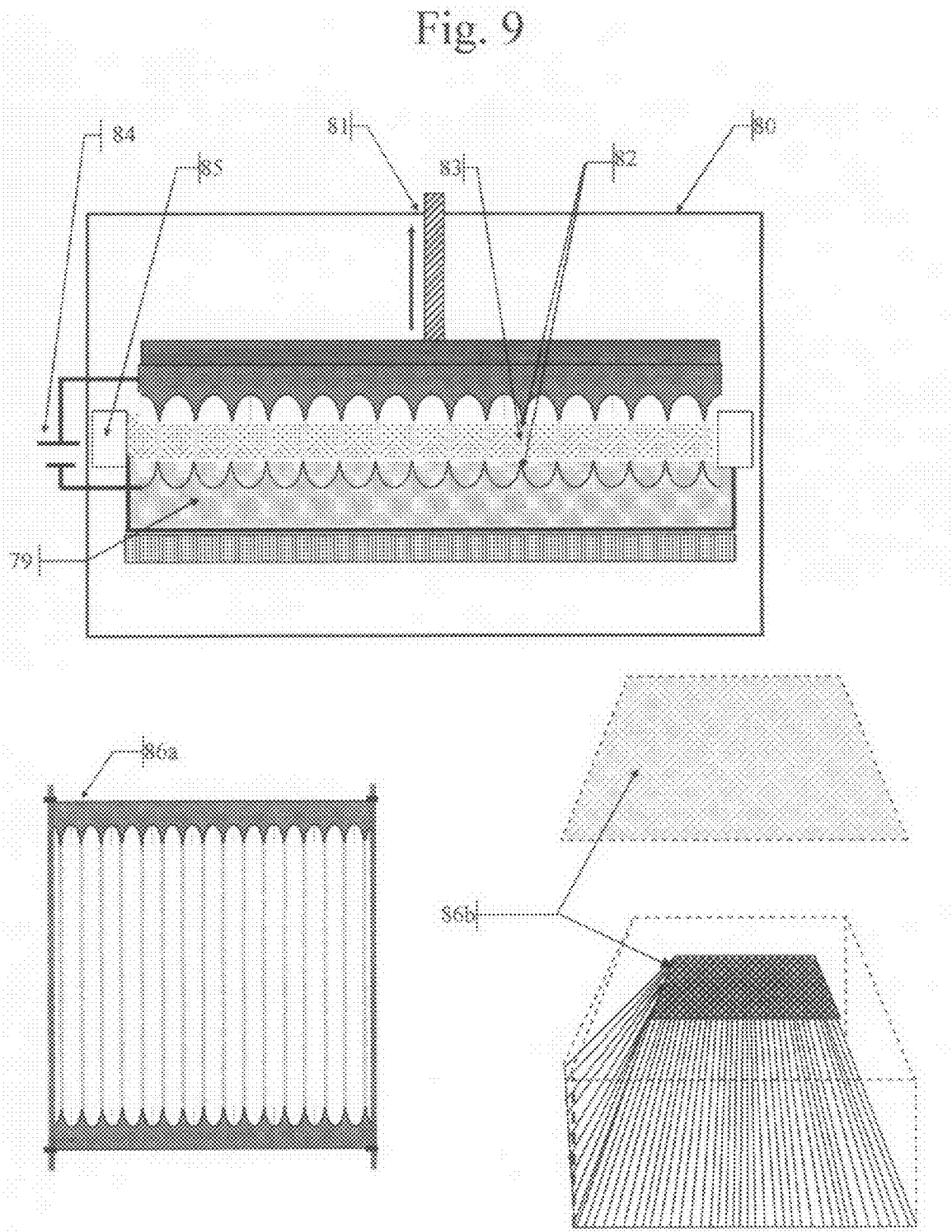
FIG. 9 illustrates the process of electro-drawing of plastic scintillator molecules from a solution of plastic scintillator with an array of needles and forming fibers around them

FIG. 8 also illustrates the Tomographic nature of the Radiation Camera 73, as knowing the direction of the gamma rays and given a sufficient number of back-projected rays enables to reconstruct the relative densities of the sources at different distances 74. Obviously using two or more cameras FIG. 9 illustrates a method of fabrication of an array of scintillation fibers by electro-drawing onto the tips of an array of needles plastic scintillator molecules from a solution. First a master array of needles is prepared, for example by lithographic methods. From the master array a multiplicity of nano-arrays may be fabricated by the nano-imprint technology consisting of pressing the master mold onto a softened substrate. The needle arrays are then coated with an electrically conductive coat such as gold. One of the arrays is put into a heated vessel and covered up to slightly below its top with dissolved plastic scintillator 79 or a non polymerized melt of plastic scintillator such as BC-498 manufactured by Saint Gobain. The dissolved material then rises up to the tip of the lower array of needles by surface tension. A similar array of needles is put at some distance of the first array outside the plastic scintillator melt and a high voltage 84 of several kV is established between the two arrays 82. The entire setup is then put within a second evacuated vessel 80 in order to accelerate the evaporation of the plastic scintillator solution. The upper array of needles is first lowered until it almost touches the surface of the melt so that molecules of the scintillator start to accumulate at the tips of the array. The upper array is then slowly retrieved upwards 78 as the evaporating molecules accumulating one on top of the other start forming filaments 83. The accumulating material is cured and solidified by irradiating it with either an IR or microwave source 85. The thickness of the fibers so formed is dependent on the rate of accumulation of material which can be controlled by the rate of retrieval of the upper array of needles and the degree of vacuum in the vessel 80. When the array of plastic scintillator fibers so formed between the upper and lower arrays of needles, reaches the desired height, the lower vessel 79 is emptied and the upper and lower arrays of needles holding between them the array of fibers are mechanically joined 86 and secured. This method enables to retrieve from the melt a linear array or a two dimensional array depending on the structure of the array of needles.

This method of electro-drawing of fibers from a solution allows to fabricate a divergent fiber array 54 as described in connection with FIG. 6 by building the upper array of needles on an elastomer 86b. At the beginning the upper array of needles is stretched to fit the geometrical position of the lower array precisely "needle-for-needle". As the fibers start to form on the needles of the stretched upper array, the stretching force is gradually decreased so that at the end the desired divergence is achieved. This divergent fiber array has numerous applications as conventional X-ray tubes emit a conical beam.

Figure 10:
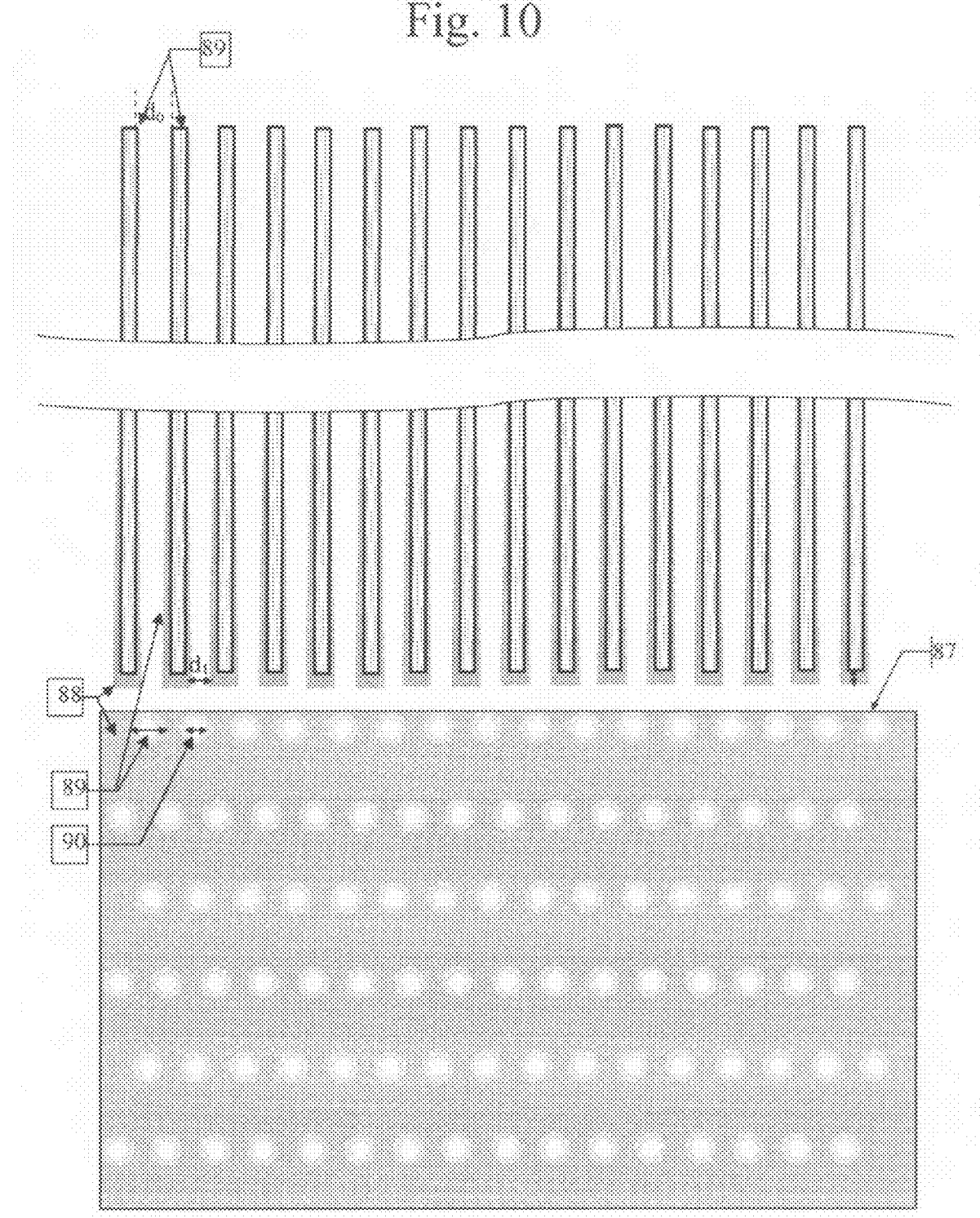
FIG. 10 illustrates two views of a perforated plate with one of its faces coated with an hydrophobic material such as teflon.
Figure 11:
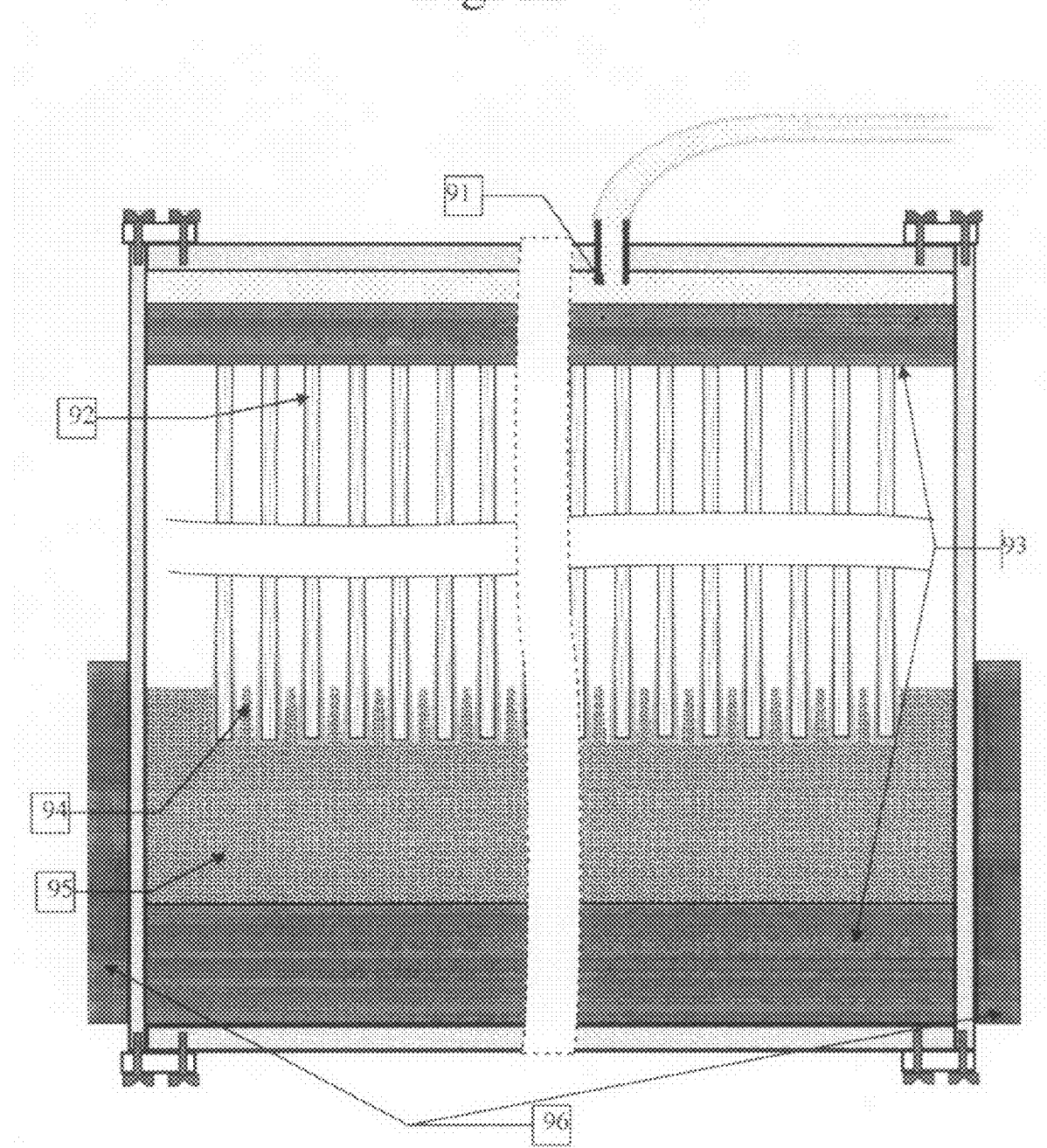
FIG. 11 illustrates the process of imprinting a negative replica of the coated array of holes of the perforated plate.

FIG. 10 illustrates two views of a perforated plate, used for extruding fibers. The plate if made of insulating material such as glass, is first coated with a conductive metal coat 87. Next one face of the plate 88 and the walls 89 of the respective holes 90 are partially coated with an hydrophobic and non-stick material such as teflon that facilitates the flow of a liquefied or low viscosity extruded material. The coating 36 of the exit face of the perforated plate with an hydrophobic material comes to prevent the spilling aside of the low viscosity material when exiting the hole and come into contact with the material seeping out from adjacent holes FIG. 11 illustrates a view from the side of the process of imprinting a negative replica 94 of the coated array of holes 87 of the perforated plate 92. The negative replica of the perforated plate is obtained by pressing the perforated plate 92 against a melt of heat polymerizable material 95 using two plates 93 squeezed hydraulically or by pressurized air 91. After the polymerizable material penetrates the holes of the perforated material, it is heated from the outside 45, finishing the polymerization process. In the process of polymerization the polymer slightly shrinks, detaching it from the coated holes of the perforated plate.

FIG. 12 illustrates the process of extruding through the coated holes 105 of the perforated plate an array of scintillation fibers. The perforated plate constitutes the bottom of a vessel 100 onto which a non-polymerized plastic scintillator mixture 101 in liquid form is poured. The polymerizable mixture may consist of an acrylic monomer mixed with a scintillator such as para-terphenyl and a wave length shifter such as POPOP (1,4-bis[5-phenyloxazol-2-yl]benzene). A sensitizer is added to the mixture to speed the polymerization of the acrylic monomer when irradiated with microwaves. The space 103 above the polymerizable mixture is filled with an inert gas such as argon and the mixture bubbled several times to get any oxygen out of it. A strong electrical field of several kV 109 is established between the conductive walls of the perforated substrate and the conductive spikes 107 protruding out of the imprinted replica previously fabricated as illustrated in FIG. 11 and inserted half-way into the holes 105 of the perforated substrate. Initially the liquid mixture 101 will not seep through the holes 105 of the perforated substrate due to the surface tension forces until the pressure of the inert gas 103 on the liquid mixture 101 is sufficiently increased to overcome such tension forces. When the liquid starts seeping out, the electrostatic field 109 combined with the hydrophilic nature of the coating causes the mixture to spread 108 over the protruding spikes 107 instead of spreading aside. At this stage the substrate 110 covered with the spikes 107 is started to be retrieved at the same rate that the mixture starts to seep out. The lowering of the substrate 110 may be done by a micropositioning system using piezo motors or simply by mounting the substrate on a hollow float 111 floating on the surface of a vessel filled with water, and emptying the vessel at the desired rate, drop by drop. The seeping mixture can be polymerized by irradiating it with a microwave source 106. The rate of extrusion of the liquid mixture through the perforated substrate is matched with the rate of polymerization.

Figure 13A:
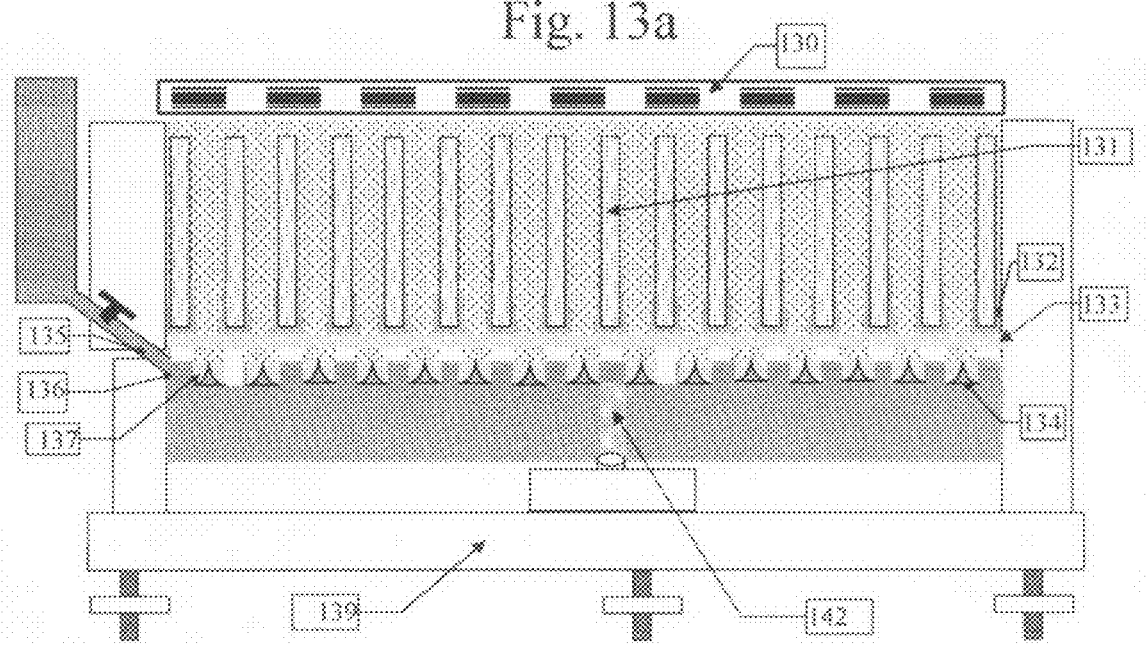
FIGS. 13a and 13b illustrate a method of using the perforated plate as a UV filter to project the desired pattern upon a UV curable resin and the process of growing an array of fibers using this method.
Figure 13B:
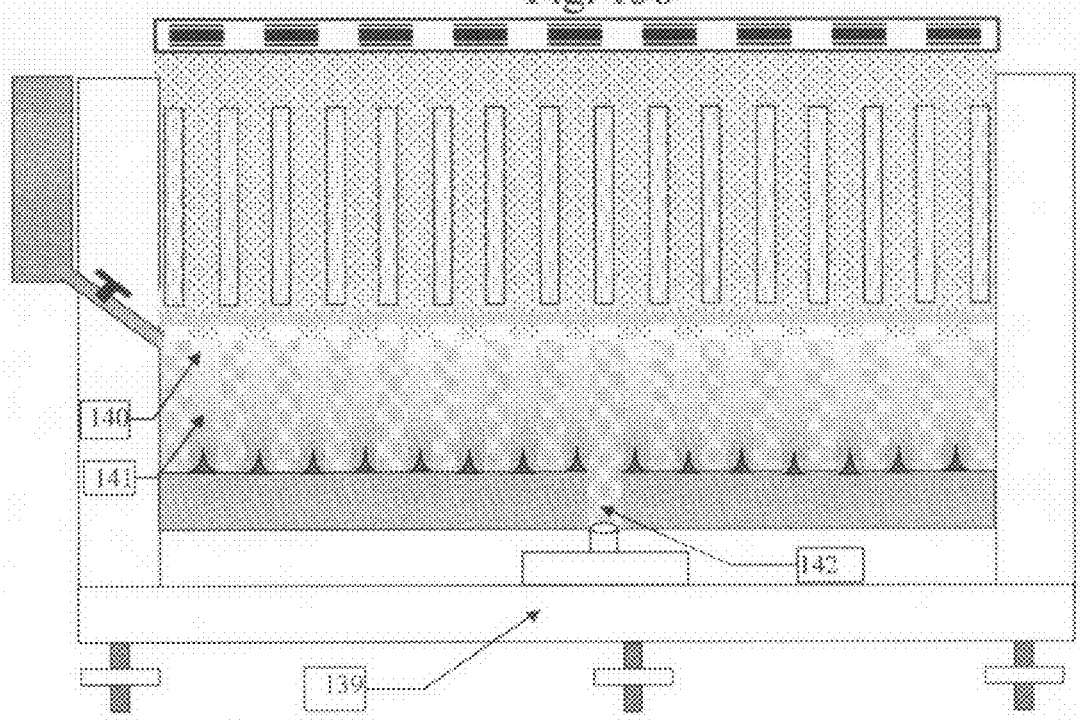

FIGS. 13*a* and 13*b* illustrate a method of using the perforated plate 131 as a mask to project the pattern of the perforations upon an acrylic photopolymer 140 loaded with a scintillator such as para-terphenyl and a Wave Length Shifter (WLS) such as POPOP and cast a fiber array. The light source 130 has a wavelength higher than 450 nm above the absorption wavelength of the scintillator and the WLS in order to avoid a strong absorption by them, but still be able to polymerize the acrylic carrier. The bottom of the perforated substrate 131 is covered with a stretched thick transparent film 133 that prevents the photopolymer from touching it and the mask, until the end of the process. The low viscosity photopolymer 136 is poured into a vessel containing the replica 134 of the perforated substrate and covers it up to the top of the protrusions 137 and close to the film 133 separating it from the mask. The irradiation causes the photopolymerization of the area 137 defined by the pattern around the protrusions, while the non-irradiated photopolymer stays viscous. The replica 138 sitting on a nano-positionable platform 139 is lowered at the same rate of the polymerization while new photopolymer is added 138 so as to cover the top 140 of the previously polymerized areas. If the polymerization process is slow, the photo-polymerizable material around the already polymerized columns 141 is pumped out 142 after dissolving it with a solvent such as methanol or acetone and replaced by new material 135 from time to time. When the columns attain the desired height, the top of the columns is juxtaposed to the film 133 and polymerized. Dissolving the non-polymerized material leaves the array of columns/fibers standing on the replica 134 and supported at the top by the film. The film 133 and the fiber array beneath it are then mechanically detached from the perforated plate by blowing air through the perforated plate 131. The fiber array is then mechanically secured at its corners.

Figure 14:
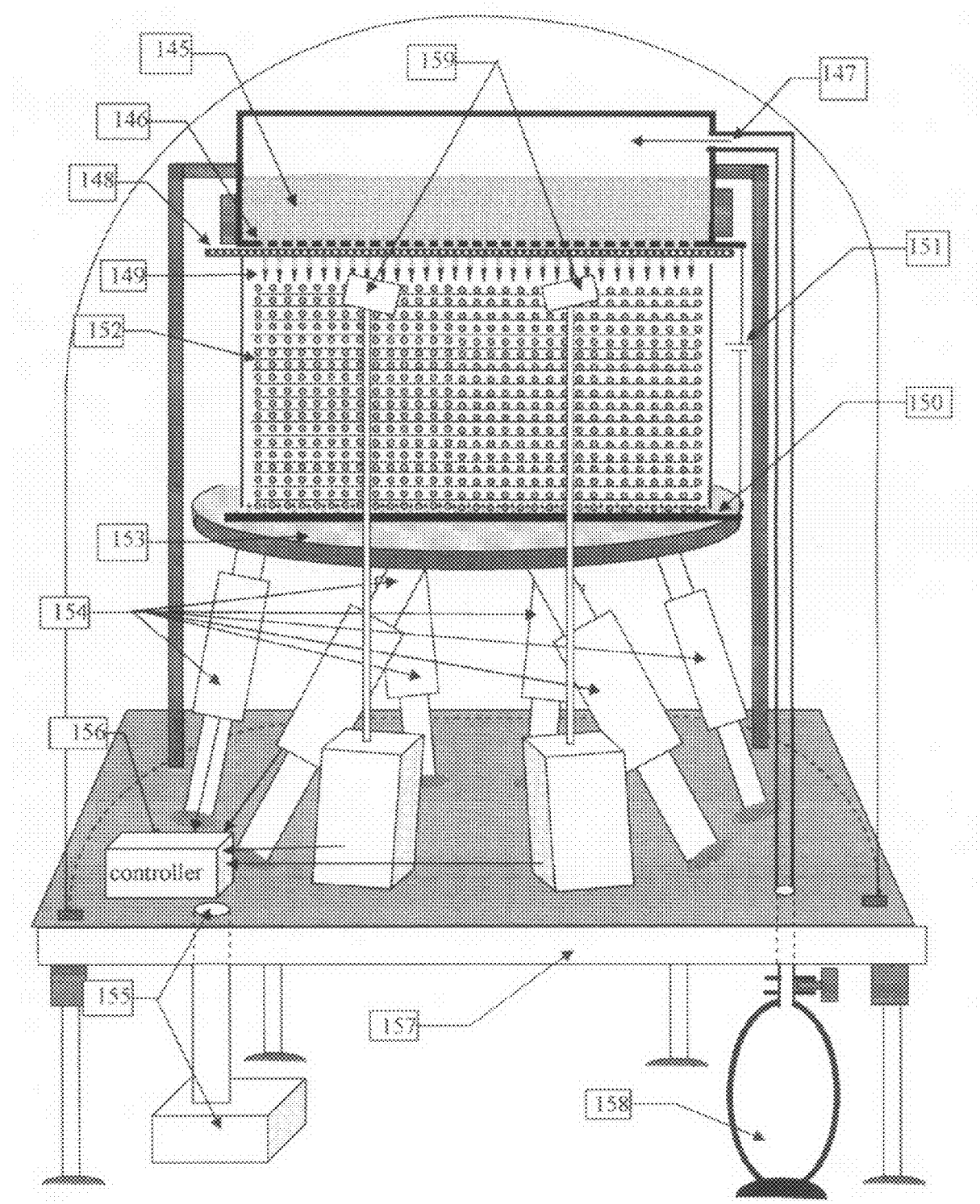
FIG. 14 illustrates the process of extruding one array as illustrated in FIG. 12 onto the interstices of another array and thus forming a 2D orthogonally interlaced arrays.

FIG. 14 illustrates the process of extruding one array fabricated as illustrated in FIG. 12, onto another orthogonal array 152 thus forming 2 orthogonal interlaced arrays, or onto the interstices formed by two orthogonally interlaced arrays and thus forming 3 orthogonal interlaced arrays.

The vessel containing the photopolymer and scintillator mixture 145 stands on an anti-vibration table 157, suspended above a platform 153 whose movement is controllable with very high accuracy (X,Y,Z with ±5 nm and angular resolution with ±5µradian) piezo motors 154 in order to be able to align and insert the fibers to be extruded 149 through the interstices of the fiber arrays under them.

The bottom of the vessel comprises a perforated plate 146 through which the mixture 145 is to be extruded. A light source 148 for polymerizing the extruded mixture is situated immediately below the perforated bottom of the vessel.

A glass jar standing on the anti-vibration table 157 covers the entire setup and a non-mechanical vacuum pump 158 evacuates the air under the jar, in order (a) to help the evaporation of the solvent from the extruded mixture and (b) to prevent possible movement of the fibers hit by the air molecules and (c) for eliminating acoustic waves that may also cause the individual fibers to move.

First, an evaporator is placed on the platform 153, a short array extruded and the tips of the extruded fibers 149 which naturally come pointed, are coated with a conductive layer.

Then the previously fabricated interlaced fiber array 152 is placed on the movable platform 153 on top of a replica 150 of the perforated substrate through which the fibers are to be extruded, featuring short spikes also coated with a conductive material. This structure is then positioned under the tips 149 of the extruded fibers opposite the conductive tips of the replicated substrate 180. An electric field 151 between the perforated conductive bottom 146 of the vessel and the conductive replica 150 keeps the tips of the fibers being extruded, aligned along the electric field. Two interferometers 159 mounted on the platform scan continually the distances between the fibers being extruded and the "walls" of the interstices and transmit the displacement data to a controller 156 that adjusts the piezo nanomotors 154 of the platform in a closed loop.

When the scintillation fibers seeping through the holes of the vessel reach the end of their travel the electrostatic field reaches a very high value clamping the tips of the fibers to the replica mold 150. At this stage the tips of the extruded fibers may be glued to the replica and the interlaced fiber arrays may be secured and reinforced mechanically. The interstices of the composite array may then be filled with an aerogel.

Figure 15A:
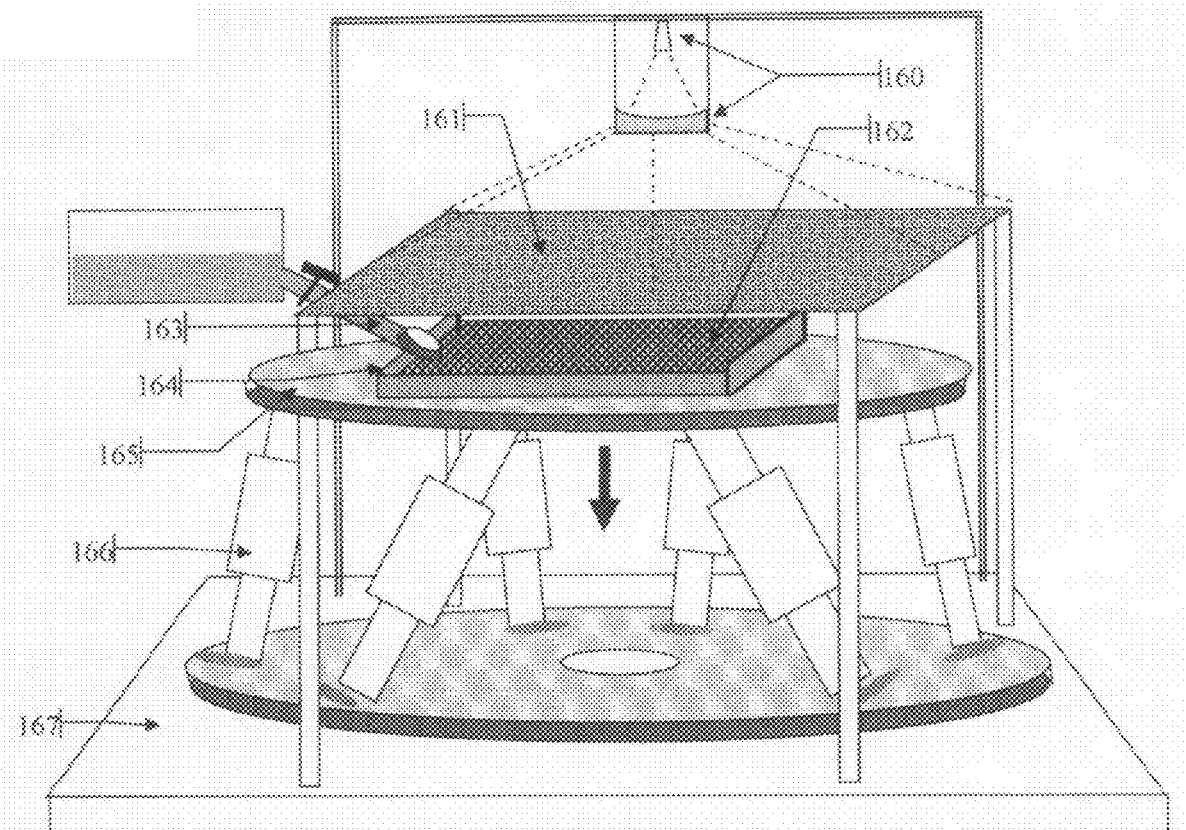
FIGS. 15a and 15b illustrates a method of gradually growing an array of orthogonally interlaced fibers, layer after layer, by curing the desired pattern of polymerizable material with UV light projected through a Phase mask
Figure 15B:
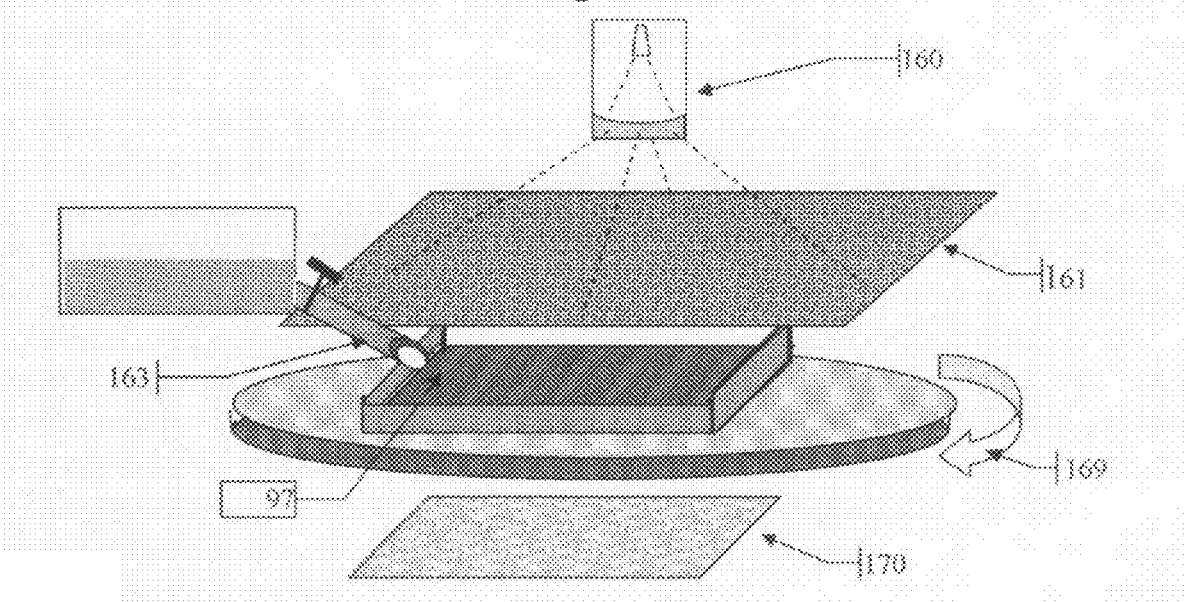

FIGS. 15*a* and 15*b* illustrate a method of gradually growing an array of fibers layer by layer. The polymerizable material 162 consists of a methacrylate core matrix, an initiator/sensitizer such as Irgacure 784 (from CIBA), a 1-2% scintillator such as p-terphenyl or PPO and a ~0.1% Wave Length Shifter such as POPOP. A thin (2µ) film of the mixture is deposited into a vessel 164 and illuminated with a pattern of light obtained by the interference of a DPSS laser beam of 532 nm with itself passing through a Phase mask 161. From there and on, the process is similar to that portrayed in conjunction with FIGS. 13*a* and 13*b* where the illumination pattern is caused by transmission through a perforated mask. The advantage of the phase mask is that it enables to obtain much finer spatial resolutions, of the order of a half-wavelength of the coherent light source 160. As the top layer of the photopolymer mixed with a scintillator polymerizes, the platform 165 on which the vessel 164 stands is lowered by a set of high accuracy piezo-motors 166, while additional photopolymer 163 is poured into the vessel 164, all at the same rate of the polymerization process. Depending on the rate of the polymerization the vessel is taken out from time to time, for rinsing out the non-polymerized material. The whole setup including a light source 160, Phase mask 161 and the vessel 164 containing the photopolymer, rest on the nano-positioning platform 165 of piezo-motors, which stands on an active anti-vibration table 167 that reduces maximal vibration amplitudes to less than a micron.

FIG. 15*b* illustrates the same process as depicted in FIG. 15*a* but with a different Phase mask 161 that projects a set of linear parallel lines of the desired width on the thin photopolymer mixture 97. The polymerization induced by the coherent light source 160 produces a plane of fibers of the desired width and depth. The non-polymerized mixture may be flushed after dissolving it with a proper solvent as methanol or acetone. After the space between the fibers has been cleaned out, a thin stretched film 170 is laid on the first layer of fibers, the platform holding the vessel is rotated 169 by 90° and a new thin layer of photopolymer is poured on the film. Illuminating this second layer through the phase mask, polymerizes and generates a layer of fibers orthogonal to the first layer. After flushing the non-polymerized mixture with a solvent a new acrylic film is stretched over the second fiber layer, the array rotated back 90° and the operation repeated. After the desired number of orthogonal layers have been deposited, the thin films may be dissolved.

Figure 16:
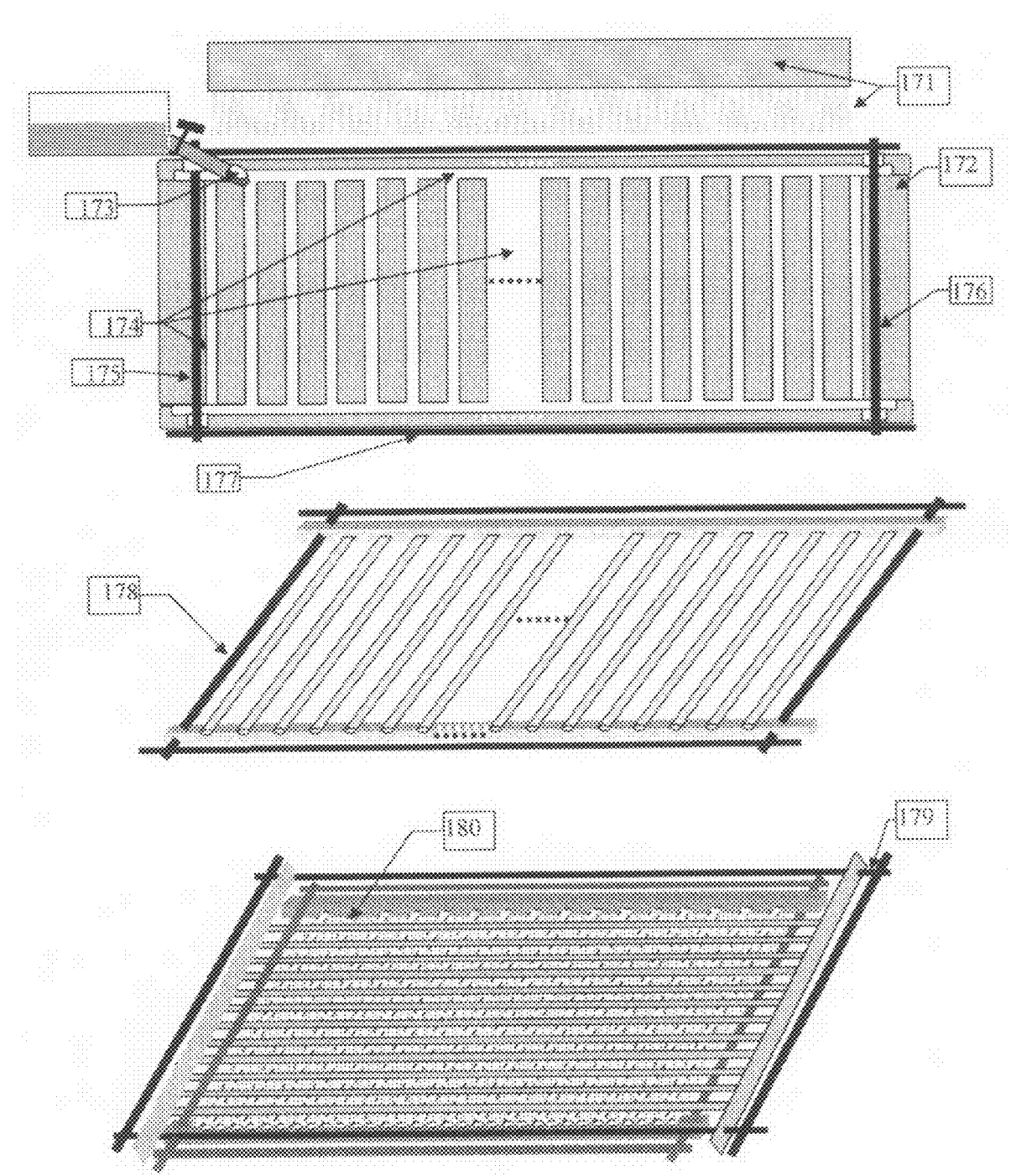
FIG. 16 illustrates the fabrication of a planar array of scintillation fibers by filling and subsequently polymerizing, a polymerizable material in the trenches of a plate.

FIG. 16 illustrates the fabrication of a planar array of scintillation fibers by filling the previously milled or lithographically etched parallel grooves 174 of a plate 175 with a mixture of non-polymerized plastic scintillator. The mixture consists of (a) styrene monomer or vinyl toluene, (b) 1-2% of para-terphenyl or PPO (2,5-Diphenyloxazole) or 1,1 4,4-tetraphenyl butadiene and (c) a Wave Length Shifter (WLS) (1,4-bis [5-phenyloxazol-2-yl]benzene) known as POPOP. The parallel grooves are connected at their top and bottom by two other trenches that run across all the length of the array. Two rigid thin bars 177 traverse the outer edges of the upper and lower trenches; the bars are connected at their end to two other bars 176 that together constitute a rigid frame that can eventually lift the fragile thin fiber array. The grooves are first coated with a non-stick material such as Teflon or Wearlon to facilitate lifting the polymerized array later on. After filling the coated grooves with the mixture, the excess liquid is scraped from the top of the plate 100 and the plate heated until the mixture is polymerized. The polymerization process shrinks the fibers and detaches them from the grooves. The rigid frame 178 helps to lift the fiber array from the plate 172. Fiber arrays 179 can be stacked one on top of another in a wood-pile like structure with a separating layer of material 180 in between. The frames 178 that help transfer the fiber array planes may be detached after positioning of a fiber array plane.

Figure 17A:
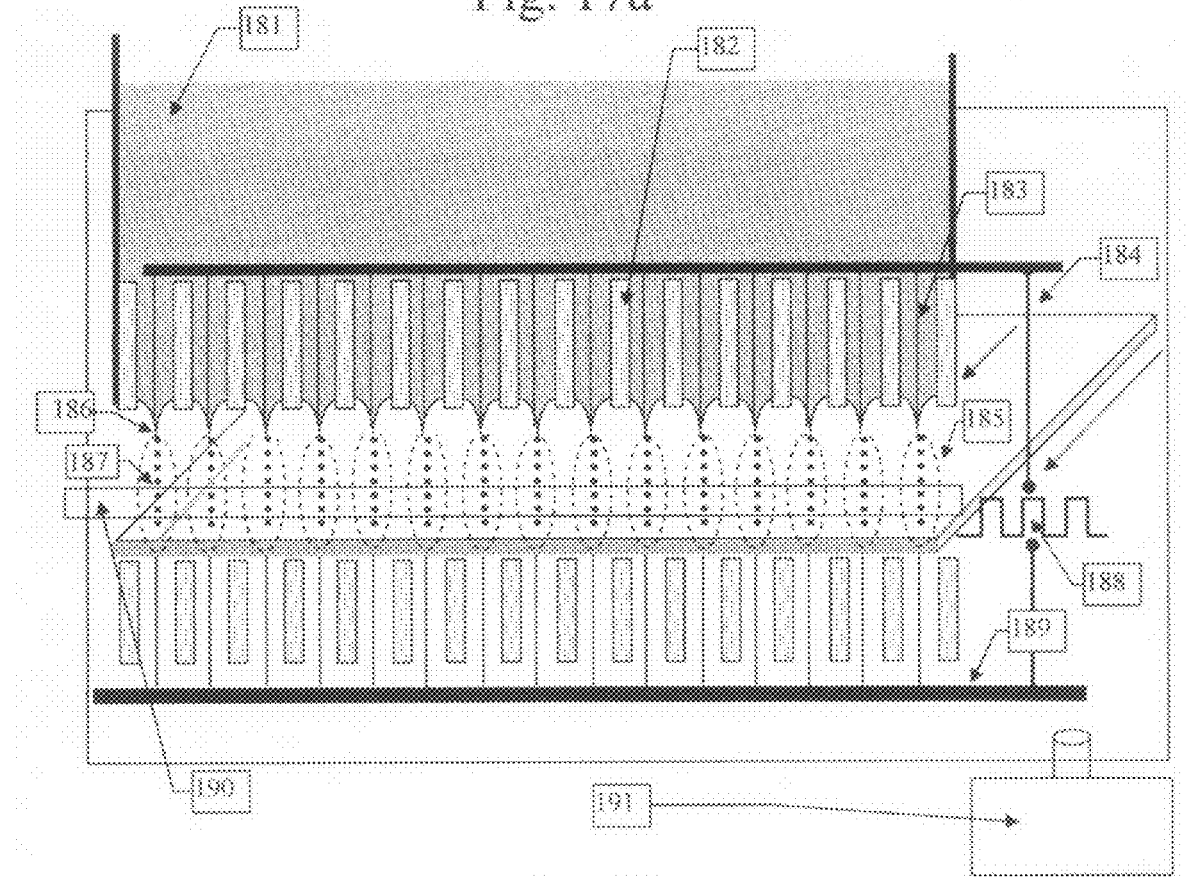
FIGS. 17a and 17b illustrate the formation of a planar array of scintillation fibers by electrically attracting and depositing on a substrate a train of polymerizable molecules.

FIG. 17a illustrates a method of depositing a planar array of fibers on a substrate situated between two arrays of electrodes, by attracting trains of molecules seeping along one set of electrodes to the second set of electrodes and on their way to land on a linearly moving substrate. A liquid mixture 181 consisting of (a) styrene monomer or vinyl toluene, (b) 1-2% of para-terphenyl or PPO (2,5-Diphenyloxazole) or 1,1 4,4-tetraphenyl butadiene and (c) a Wave Length Shifter (WLS) (1,4-bis[5-phenyloxazol-2-yl]benzene) known as POPOP is diluted in a highly aromatic solvent and fills a linear perforated substrate 182. An array of electrodes 183 is introduced into the holes and slightly protrudes out of the linear array of holes 186; the mixture seeps along the electrodes 183 by the surface tension forces. A second array of electrodes 189 is positioned below the first array 186 and a high voltage source 188 establishes an electrostatic field between the respective electrodes. The high voltage may be AC or DC but is preferably a square wave AC as it allows more control over the stream of charged molecules 116 that tend to flow from one electrode to the other, and turns the continuous stream that may develop into avalanches; into intermittent shots of short trains. A thin dielectric substrate 184 is placed immediately above the second set of electrodes and moved linearly at a pace that allows accumulation of the desired amount of material along a linear Track. To accelerate the evaporation of the solvent, a heater 190 is placed across the gap between the electrodes and a partial vacuum is established in the closed system by a vacuum pump 191.

Figure 17B:
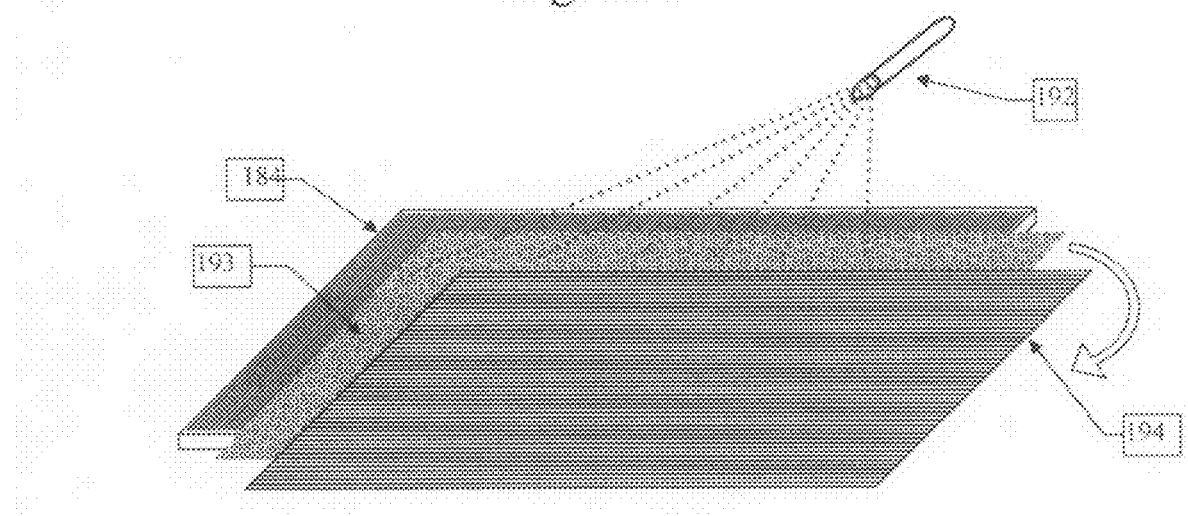

FIG. 17b illustrates the build-up of a 3D array. The substrate 184 onto which a linear array of fibers was deposited is sprayed with a spray 193 that forms a thin film that can eventually be dissolved or ashed out. The coated substrate is then rotated by 90°, and then a second layer of fibers 194 is deposited over the first layer separated by the thin film. The process may be continued until a cube of mutually orthogonal planes is constructed.

FIG. 18 illustrates a method of manufacturing a woodpile-like fiber array 206 by using two orthogonal linear arrays 201 and 203 of inkjet nozzles with micron sized nozzle orifices. The plastic scintillator solution can be squeezed out of the nozzle orifice by generating an ultrasound pressure wave on-demand. The substrate on which a linear fiber will be deposited drop-after-drop, has to be hydrophilic so that the drop will not spread and will dry on the spot when irradiated with a microwave source. To keep the drops from spilling and spreading over the substrate a linear array of needles 196 hang over the exit of the nozzles from where the drops 197 of plastic scintillator solution are ejected. A high voltage 195 between the needles and the substrate form an electrostatic attraction on the drops that are attracted to the needles and keep from spilling over until they solidify under the heat or microwave radiation.

It may also be necessary to repeat the deposition of each layer several times until the desired thickness is attained. After the desired thickness is obtained a thin separating film 204 is deposited on the layer, before starting the deposition of the next orthogonal layer.

Figure 19A:
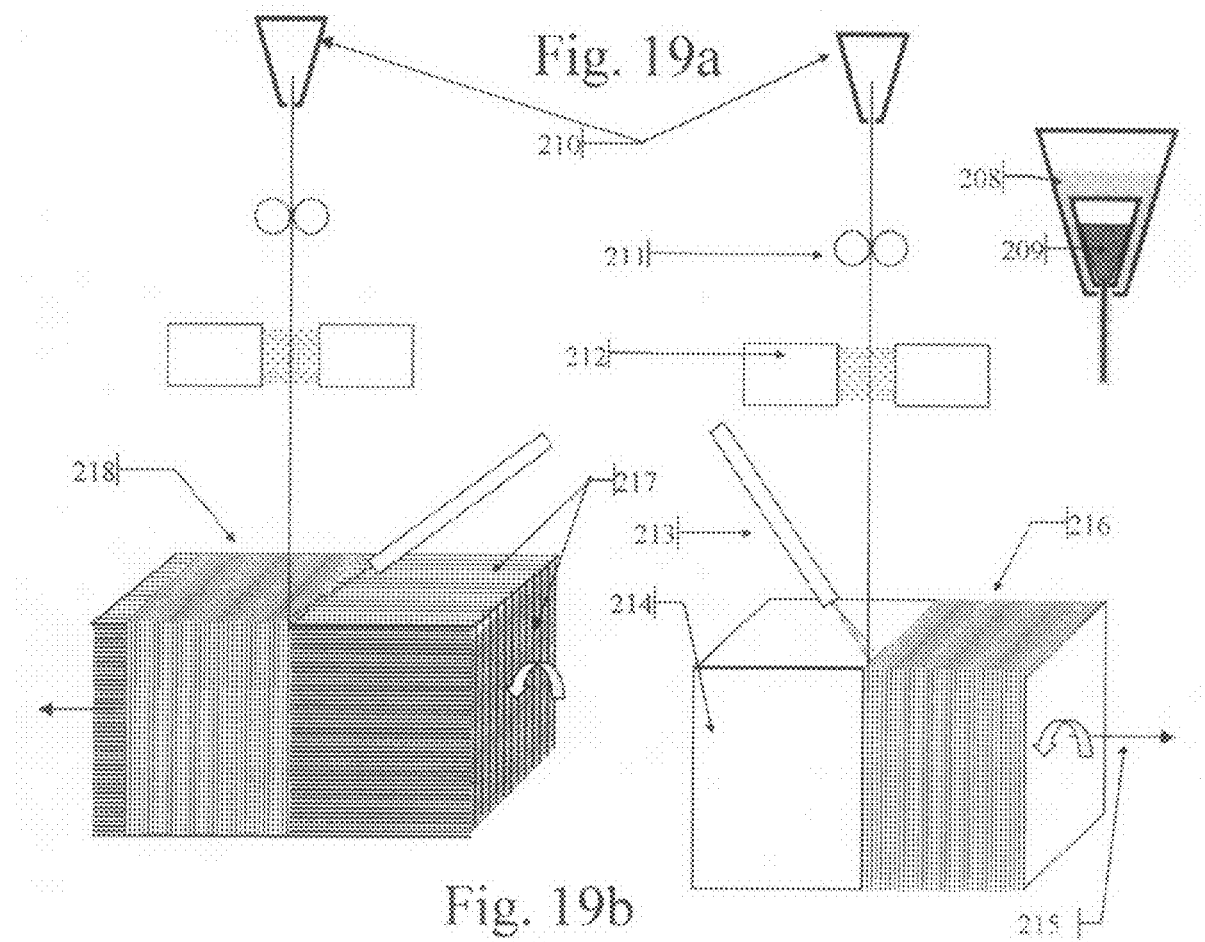
FIG. 19a illustrates the drawing of a plastic scintillator fiber through a pressurized nozzle and wrapping it around a mandrel, while changing the wrapping direction by 90° after every layer.

FIG. 19a illustrates the fabrication of a 3D fiber array by wrapping a single plastic scintillator fiber, first around a block 214 having a rectangular cross-section to obtain a single layer 216 and then rotating the block by 90° and wrapping around it, in the orthogonal direction a following layer 217. Turning the block another 90° and wrapping a layer 218 around, starts to cover the previous layers with a second layer in the orthogonal directions to the first two. Continuing the process builds layer upon layer in the 3 orthogonal directions. The process thus builds 4 3D fiber arrays consecutively over 4 of the faces of the block 214. The fiber is drawn from a "tower", using a technology well known in the art to produce optical glass fibers, with the difference that the plastic scintillator material softens at much lower temperature of around 120° C. The plastic scintillator material consist in either partially polymerized styrene BC-490 supplied by Saint-Gobain Crystals or a self-prepared non-polymerized solution described in connection with FIG. 17a. The partially polymerized soft mixture is pressed through a small orifice and additionally drawn by force through sets of rollers 211 that reduce the cross section of the drawn fiber. After the desired cross section is obtained the fiber is cured by passing it through a n IR or microwave beam 212. As the cured fiber is wrapped around a revolving block 214, it is sprayed 213 with a light foam such as aerogel nano-particles or a vaporized aerosol on the basis of teflon. Alternatively the fiber may be extruded through a double nozzle 208, 209 that extrudes a plastic scintillation core, clad with a thin teflon, or other material with a low refractive index, coating.

Figure 19B:
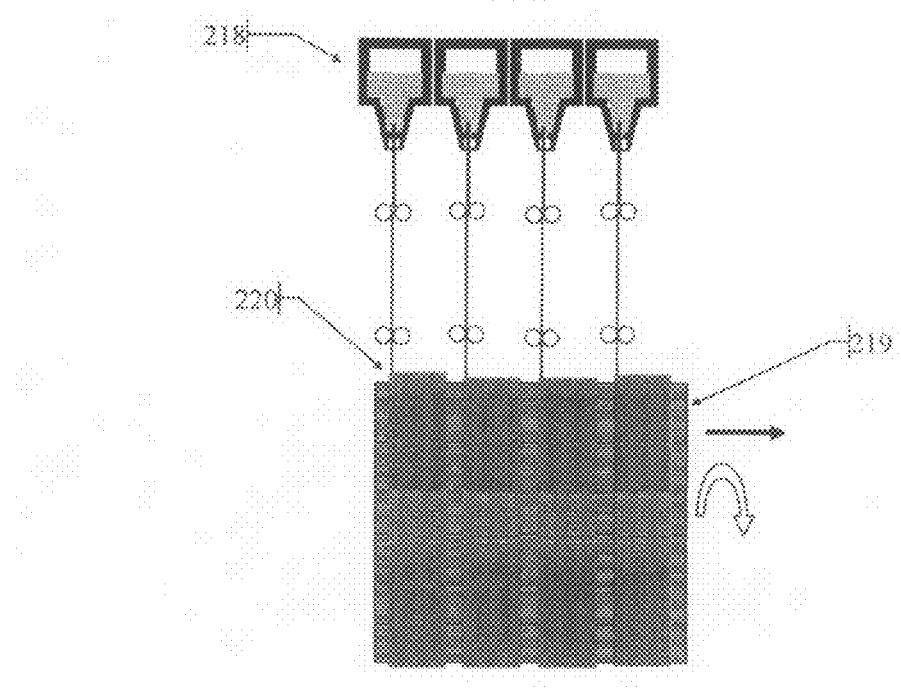
FIG. 19b illustrates an array of nozzles wrapping simultaneously several fibers around a mandrel while advancing said mandrel in a direction normal to the wrapping direction, so that the fibers are at a desired distance one from the other.

FIG. 19b illustrates a multi-nozzle setup 218 for accelerating the process. For example, in a linear array of (n) nozzles, if the minimal width of a nozzle is (D) and the cross-section width of the fiber is (d), then (D/d) consecutive fibers may be laid side-by-side, before over-stepping the fibers laid by the adjacent nozzle. If the fiber array is an (N×N) array, then the number of parallel nozzles that can be used is n=N/(D/d). Thus for example if the desired fiber width d=2µ, N=5000 and the width of a nozzle is 1 mm, then 10 nozzles could be put to work in parallel, each nozzle wrapping 500 rounds until it reaches the boundary of the next nozzle 220. The mandrel will then be turned 90° and again the simultaneous wrapping will resume.

FIG. 20 illustrates an alternative way of measuring the electron track's parameters, in a different way than structuring the scintillation detector as a 3D array of very fine fibers. The electron track 223 formed in a scintillation crystal 221 is in effect a momentary source of photons that could be photographed with a digital camera 225, the image transmitted to a processor and its characteristics namely, point of interaction, length and direction, could be determined in real time. There is no impediment for implementing this alternative if the crystal is very small and thin. The solid angle (ω) 228 tended by any of the 6 faces in a symmetric configuration is (4π/6). Thus a lens 224 close to the face of the scintillation crystal 221 could collect on the average (⅙)th of the number of photons emitted by a track and refocus them on the photosensor. In a BGO crystal at low energies, the track range of a 140 keV photoelectric electron is ~64μ; assuming 8 photons/keV, 186 total photons or approximately 3 photons/μ would be collected by the lens which would be sufficient for an Avalanche Photo Detector to detect the track with high accuracy. Two orthogonal views with 2 cameras 225 would give the position in 3D of the track.

However in a reasonably thick crystal and a camera at reasonably distance, the "depth of field" problem arises. In a regular digital camera the lens 224 would focus an object at a distance (S) on a given plane where the CMOS sensor is. If the object is at a different distance, one has to either change the place of the lens or the focal plane where the CMOS sensor is; otherwise if the focal plane 227 is behind the sensor, the image of a point on the CMOS sensor would appear as a blurred circle 227b. Therefore the challenge is to image the track that could be anywhere in the crystal.

There is a way though to "deblur" the obtained image by deconvolving the "Point Spread Function" PSF from the detected blurred image. The "Point Spread Function" for different distances from the lens can be calculated ahead of time and the average distance from the lens could be found by integrating the number of photons detected by the Photosensor. This number of photons would change by approximately a factor of 10 over the width of the crystal, from (4π/6) at the middle at a distance (d=r) to close to 2π (say 80% of 2π) when the distance d=0 and $(4π/6)/2^2 = π/6$ when the distance (r) is doubled. Imaging the Track from two symmetric positions 224b and 224c would somewhat linearize the distance function.

Once the distance is approximately known, using the appropriate "PSF" the blurred image could be deconvolved and deblurred to a certain extent. Keeping in mind that the energy of the track is obtainable whether the image is blurred or not, the other 2 characteristics of the track, its direction and the beginning of the track could also be calculated with a slightly blurred image.

Figure 21:
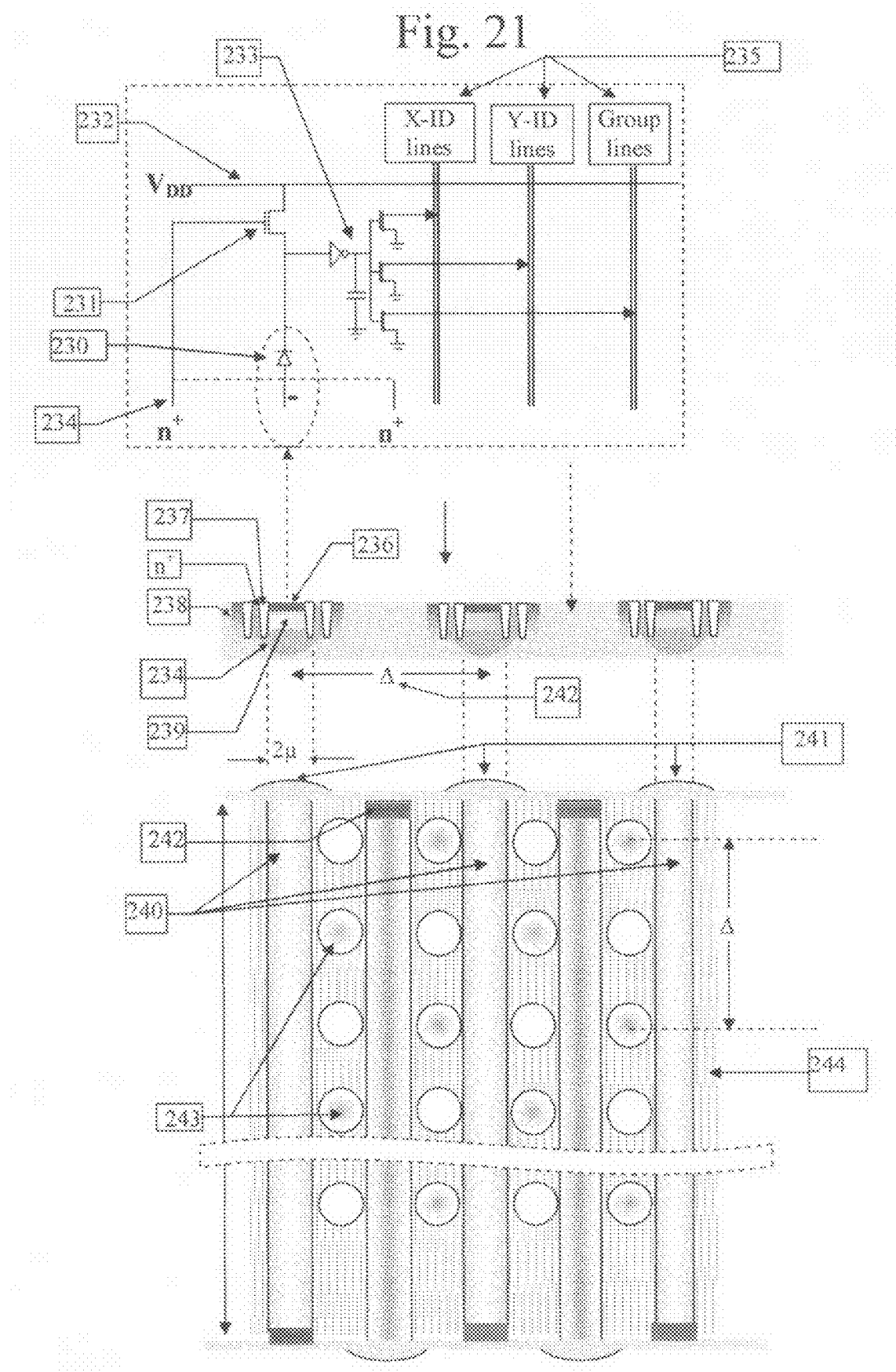
FIG. 21 illustrates the detection of the photons propagating along the fibers of the array with Geiger-mode CMOS cameras.

FIG. 21 illustrates a method of detecting the photons propagating along the fibers of the array with a Geiger-mode CMOS camera which may be juxtaposed to the ends of the fibers by a thin layer of adhesive and an anti-reflective coating. Another alternative is to optically couple the fibers with the silicon substrate by an array of lenslets 241 connected to the ends of the fibers.

The Geiger mode CMOS camera is fabricated on a substrate of p-doped silicon. A shallow p-n junction is formed between the n+ cathode 234 and the p+ anode 236 on the same side of the substrate, separated by STI (shallow trench isolation) 237 leaving the front side to be coupled to the plastic fiber. A guard ring 237 of $p^+$ silicon shields the n-p junction from cross talk with neighbor pixels. The p+ anode is biased much below the breakdown voltage of the p-n junction at $(-V_0)$ and the $n^+$ cathode is at $V_{DD}$~5V 232 so that the junction is biased at $(V_0+V_{DD})$. The bias of the $p^+$ anode $-V_0$ is determined empirically so that $(V_0+V_{DD})$ is slightly below the breakdown voltage for a shallow junction 239 suitable to fully absorb the 420 nm photons. An incoming photon absorbed in the shallow junction generates a hole/electron pair; the electron attracted to the anode initiates a breakdown of the field and causes a generation of n avalanche of electrons equivalent to a large $~10^6$ amplification. Once a breakdown starts, the p-n junction may be viewed as a current source 230 effectively shorting the transistor 231, thus reducing the bias across the shallow p-n junction below the breakdown voltage and effectively quenching the avalanche. The time it takes to quench the avalanche is mainly dependent on parasitic capacitances; the process takes up 100 nsec which is several times the scintillation lifetime of a plastic scintillator. A long quenching time is not desirable as it may spur the regeneration of the avalanche process and generation of secondary and tertiary after-pulses. Thus inserting an active quencher in every pixel reduces appreciably the noise of the system.

The current spike produced during the avalanche may be sufficient to transmit the signal through the readout lines 235 to an external electronic circuit for further processing. If however the current spike is not large enough to overcome all the parasitic capacitances, an additional operational amplifier 233 and 3 FET drive the signal through the readout lines that transmit the signal to the ends of the pixel array. The noise sensitivity of the Geiger mode CMOS photo-sensors requires that the active part of a pixel be at a distance of 3-4 times the pixel size.

Therefore although the fibers of the interlaced fiber arrays are separated by a distance equal to one fiber, using two CMOS sensors and reading every other fiber from its other end, increases the distance between active pixels 3 fold, as illustrated in FIG. 21. Thus in this kind of a setup 4 cameras are needed to image the Track.

As the Geiger mode CMOS camera of our design is supposed to detect the electron Tracks engendered by the gamma or X-rays interacting with the fiber array, all the fibers in the two or three orthogonal fiber arrays generate scintillations almost simultaneously, within a time window of ~3τ, 3 times the decay constant of the scintillator. This time window translates to 9 nsec for plastic scintillators, As this is a stochastic process this means that the scintillations emitted during the stopping of the electron along the Track are not correlated with a position along the Track. However as the loss of energy along the Track (dE/dx) is in inverse proportion to its velocity (v) dE/dx~C [1/v], relatively more scintillation photons are emitted at the end of the Track than at its beginning. So although the arrival time of a single photon in a Geiger mode operation may be detected with subnanosecond accuracy, for the purpose of of finding the Track position the needed accuracy is 3τ which for a "scatterer" made of plastic scintillator fibers is ~10 nsec. The readout scheme has therefore to read all the pixels that were "hit" within a time window of at least 10 nsec in order to reconstruct the position of the Track. This applies to the two or three cameras that view the composite 3D array of fibers. In addition to the time window constraint, a Track is also characterized by the "substantial continuity" criterion, meaning that the electron Track traverses "neighboring" fibers that are one adjacent to the other. This criterion is stricter at the beginning of the Track where the coulomb scattering's effect is still minimal. As the coulomb scattering becomes important successive interactions may occur in fibers farther away than in the neighboring ones. So the "substantial continuity" criterion at the beginning of the Track may be expressed at the middle and end of the Track as a "cluster of pixels" criterion where the width of the cluster increases towards the end from ±1 pixel to ±3 pixels. The additional criteria are useful for differentiating between Tracks that although occurring within the same window are separate events occurring at different parts of the 3D fiber array.

As in a typical X-Ray detector counting rates may be of the order of $10^6$ events/cm$^2$, it is impossible to image the high rate of electron tracks created by a high flux of X-rays, using a regular X-Y grid scanned at high frame rates of tens or even hundreds frames per second. Although a direct, list-mode readout scheme of each and every pixel may be used, it becomes impractical for large arrays.

Figure 22:
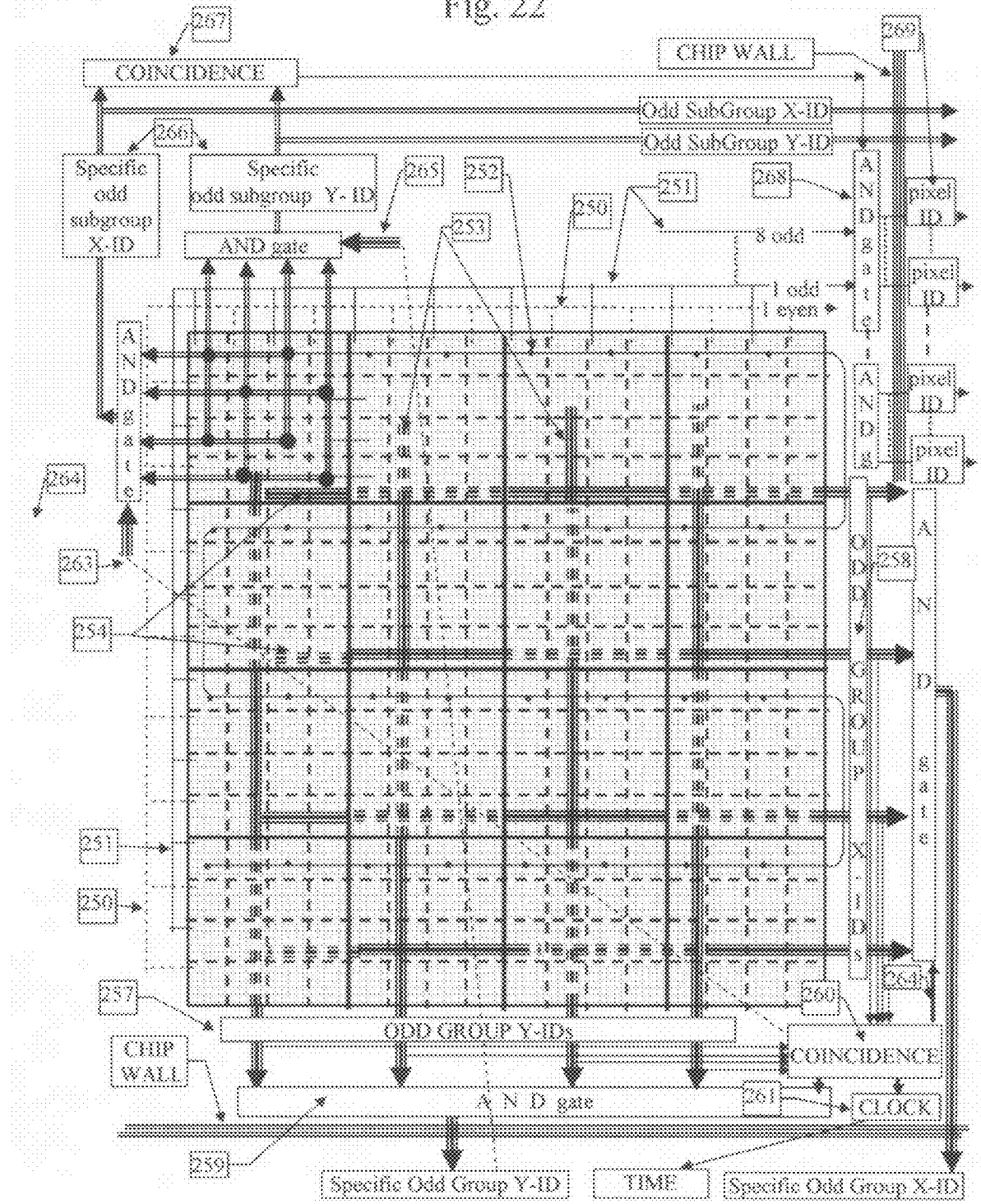
FIG. 22 illustrates a readout method suitable for reading the addresses of a sequence of adjacent pixels of a Photodetector Camera activated simultaneously.

FIG. 22 explains one way to organize the readout of large photo-detector arrays taking in account the above criteria while trying to minimize the number of readout communication lines that must traverse the pixel array. The main idea is to define a subgroup of the size of a Track, given the radiations it is supposed to detect and have a readout scheme that reads all the pixels of the subgroup in parallel. For example a 16×16 pixel sub-subgroup that has 22 pixels across its diagonal will be able to read 16 to 22 fibers. If the fibers are 2µ diameter; in a 3D fiber array read by 4 cameras as illustrated in the previous FIG. 21 the range of an electron traversing the fibers laterally would be (16×2×4)=128µ and if traversing the 16×16 array across its diagonal could be as large as (22×2.8×4)=246µ. Taking in account the "odd", "even" architecture that takes in account the Tracks that cross over to neighboring sub-subgroups, the electron tracks that could be with such an architecture is as large as twice the 128µ to 246µ range.

Therefore if a subgroup of 16×16 is defined, the Track will always stay within the subgroup or cross the border and traverse fibers of the neighboring subgroup. The readout scheme therefore consists in reading in parallel all the 256 pixels of the 16×16 subgroups, but connect the respective pixels of all the subgroups and in addition identify the specific subgroup in a X,Y scheme. Knowledge of the subgroup resolves the ambiguity of the specific pixel identification.

The core principles of the readout scheme are as follows:
1. The very large array is divided into a multi-level hierarchy of several smaller nested arrays. In the illustrated case, the array of $(16)^3$ pixels is divided into a 3-level hierarchy; it contains 16 groups of pixels, where each group is divided into 16 subgroups of 16 pixels each.
2. The size of the smallest array in the multi-level hierarchy is selected to be of the order of the length of the electron tracks; in the illustrated case the lowest level array is 4×4=16 pixels which can contain a 4-pixel long track.
3. All the pixels of the array at the lowest level hierarchy are to be read simultaneously.
4. As the lifetime of a track in a plastic scintillator is of the order of $10^{-8}$ sec, we may surmise that no two tracks will hit the detector within a time window of 10 nsec. This is the one track at a time assumption. Note that a track may extend through 2 adjacent subgroups of pixels at most. In some rare cases where a track may cross 3 adjacent subgroups, a "proximity" criterion applied at subsequent data processing stage, is used to resolve the ambiguity that the following readout scheme may create, and either decide to reconstruct the track or reject it.
5. The respective pixels of all the lowest level arrays are linked onto several connected lines 250, 251 so that any two pixels in such a collection are situated on the array at a geometrical distance larger than the track length. The number of such a collection of lines equals the number of pixels in a sub-group and the number of pixels in such a collection of lines equals the number of all the sub-groups. In the illustrated readout scheme there are 16 such collections of lines and each such collection links 256 pixels which are geometrically at 4 pixels apart, each from the other.
6. At the intermediate hierarchy level there are 16 subgroups in each of the groups; in total (16×16)=256 subgroups in the entire array. Each subgroup contains 16 pixels linked together 252 for the purpose of defining the subgroup. The output signal of a subgroup is the aggregate of the current output of all the signals originating from the pixels hit by the photons originating from the track. While the aggregate signal on the one hand is higher than the single pixel output, it is also attenuated by the parasitic capacitance of the mesh connecting all the pixels of the subgroup.
7. At the intermediate level, the subgroups are first divided into "odd" and "even" subgroups, such that no "odd" subgroup is adjacent to an "even" subgroup and vice versa. Thus a track may cross at most one "odd" subgroup adjacent to an "even" subgroup. The figure shows the "odd" subgroup connections only 252
8. Two grids of rows (X) and column (Y) lines traversing the array connect the internally linked "even" and "odd" subgroups 253, 254 situated along these lines. A time coincidence 260 between the respective X 258 and Y 257 lines of the "odd" and "even" subgroups, determines the specific subgroup(s) traversed by the track.
9. In large arrays, defining a third hierarchical level reduces the number of coincidences required in order to identify the specific subgroup(s) traversed by the track. In this case the square root of the total number of subgroups is defined as the intermediate level. In the illustrated example of an array of 4096 pixels, the intermediate level consists of 16 subgroups each divided into 8 "odd" and 8 "even" subgroups; in this case two 4×4 X-Y grids 253, 254 will identify the specific "odd" and/or "even" subgroups where the track is located. In a (256)3=16 megapixels array, the 3 hierarchical layers contain 256 elements each. While the lowest level readout is arranged as described in section 5 above, the intermediate level of subgroups and the top level of groups are read by (16×16) X-Y grids respectively. The specific group and the specific subgroup, whether "odd" or "even" are identified by coincidence between the X and Y lines of the respective grids.
10. Once the specific "odd" and "even" Groups coordinates have been identified, the coincidence outputs 263, 264 are used to gate the "odd" and "even" 265 X-Y grids of the respective subgroups and thus identify the specific "odd" and "even" X and Y coordinates of the "odd" and "even" subgroups 266 where the track lies.
11. The outputs of the specific subgroups that are in coincidence 267 are then used to gate the outputs of all the pixels in the specific subgroups ("odd" 268 or "even") to identify the specific pixels whose signals are within the time coincidence window.

12. The following table summarizes the logic of identifying the coordinates of a track extending across two hierarchy elements in two arrays with 3 hierarchy levels of nested groups, subgroups and pixels.
13.

| track length | array size | lowest element size | # readout lines of lowest level | # readout lines of mid level | # readout lines of top level |
|---|---|---|---|---|---|
| 4 pixels | $(4 \times 4)^3 = 4096$ | $4 \times 4$ | 16 | 16 | 16 |
| 16 pixels | $(16 \times 16)^3 = 16,777,216$ | $16 \times 16$ | 256 | 64 | 64 |

The way to allow a readout of tracks larger than the size of a symmetric lowest element is by linking all the pixels across lowest level elements, distanced each from the other by the length of the track. In this way the size of the lowest element in the hierarchy is separated from the track length. If for example the track size is expected to be twice the width of the lowest element, the respective pixels of subgroups that are 2 subgroup apart are linked. Therefore the number of pixels that have to be read simultaneously is twice the number of pixels in a subgroup.

Figure 23:
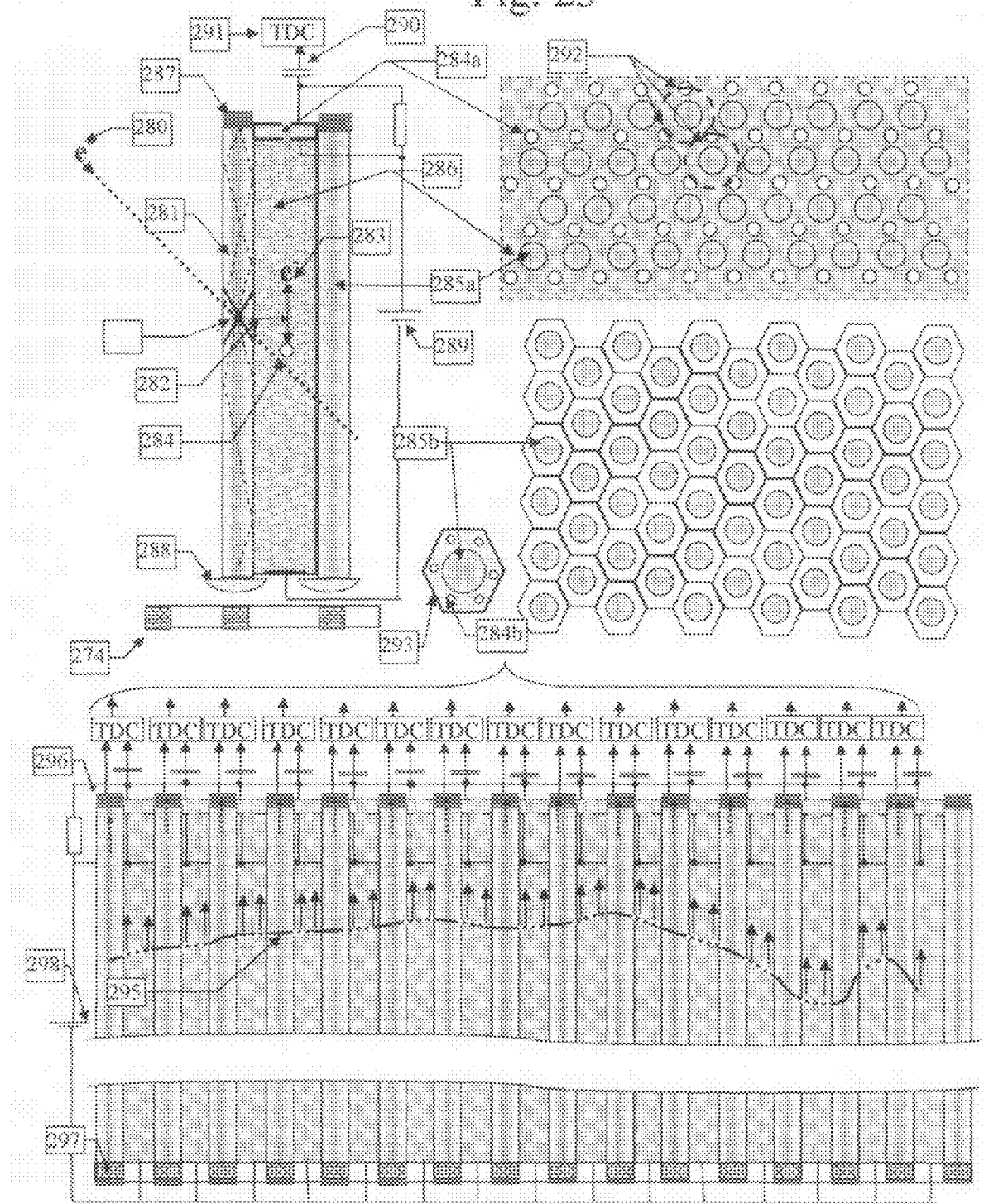
FIG. 23 illustrates a combination of a fiber array and a drift chamber to image an electron Track to find the position along the fiber hit by a gamma ray.

FIG. 23 illustrates a new detector interlacing a fiber array and a Time Projection Chamber (TPC) to image an electron Track with high accuracy. The fiber array which is several hundred times denser will practically be the stopper of the electron Track and will give the projection of the Track in 2D. However the 3rd dimension of the Track, along the traversed fibers may be obtained by finding the position of the scintillations that escape from the fiber close to the place of interaction, being out of the critical angle cone. The position of these escaped photons may be found by finding the drift time in the TPC formed in the interstices between the fibers. This combined structure has several advantages as compared with a straight TPC; the stopping efficiency is two orders of magnitude higher, the spatial resolution extended to 3D is in the micron range and the counting rate may be much higher as the system is non-paralyzable in the sense that only the pixels viewing the Track are paralyzed.

The figure illustrates an electron 280 interacting with a scintillation fiber 266 causing the emission of scintillation photons. The photons within a cone 281 defined by the critical angle will propagate to both ends of the fiber. A dielectric mirror 287 at one of the ends will reflect the photons reaching it, back towards the other end 288 where they will be focused by a lenslet 288 onto a pixel of a Geiger mode CMOS camera. However the photons outside 282 the critical angle cone will escape the fiber and enter the space between the fibers filled with a gas, preferably with DME (DiMethyl-Ether) that has a low drift velocity. A scintillation photon will ionize the gas creating an electron 283 and an ion 284 that will drift in opposite directions in the presence of an electric field created by a high voltage 289. At a pressure of 15 psi and an electric field of E=400 V/cm, the drift velocity of the electron 283 will be around 2 mm/µsec. Thus if the fiber length is 2", the drift time from one end to the other will take 25 µsec. The electron will at the end, enter a very high electric field region formed either by a hole 284a in a thin polymer with a high voltage differential between both sides. The very high field will cause a breakdown of the field and an avalanche that will produce a high current pulse 290. Thus the arrival time of the electron can be registered with subnanosecond precision. As the travel time of the photons within the fibre is less than a nanosecond, wherever the interaction happened, the drift time that can be as high as 25 µsec is proportional to the distance of the interaction point within the fiber. The nanosecond accuracy of the Drift time of the electron is translated into a precision of 2µ of the travel distance.

Figure 24:
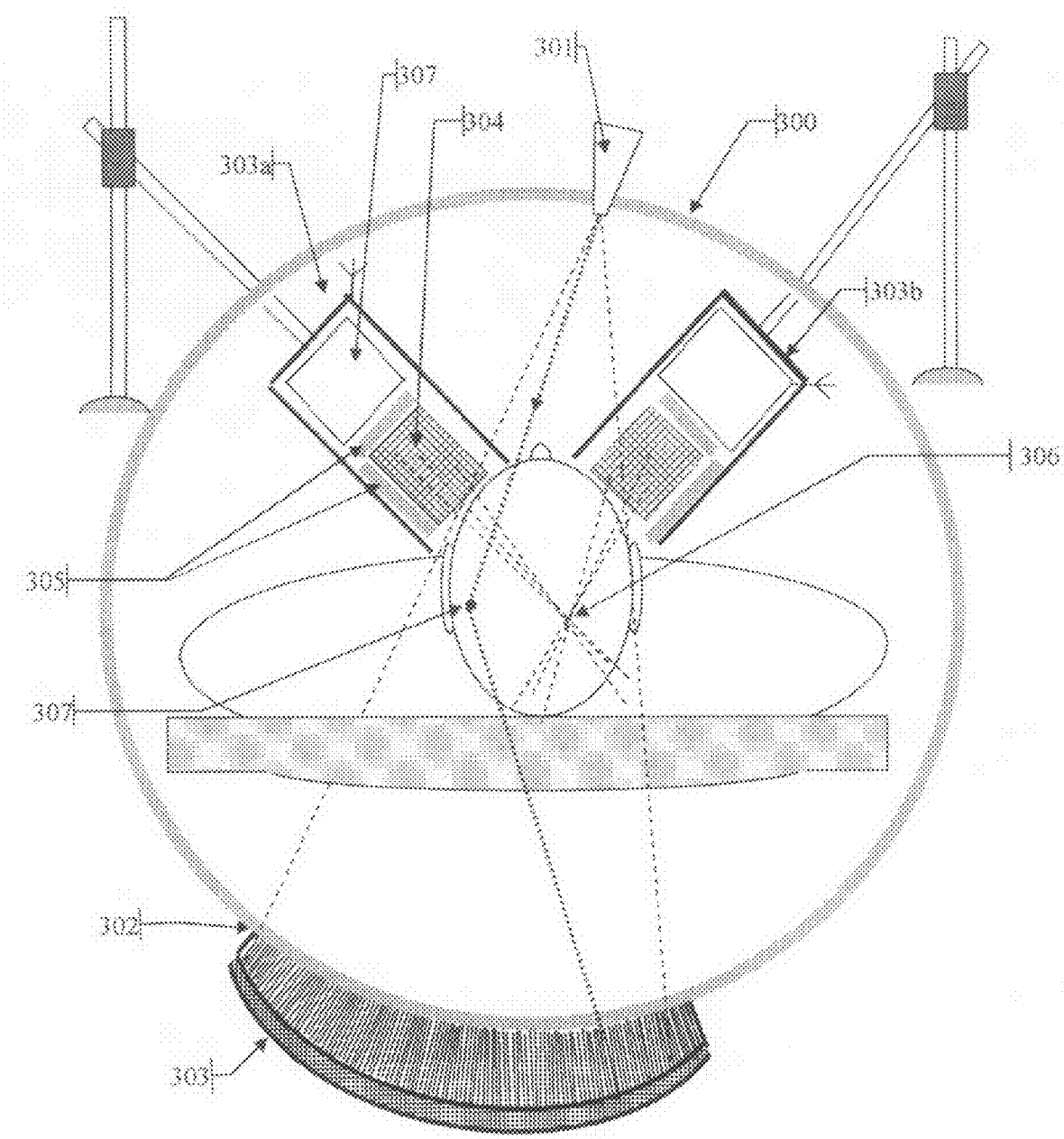
FIG. 24 illustrates a SPECT/CT where the radio-isotope imaging tomography is obtained by two Directional Track Cameras and the CT detector uses a conical fiber array able to differentiate straight rays coming from the X-ray tube from body scattered X-Rays.

As the DME gas surrounds all the fibers, avalanches will develop all around the fibers and detected by the anodes 292 of the TPC. However as the several TDC/CLOCKs (Time to Digital Detector or Clock) 291 have to be triggered by a specific Photo-detector 285a, averaging the drift time(s) of all the avalanches activated by the same optical signal, will determine the average distance of the event along the fiber. As the electron Track 295 traverses successive fibers, a "cluster" of avalanches will develop all around the Track; the Track of the electron will be determined by finding the center of gravity of the avalanches around the fibers. The avalanches may be limited to the region around a fiber 285b if the fibers are placed within thin tubes 293 of pentagonal cross section, like in a honeycomb surrounded by tiny holes 284b across which the avalanches develop. Such a structure would localize the avalanches and better define the specific fiber hit by a traversing ionizing radiation FIG. 24 illustrates the essential parts of a CT/SPECT multi-modality imaging system using Track detectors. In the CT module 300 the illustrated detector 302 is of the divergent fiber array type as illustrated in FIG. 6 54. A divergent fiber array 302 with a single CMOS ADP camera 303 is the most suitable for detecting X-rays that will knock-off electrons in the direction of the fibers and will stay largely confined within that fiber. However X-rays scattered in the head of the patient 307 will enter the detector in a direction non-parallel to the fibers, their knocked-off electrons will traverse several fibers and will easily be rejected electronically based on the number of pixels they triggered in coincidence, without a need for a collimator or grid. Moreover measuring the energy of the electrons largely confined to single fibers enables to sort them according to their energy which is the specific energy of the X-Ray photon emitted by the X-Ray tube that has a continuous spectrum. Thus the images obtained with the divergent fiber array detector will show very high resolution of the order of microns, less scatter and may be sorted by energy.

The Track Cameras 303a and 303b can be used independently or together as they are inherently tomographic and will each give the direction of the detected gamma rays. For reconstructing a tomographic image though, 2 Track cameras will give a better spatial resolution 306 as the point of intersection of the rays indicating the gamma ray direction, are better defined and sharper. The Track Cameras will be of the 2 interlaced fiber arrays 304 type viewed by two Geiger Mode CMOS type photo-detector arrays 305 and will give the direction of the incoming gamma ray by detecting the photoelectric electrons and differentiating them from Compton electrons by their Range. As the Track Cameras don't need collimators they are much more efficient than cameras that don't measure the direction of the gamma ray and can produce functional images within seconds instead of minutes.

Figure 25:
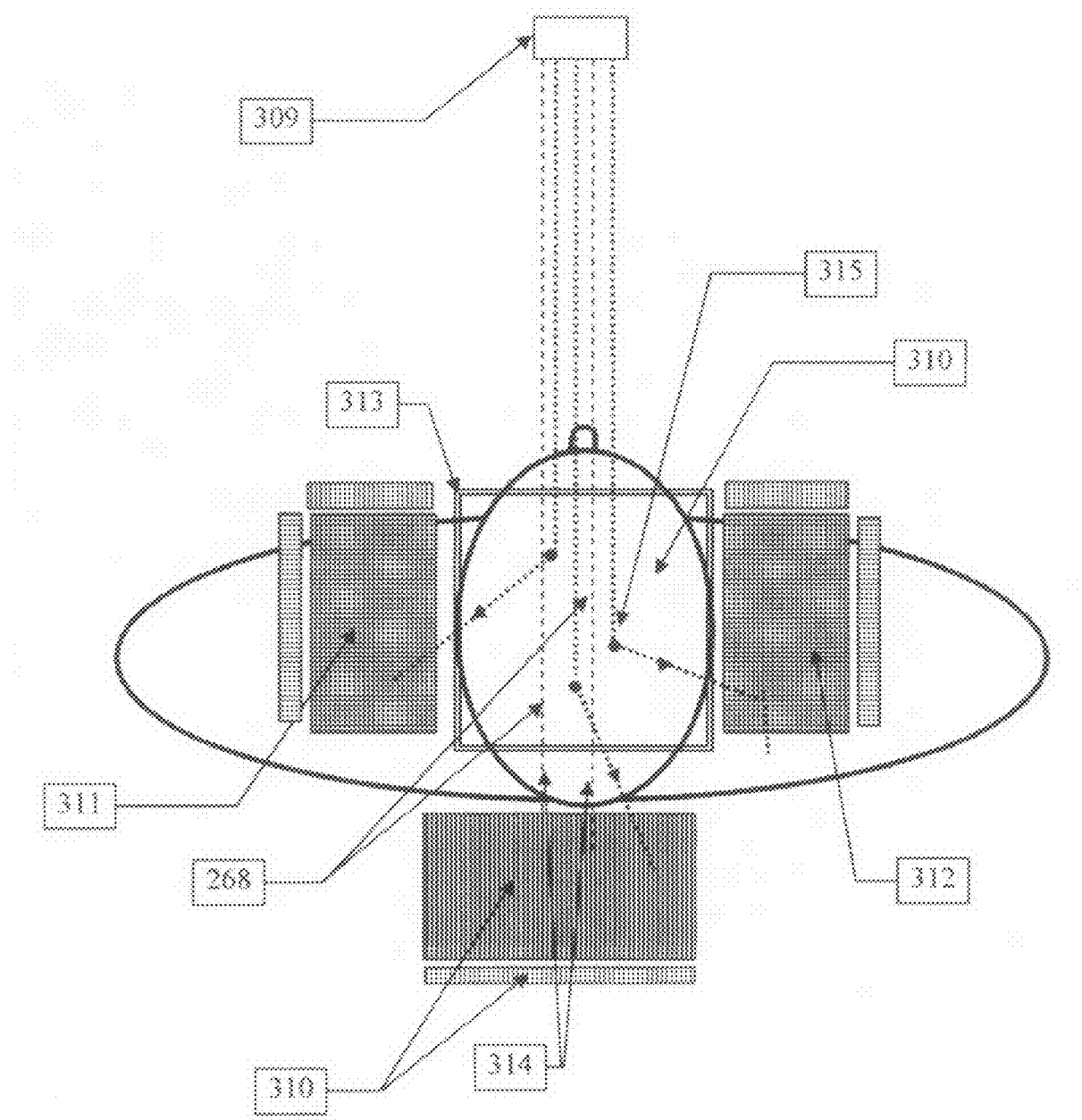
FIG. 25 illustrates a multi-modality imaging of the head for transmission imaging using a parallel beam X-Ray tube and a straight fiber Directional Track Detector and simultaneously imaging the scattering structures with several Directional Track Detectors orthogonal to the direction of the X-ray beam.

FIG. 25 illustrates a high resolution, multi-energy imaging of the head with a parallel beam X-Ray tube 309 detecting simultaneously both the transmission images, without a collimating grid and the Compton scattered images. It has to be realized that while the transmission images give the "contour" of the higher density regions, the Compton scattering images give precisely the density of these "higher density" regions; the two images are complementary.

The transmission images are obtained with a straight fiber array Track detector 310 with one Geiger mode CMOS camera that detects the knocked-off electrons in the direction of the fibers 314 and stay largely confined within them, although at the end of their track they may "wander" to the adjacent fibers. However scattered X-rays 315 will knock-off electrons that will traverse several fibers and will easily be rejected based on the number of pixels they triggered in coincidence. Measuring the energy of the electrons largely confined to single fibers enables to sort them according to their energy which is the specific energy of the X-Ray photon emitted by the X-Ray tube that has a continuous spectrum. Thus the images obtained with the straight fiber array detector will show very high resolution of the order of microns, less scatter and may be sorted by energy.

3 additional Directional cameras of interlaced fiber arrays 311, 312 and 313 detect only the Compton scattering events and measure their direction. The direction information obtained by the 4 Directional cameras may be combined to give a tomographical "electron density" image of the head.

In principle the ensemble of the X-ray tube and the directional Cameras may be rotated around the patient, full circle or partially giving a set of images similar to a multi-slice PET/CT and SPECT/CT imaging, with the addition that the CT images may be sorted into a set of energy dependent images and the transmission images may be complemented with "electron density" images.

In applications where the source of radiation is an X-ray tube where its position and energy spectrum are known, the ability to measure independently the energy of a single X-ray and its direction enable to find other parameters extremely useful for diagnostic imaging.

If the measured direction of an X-ray coincides with the position of the X-Ray tube, then the measured energy gives the specific energy out of the spectrum emitted by the X-ray-tube. Thus all the X-rays detected by the detector may be sorted into different energy slots as if they were obtained with monochromatic X-rays. As the specific absorption of X-rays is energy dependent, a series of images related to different X-ray energies enables to better differentiate the absorbing tissue.

On the other hand if the measured direction of an X-ray does not coincide with the position of the tube, it means that it is a scattered X-ray. Given the fact that in the energy range of 40 to 100 keV for tissue the Compton effect is much larger than the photoelectric effect, scattered X-rays if not eliminated strongly blur X-ray images and are traditionally rejected by a grid. A very fine grid however also absorbs some of the non-scattered direct X-rays that may come at an angle. Therefore eliminating the grid while being able to discern between scattered and non-scattered X-rays, improves detection efficiency. In addition detecting the scattered X-rays and their direction, enables to obtain an "electron density" image of the irradiated tissue.

Figure 26:
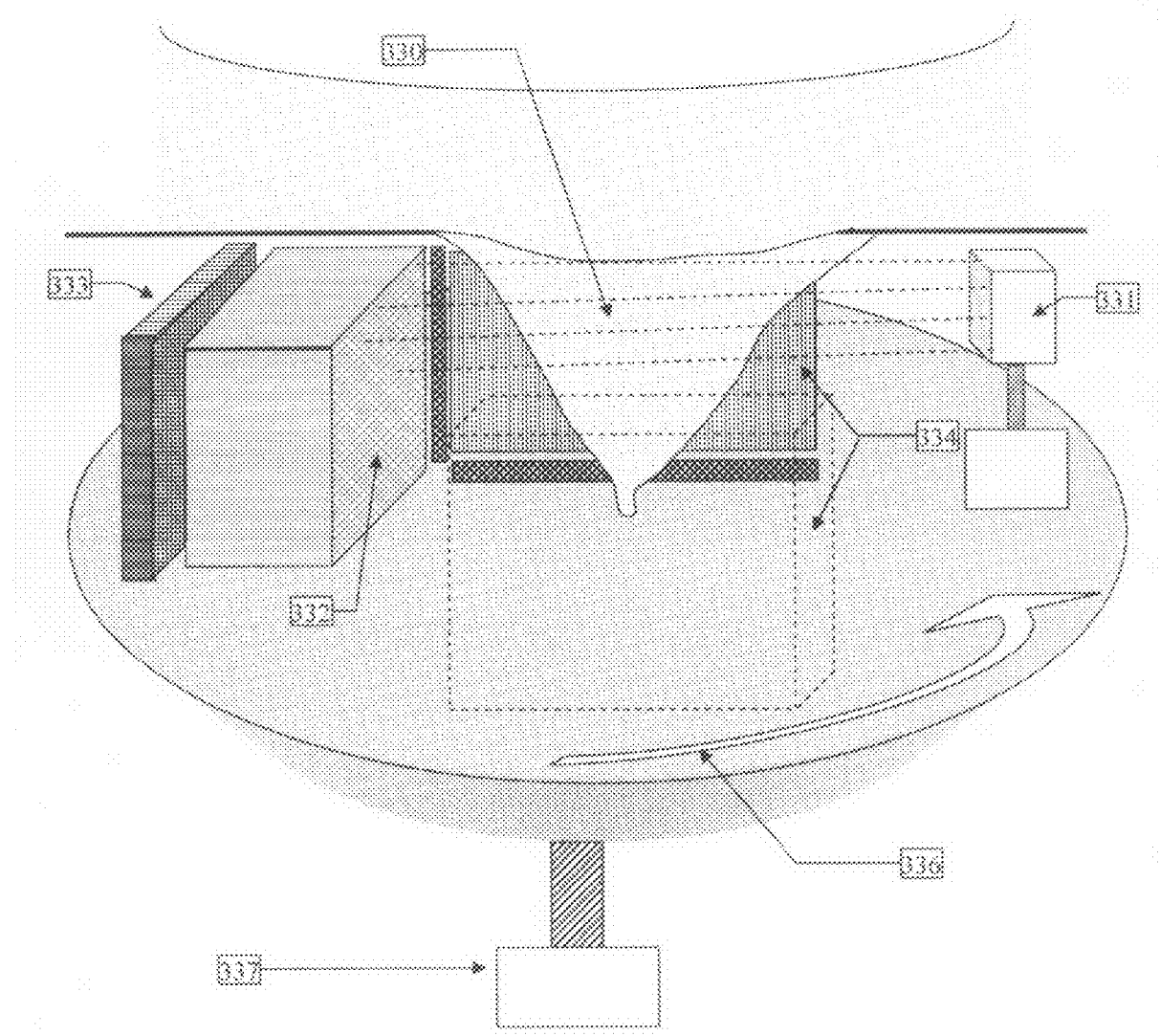
FIG. 26 illustrates the imaging of a breast with a parallel beam X-ray source and a straight fiber Directional Track Camera to obtain transmission images from several directions while obtaining electron density images simultaneously.

FIG. 26 illustrates the imaging of the breast 330 protruding through a hole, of a patient lying on a bed, face down. A "transmission" image of the breast irradiated by an X-ray tube 331 emitting a parallel beam is obtained by a Track Camera consisting of a straight fiber array 332 viewed by a Geiger Mode CMOS camera 333. Two Track cameras 334 placed normal to the X-ray beam, detect the Compton scattered X-rays and obtain "electron density" images of the breast simultaneously with the transmission image. It is important to stress that the "electron density" image obtained by the two Track Cameras 334 are inherently tomographic, as they are directional.

The Imaging system including the X-Ray tube and the 3 directional cameras may be mounted on a rotating platform 336; the "transmission" images obtained by the Directional Camera from around the breast, enable to construct a tomographic "transmission" image. The 2 orthogonal Track cameras which obtain tomographic images even when stationary, will improve the quality of the images when rotated around the breast.

Figure 27:
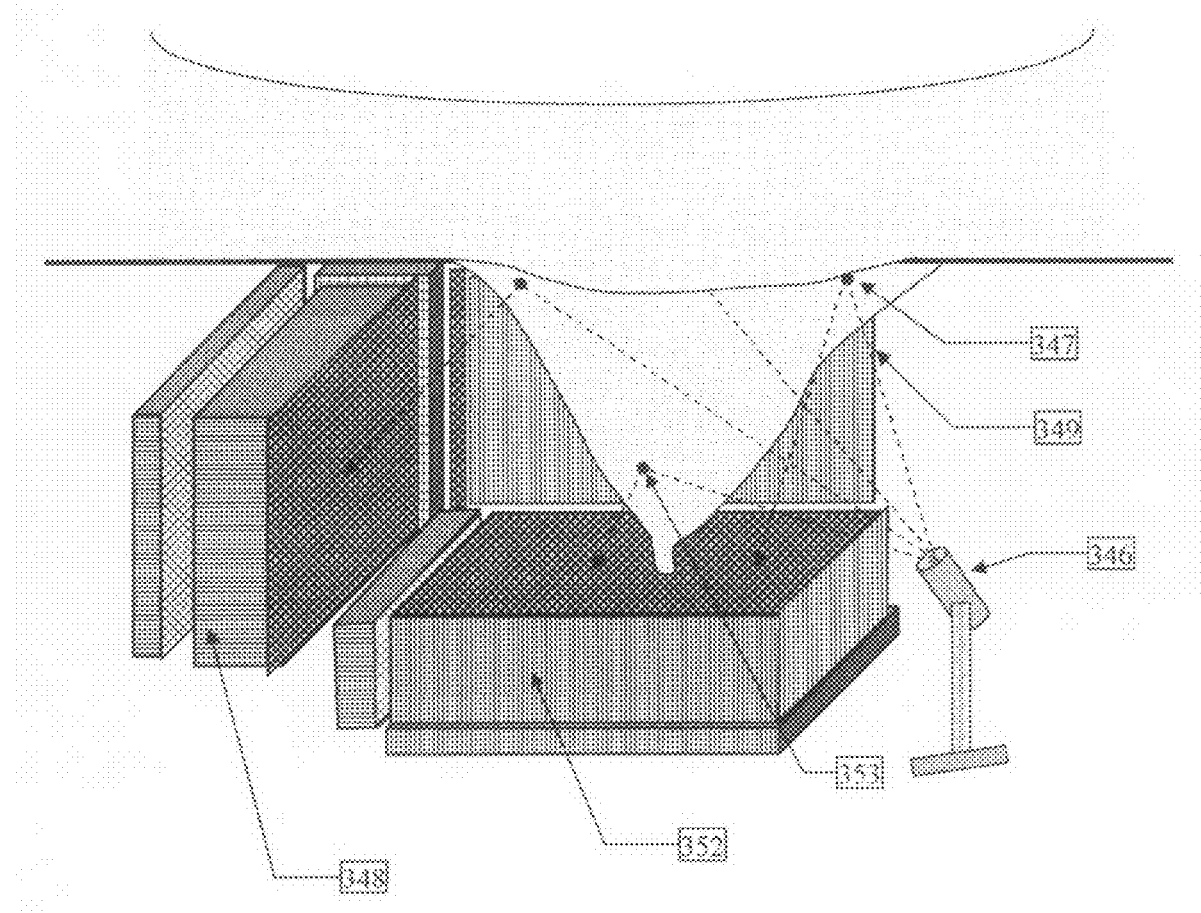
FIG. 27 illustrates the electron density imaging of the breast parts close to the cage and arm-pits by imaging the back and side scattered radiation from 3 orthogonal directions simultaneously.

FIG. 27 illustrates the "electron density" imaging of the breast parts close to the cage and arm-pits 347 by irradiating the breast with an X-ray source 346 and detecting the back scattered gamma rays by 3 Track Cameras 349, 352 and 348 placed beneath and around the breast. The Track cameras being tomographic a 3D electron density of the breast including the parts that are close to the cage, are imaged.

Figure 29:
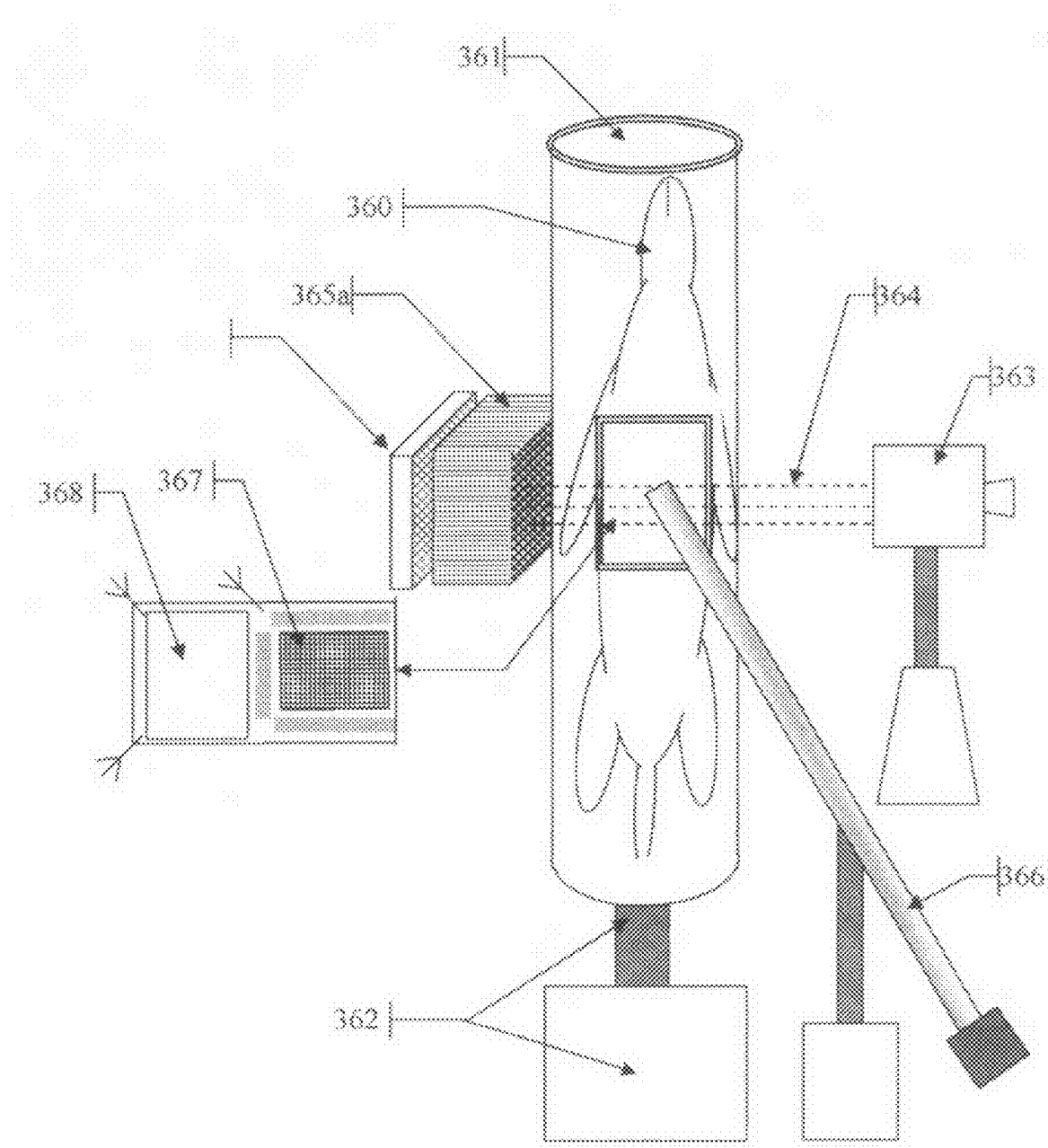
FIG. 29 illustrates a multi-modality imaging of small animals using a CT with parallel beam X-ray source and a straight fiber array Directional Track camera and SPECT/PET imaging using a single Directional Track camera.

FIG. 29 illustrates a Small Animal CT/SPECT/PET Imager. The small CT module comprises a parallel beam X-Ray source 363 and a Track Detector consisting of a single straight fiber array 365a and a Geiger Mode CMOS camera 365b. The X-Ray beam may be shifted up and down by a piezo motor. Alternatively a nano-focus X-ray tube emitting a conical beam may be used with a Track Detector comprising two interlaced 2D fiber arrays viewed by 2 Geiger Mode CMOS cameras. The small animal 360 is kept in a heat shrinkable tube 361 that sits on a piezo motor 362 that can rotate with very high precision. After discarding the Compton scattering events, the high spatial resolution transmission data, with a spatial resolution as high as 1μ, is fed onto a 3D image reconstruction software that reconstructs the volumetric high resolution images. Functional imaging is done with an additional Track Detector 367 comprising two interlaced 2D fiber arrays viewed by 2 Geiger Mode CMOS cameras, that can detect and determine the direction of low energy gammas or the 511 keV annihilation radiation with a single detector. The absolute position and direction of the Track detector in space is measured continuously so that the functional images, can be registered on top of the CT morphology images.

There are multiple ways to realize the invention explained above, combine the differentiating features illustrated in the accompanying figures, and devise new embodiments of the method described, without departing from the scope and spirit of the present invention. Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

I claim:

1. A Tomographic Radiation Imaging System, without collimators, for detecting the positions of sources of gamma or X-rays hereinafter referred to as electromagnetic radiation, comprising:
   a) track detectors for registering tracks of electrons created by the interaction of the electromagnetic radiation with said track detectors wherein said track detectors comprise:

a1) structures composed of two or three interlaced two dimensional scintillation fiber arrays, wherein each array is orthogonal to the other two arrays wherein
  a11) the fiber cross section is one of circular and rectangular and less than $(100\mu)^2$, and
  a12) said scintillation fibers are non-touching and separated by a material with a refractive index of less than n=1.10, and
b) position sensitive detectors of electromagnetic radiation, and
c) photo-detector digital Cameras hereinafter referred to as Cameras, wherein
  c1) each photo-detector element of a Camera is optically coupled to one of the scintillation fibers on a one-to-one basis, and wherein
  c2) the end of each of the scintillation fibers not connected to a photo-detector is coated with a light reflecting coating, and
d) Camera readout electronics for identifying the photo-detector pixels that, within a predetermined time window, generate an electric signal following a scintillation event, and
e) time coincidence circuits for correlating separate tracks in the track detector and signals detected by the position sensitive detectors, and
f) an electronics interface containing position electronics for registering in real time the absolute position and direction of the Radiation Imaging System, the coincidence circuits, the readout electronics of the Photodetector cameras, temporary memory and communication means for relaying the outputs of the Cameras to an external computer for building a Tomographic image of the Radiation sources.

2. A Tomographic Radiation Imaging System as in claim 1 whereas the external computer communicating with the electronics interface uses a method for mapping a Tomographic image of Radiation sources by calculating:
a) the beginning and direction of the electron tracks by a best fit to a straight line of the initial, substantially straight section of the track, after correcting the large deviations due to Coulomb scattering, as imaged in the orthogonal projections registered by the Cameras, and
b) the range of the electron by adding the shortest distances between the fibers traversed by the electron, weighted by the amplitude of the respective signals in each fiber, and
c) the energy deposited on the track by adding the amplitude of the respective signals registered by the Cameras, and
d) the compton scattered electron tracks by their coincidence with position sensitive detectors and lack of very short x-ray electron track in the close proximity of their end, and
e) the photo-electric tracks by their lack of coincidence with position sensitive detectors and the existence of a very short x-ray electron track in the close proximity of their end, and
f) the direction of the scattered electromagnetic radiation as the line joining the beginning of the scattered electron track and the beginning of the electron track in coincidence, and
g) the direction of the scattered electromagnetic radiation as the line joining the beginning of the scattered electron track and the pixel of the position sensitive detector where a signal in coincidence with the track detector was registered, and
h) the direction and energy of the primary electromagnetic radiation interacting with the track detector from the direction and range of the scattered electron and the direction and energy of the scattered electromagnetic radiation in coincidence, and
i) the direction and energy of the primary electromagnetic radiation interacting with the track detector, from the direction and energy of the scattered electron and the direction and energy of the scattered electromagnetic radiation in coincidence, and
j) the direction and energy of the primary electromagnetic radiation interacting with the track detector from the direction and energy of the scattered electron and the direction and energy of the scattered electromagnetic radiation in coincidence as detected by the same track detector, and
k) the direction and energy of the primary electromagnetic radiation interacting with the track detector from the direction and energy of the scattered electron and the direction and energy of the scattered electromagnetic radiation as detected by the track detector and the position sensitive detectors in coincidence, and
l) the intersection points in 3D of the directions of all the primary electromagnetic radiations interacting with the track detector, and
m) builds a 3D map of the intersection points.

3. A Tomographic Radiation Imaging System as in claim 1 wherein the track detectors comprise scintillation fibers belonging to one of a group of plastic scintillator fibers, plastic scintillator fibers loaded with another scintillator material, plastic scintillator fibers loaded with a material that has a resonant absorption to a specific energy, plastic scintillator fibers loaded with a high Z material, glass scintillator fibers, glass scintillator fibers loaded with another scintillator material, glass scintillator fibers loaded with a material that has a resonant absorption to a specific energy, glass scintillator fibers loaded with a high Z material, fibers composed of scintillator material powder within a plasticised carrier and a scintillator material in a fiber form.

4. A Radiation Imaging System as in claim 3 wherein the spectrum of the electromagnetic radiation source is given by the energies of the tracks that are not compton scattered electron tracks, and are not in coincidence with the position sensitive detectors.

5. A Tomographic Radiation Detecting System as in claim 1 wherein the distance between the non-touching fibers is larger than the fiber diameter.

6. A Tomographic Radiation Detecting System as in claim 1 wherein the position sensitive detectors comprise:
a) one of a 2D pixellated array of high density, high Z scintillating crystals comprising $LaBr_3$, $LaClBr_2$, $Lu_2SiO_5$, $Lu_3Al_5O_{12}$, $Y_2Gd_2O_3$, $Bi_4Ge_3O_{12}$ s and
b) a photo-detector Camera wherein each pixel of the camera is optically coupled to one of the pixels of the 2D pixellated array.

7. A Tomographic Radiation Detecting System as in claim 1 wherein the position sensitive detectors comprise one of $HgI_2$, CZT, Si, or Ge semiconductor detectors.

8. A Tomographic Radiation Detecting System as in claim 1 wherein the position sensitive detectors comprise fibers loaded with high Z scintillator material optically coupled to the photodetectors of a digital camera, on a one-to-one basis.

9. A Tomographic Radiation Imaging System as in claim 1 wherein adjacent fibers in each two dimensional layer of fibers are grouped into two subgroups of odd and even fibers according to their geometrical positions along the array, and wherein each of the two subgroups are optically coupled to different photo-detector Cameras through their respective non-coated ends such as the fiber structure formed by two interlaced structures composed of "odd" and "even" fibers are optically coupled to different and separate cameras, and wherein the coordinates of the pixels forming the electron track are obtained by the two fiber structures separately, and determining the coordinates of the pixels forming the track by combining the pixels determined separately by both cameras.

10. A Tomographic Radiation Imaging System as in claim 1 for high resolution X-Ray imaging wherein the diameter of the fibers are less than 10μ comprising:
   a) an X-Ray tube with a conical beam emitting a wide spectrum of x-rays and
   b) a data processor for calculating:
      b1) transmission X-Ray images as a function of spectral bands, by mapping the coordinates of the beginnings of the non-scattered electron tracks that are in the direction of the X-Ray source, wherein the track range indicates the energy band, and
      b2) scattered X-ray images by mapping the coordinates of the intersections of the directions of the non-scattered tracks that are not in the direction of the X-Ray source wherein the track range indicates the energy of the scattered X-rays, and
      b3) the relative densities of the body absorbing and scattering the X-rays from the transmission and scattering X-ray images at the different energy bands.

11. An X-ray Radiation Imaging system as in claim 10 for Mammography comprising:
   a) an X-ray source, and
   b) a Tomographic Radiation Imaging system in front of the X-ray source and across the breast protruding through an opening of a bed, on which a patient lies, face down, for obtaining an X-ray transmission image of the breast, and
   c) One or more Tomographic Radiation Imaging systems orthogonal to the first system and the direction of the X-ray beam, for obtaining scattered X-ray images of the breast, and
   d) A turn-table that holds the x-ray source and the Tomographic Radiation systems and rotates around the breast in fixed steps, and
   e) A data processor for building a composite image of the scattering centers of the breast from the superposition of the images obtained from the various angles by the Tomographic Radiation Imaging systems.

12. An X-ray Radiation Imaging system as in claim 11 for Mammography for imaging the breast parts close to the cage and arm-pits comprising:
   a) an X-ray source directed towards the cage and arm-pits, and
   b) One or more Tomographic Radiation Imaging systems facing the cage and arm-pits but shielded from the X-ray source, and
   c) A turn-table that holds the Tomographic Radiation systems and rotates around the breast in fixed steps, and
   d) A data processor for building a composite image of the scattering centers of the breast from the superposition of the back-scattered images obtained from the various angles by the Tomographic Radiation Imaging systems.

13. A Tomographic Radiation Imaging System as in claim 1 for high resolution X-Ray imaging of a body comprising:
   a) an X-Ray tube with a parallel beam emitting a wide spectrum of x-rays and
   b) a track detector comprising a single array of non-touching plastic scintillation fibers where the diameter of the fibers is less than 10μ and where the long dimension of the fibers are in the direction of the parallel X-Ray beam, and
   c) a Data processor for mapping:
      c1) transmission X-Ray images as a function of spectral bands, by mapping the coordinates of the beginnings of the non-scattered electron tracks that are in the direction of the X-Ray source, wherein the track energy indicates the specific energy band of the x-ray source.

14. A Tomographic Radiation Imaging System as in claim 1 for a high resolution Positron Emission Tomography imaging of a body wherein said system is of such dimensions that it can be inserted within a Computerized Tomography torus or a Magnetic Resonance Imaging machine and placed in close proximity to the body organ emitting 511 keV gamma rays, and comprises:
   a) a track detector where the diameter of the fibers is less than 10μ, and
   b) position sensitive detectors viewing the faces of the track detector not obstructed by the Cameras optically coupled to the fiber arrays, and
   c) a Data processor for mapping the intersection of the directions of the gamma rays detected by the track detector and the position sensitive detectors in coincidence.

15. A method for detecting the positions of sources of gamma or X-rays comprising:
   a) a track detector for determining the coordinates of an electron track created by the interaction of the electromagnetic radiation wherein said track detector comprises:
      a1) a solid, high brilliance scintillator, and
      a2) optical systems for projecting the 3D track images on 2D planes situated on two orthogonal directions from said scintillator, each from two diametrically symmetric directions, and
      a3) digital cameras placed at the focal points of said optical systems, for imaging tracks within the solid scintillator, from each of the four symmetric directions, and
   b) pixellated position sensitive detectors placed at solid angles not covered by the optical systems, and
   c) time coincidence circuits for correlating tracks in the track detector with signals detected by the position sensitive detectors, and
   d) a data processor wherein said data processor:
      d1) calculates for each track event the actual distance of the track from the respective sets of optical systems, by comparing the number of photons detected by the respective cameras from each of the symmetrically opposite directions, and
      d2) deconvolves for every track event the blurred image obtained by each of the static cameras, by a Point Spread Function of the track for a given distance, as projected by the optical system on the digital cameras, and
      d3) calculates:
         d31) the beginning, and direction of the electron tracks by a best fit to a straight line of the initial, substantially straight section of the track, after correcting the large deviations due to Coulomb scattering, as imaged in the orthogonal projections registered by the Cameras, and
         d32) the energy deposited on the track by adding the amplitude of the respective signals registered by the Cameras, and d33) the compton scattered electron tracks by their coincidence with the position sensitive detectors and lack of very short x-ray electron track in the close proximity of their end, and d34) the photo-electric tracks by their lack of coincidence with position sensitive detectors and the existence of a very short x-ray electron track in the close proximity of their end, and d35) the direction of the scattered electromagnetic radiation as the line joining the beginning of the scattered electron track and the beginning of the electron track in coincidence, and d36) the direction of the scattered electromagnetic radiation as the line joining the beginning of the scattered electron track and the pixel of the position sensitive detector where a signal in coincidence with the track detector was registered, and d37) the direction and energy of the primary electromagnetic radiation interacting with the track detector from the direction and range of the scattered electron and the direction and energy of the scattered electromagnetic radiation in coincidence, and d38) the direction and energy of the primary electromagnetic radiation interacting with the track detector, from the direction and energy of the scattered electron and the direction and energy of the scattered electromagnetic radiation in coincidence, and d39) the direction and energy of the primary electromagnetic radiation interacting with the track detector from the direction and energy of the scattered electron and the direction and energy of the scattered electromagnetic radiation in coincidence as detected by the same track detector, and d310) the direction and energy of the primary electromagnetic radiation interacting with the track detector from the direction and energy of the scattered electron and the direction and energy of the scattered electromagnetic radiation as detected by the track detector and the position sensitive detectors in coincidence, and d311) the intersection points in 3D of the directions of all the primary electromagnetic radiations interacting with the track detector, and d312) builds a 3D map of the intersection points.

\* \* \* \* \*